United States Patent
Elford et al.

(10) Patent No.: US 10,656,363 B2
(45) Date of Patent: *May 19, 2020

(54) APICAL CONDUIT METHOD AND SYSTEM

(71) Applicant: CenturyLink Intellectual Property LLC, Broomfield, CO (US)

(72) Inventors: Michael L. Elford, Calhoun, LA (US); Michael P. Winterrowd, Calhoun, LA (US); Patrick J. Sims, Plymouth, MN (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/205,054

(22) Filed: Nov. 29, 2018

(65) Prior Publication Data

US 2019/0107683 A1 Apr. 11, 2019

Related U.S. Application Data

(63) Continuation of application No. 15/866,624, filed on Jan. 10, 2018, now Pat. No. 10,146,024.
(Continued)

(51) Int. Cl.
*G02B 6/50* (2006.01)
*G02B 6/46* (2006.01)
(Continued)

(52) U.S. Cl.
CPC .......... *G02B 6/504* (2013.01); *G02B 6/3898* (2013.01); *G02B 6/4486* (2013.01); *G02B 6/06* (2013.01);
(Continued)

(58) Field of Classification Search
CPC ............. G02B 6/44; G02B 6/36; G02B 6/504
See application file for complete search history.

(56) References Cited

U.S. PATENT DOCUMENTS 2,754,101 A 7/1956 Haworth et al.
4,034,567 A 7/1977 Roggen
(Continued)

FOREIGN PATENT DOCUMENTS

CA 2337284 8/2002
CN 101799987 B 11/2011
(Continued)

OTHER PUBLICATIONS

Abram, et al., Center for Nondestructive Evaluation, Iowa State University, Ames, IA, USA; "Effect of relative humidity on the curing and dielectric properties of polyurethane-based composites"; 2005 Annual Report Conference; 4 pages.
(Continued)

*Primary Examiner* — Sung H Pak
*Assistant Examiner* — Hoang Q Tran

(57) ABSTRACT

Novel tools and techniques are provided for implementing installation of optical fiber, non-fiber lines, and/or power lines in a ground surface. In various embodiments, a foldable base might be placed in a channel in a ground surface. The foldable base might include a base portion, two side wall portions, at least two points of articulation, and two plug contacts. Each point of articulation allows each side wall portion to fold relative with the base portion, forming a cavity. One or more lines may be placed within the cavity. A plug, placed above the lines in the cavity, may engage with the two plug contacts to secure the plug to the foldable base. Capping material, placed in microchannel on a top surface of the plug, may flow beyond the microchannel and over any openings between the plug and the foldable base and between the foldable base and edges of the channel.

18 Claims, 27 Drawing Sheets

Related U.S. Application Data

(60) Provisional application No. 62/444,667, filed on Jan. 10, 2017.

(51) Int. Cl.
*G02B 6/38* (2006.01)
*G02B 6/44* (2006.01)
*G02B 6/06* (2006.01)

(52) U.S. Cl.
CPC ............ *G02B 6/389* (2013.01); *G02B 6/4469* (2013.01); *G02B 6/46* (2013.01)

(56) References Cited

U.S. PATENT DOCUMENTS

| | | | |
|---|---|---|---|
| 4,329,083 A | 5/1982 | Parkinson | |
| 4,815,814 A | 3/1989 | Ulijasz | |
| 4,940,359 A | 7/1990 | Van Duyn et al. | |
| 5,239,129 A | 8/1993 | Ehrenfels | |
| 5,313,546 A | 5/1994 | Toffetti | |
| 5,528,684 A | 6/1996 | Schneider et al. | |
| 5,566,622 A | 10/1996 | Ziaylek, Jr. et al. | |
| 5,583,492 A | 12/1996 | Nakanishi | |
| 5,606,606 A | 2/1997 | Schneider et al. | |
| 5,717,955 A | 2/1998 | Swinehart | |
| 5,760,706 A | 6/1998 | Kiss | |
| 5,879,109 A | 3/1999 | Diermeier et al. | |
| 6,099,080 A | 8/2000 | Hirashita et al. | |
| 6,272,346 B1 | 8/2001 | Fujinami | |
| 6,371,691 B1 | 4/2002 | Finzel et al. | |
| 6,414,605 B1 | 7/2002 | Walden | |
| 6,499,410 B1 | 12/2002 | Berardi | |
| 6,503,025 B1 | 1/2003 | Miller | |
| 6,807,355 B2 | 10/2004 | Dofher | |
| 6,829,424 B1 * | 12/2004 | Finzel ................. G02B 6/4446 385/135 |
| 6,866,448 B2 | 3/2005 | Finzel et al. | |
| 6,990,192 B1 | 1/2006 | Denovich et al. | |
| 7,030,781 B2 | 4/2006 | Jones | |
| 7,050,683 B2 | 5/2006 | Dofher | |
| 7,095,930 B2 | 8/2006 | Storaasli et al. | |
| 7,514,628 B2 | 4/2009 | Kadrnoska et al. | |
| 7,522,805 B2 | 4/2009 | Smith et al. | |
| 7,674,980 B2 | 3/2010 | Lubanski | |
| 7,740,417 B2 | 6/2010 | Jang | |
| 7,849,886 B2 | 12/2010 | Carew et al. | |
| D640,290 S | 6/2011 | Stellman et al. | |
| 8,061,344 B2 | 11/2011 | Dofher | |
| 8,296,383 B2 | 10/2012 | Lindahl | |
| 8,480,332 B2 | 7/2013 | Miller et al. | |
| 8,654,936 B1 | 2/2014 | Eslambolchi et al. | |
| 9,062,423 B2 | 6/2015 | Allouche et al. | |
| 9,226,418 B2 | 12/2015 | Magno et al. | |
| 9,270,098 B2 | 2/2016 | Isaaks et al. | |
| 9,432,340 B1 | 8/2016 | Tutt et al. | |
| 9,456,276 B1 | 9/2016 | Chhetri | |
| 9,466,966 B2 | 10/2016 | Allouche et al. | |
| 9,531,174 B2 | 12/2016 | Elford et al. | |
| 9,588,315 B1 | 3/2017 | Turner | |
| 9,742,172 B2 | 8/2017 | Elford et al. | |
| 9,780,433 B2 | 10/2017 | Schwengler et al. | |
| 9,786,997 B2 | 10/2017 | Schwengler et al. | |
| 9,860,677 B1 | 1/2018 | Agerstam | |
| 9,917,903 B2 | 3/2018 | Clernon | |
| 10,069,751 B2 | 9/2018 | Amulothu | |
| 2001/0029311 A1 | 10/2001 | Khare | |
| 2002/0057945 A1 | 5/2002 | Dahowski | |
| 2002/0061231 A1 | 5/2002 | Finzel et al. | |
| 2003/0061029 A1 | 3/2003 | Shaket | |
| 2003/0123935 A1 | 7/2003 | Dofher | |
| 2003/0210958 A1 | 11/2003 | Nothofer | |
| 2004/0083054 A1 | 4/2004 | Jones | |
| 2004/0115004 A1 | 6/2004 | Serrano | |
| 2004/0142658 A1 | 7/2004 | McKenna | |
| 2004/0129445 A1 | 8/2004 | Winkelbach | |
| 2004/0221324 A1 | 11/2004 | Ansari et al. | |
| 2004/0234215 A1 | 11/2004 | Serrano et al. | |
| 2005/0013566 A1 | 1/2005 | Storaasli | |
| 2005/0191113 A1 | 9/2005 | Frazier | |
| 2005/0191133 A1 | 9/2005 | Purcell | |
| 2005/0207711 A1 | 9/2005 | Vo | |
| 2005/0259930 A1 | 11/2005 | Elkins et al. | |
| 2005/0285807 A1 | 12/2005 | Zehngut | |
| 2006/0008231 A1 | 1/2006 | Reagan | |
| 2006/0093303 A1 | 5/2006 | Reagan et al. | |
| 2006/0118338 A1 | 6/2006 | Maybury, Jr. | |
| 2006/0204187 A1 | 9/2006 | Dofher | |
| 2007/0018849 A1 | 1/2007 | Salser, Jr. | |
| 2007/0079113 A1 | 4/2007 | Kulkarni et al. | |
| 2007/0154152 A1 | 7/2007 | Morris | |
| 2008/0256008 A1 | 10/2008 | Kwok | |
| 2008/0298755 A1 | 12/2008 | Caplan | |
| 2008/0303654 A1 | 12/2008 | Kates | |
| 2009/0177172 A1 | 7/2009 | Wilkes | |
| 2009/0214163 A1 | 8/2009 | Lu | |
| 2009/0317047 A1 | 12/2009 | Smith | |
| 2009/0327910 A1 | 12/2009 | Black | |
| 2010/0010117 A1 | 1/2010 | Bricout | |
| 2010/0047021 A1 | 2/2010 | Scola | |
| 2010/0071596 A1 | 3/2010 | Konczak | |
| 2010/0086254 A1 | 4/2010 | Dofher | |
| 2010/0124332 A1 | 5/2010 | Arena | |
| 2010/0217604 A1 | 8/2010 | Baldwin et al. | |
| 2010/0243096 A1 | 9/2010 | Berglund | |
| 2010/0325421 A1 | 12/2010 | Park et al. | |
| 2011/0016754 A1 | 1/2011 | Ruhl et al. | |
| 2011/0052131 A1 | 3/2011 | Park et al. | |
| 2011/0106321 A1 | 5/2011 | Cherian | |
| 2011/0315259 A1 | 12/2011 | Kelly | |
| 2012/0048148 A1 | 3/2012 | Konczak | |
| 2012/0086563 A1 | 4/2012 | Arling | |
| 2012/0195694 A1 | 8/2012 | Konczak | |
| 2012/0268886 A1 | 10/2012 | Leontiev | |
| 2013/0011198 A1 | 1/2013 | Pichler | |
| 2013/0044918 A1 | 2/2013 | Nielsen et al. | |
| 2013/0074067 A1 | 3/2013 | Chowdhry | |
| 2013/0121761 A1 | 5/2013 | Dixon | |
| 2013/0216187 A1 | 8/2013 | Dowling | |
| 2013/0216313 A1 | 8/2013 | Gustavsson et al. | |
| 2013/0223807 A1 | 8/2013 | Elford et al. | |
| 2013/0238326 A1 | 9/2013 | Kim et al. | |
| 2013/0287500 A1 | 10/2013 | Miller | |
| 2013/0294839 A1 | 11/2013 | Gustavsson et al. | |
| 2014/0018969 A1 | 1/2014 | Forbes | |
| 2014/0146905 A1 | 5/2014 | Zavadsky | |
| 2014/0167931 A1 | 6/2014 | Lee et al. | |
| 2014/0188463 A1 | 7/2014 | Noh et al. | |
| 2014/0202571 A1 | 7/2014 | Spijker | |
| 2014/0270971 A1 * | 9/2014 | Allouche ................ E01F 11/00 405/184.4 |
| 2014/0327583 A1 | 11/2014 | Sparks | |
| 2014/0343950 A1 | 11/2014 | Simpson et al. | |
| 2015/0035704 A1 | 2/2015 | Schwengler et al. | |
| 2015/0070221 A1 | 3/2015 | Schwengler et al. | |
| 2015/0110453 A1 | 4/2015 | Elford et al. | |
| 2015/0139598 A1 | 5/2015 | Barnes et al. | |
| 2015/0230008 A1 | 8/2015 | Elford et al. | |
| 2015/0249672 A1 | 9/2015 | Burns et al. | |
| 2015/0288161 A1 | 10/2015 | Allouche et al. | |
| 2015/0300527 A1 | 10/2015 | Konczak | |
| 2015/0350247 A1 | 12/2015 | Adler et al. | |
| 2015/0365278 A1 | 12/2015 | Chakrabarti et al. | |
| 2016/0021127 A1 | 1/2016 | Yan | |
| 2016/0029346 A1 | 1/2016 | Suresh et al. | |
| 2016/0064829 A1 | 3/2016 | Schaepperle | |
| 2016/0080322 A1 | 3/2016 | Prisser | |
| 2016/0085594 A1 | 3/2016 | Wang | |
| 2016/0109036 A1 | 4/2016 | Elford et al. | |
| 2016/0109678 A1 | 4/2016 | Schwengler et al. | |
| 2016/0112779 A1 | 4/2016 | Barnett et al. | |
| 2016/0187995 A1 | 6/2016 | Rosewall | |
| 2016/0195876 A1 | 7/2016 | Mattsson | |
| 2016/0212012 A1 | 7/2016 | Young | |
| 2016/0212613 A1 | 7/2016 | Huang | |

(56) References Cited

U.S. PATENT DOCUMENTS

| | | |
|---|---|---|
| 2016/0226231 A1 | 8/2016 | Elford et al. |
| 2016/0226674 A1 | 8/2016 | Kangshang et al. |
| 2016/0248746 A1 | 8/2016 | James |
| 2016/0277310 A1 | 9/2016 | Challa |
| 2016/0278599 A1 | 9/2016 | Seo |
| 2016/0294828 A1 | 10/2016 | Zakaria |
| 2016/0295364 A1 | 10/2016 | Zakaria |
| 2016/0323271 A1 | 11/2016 | Hinman |
| 2016/0330042 A1 | 11/2016 | Andersen |
| 2016/0352526 A1 | 12/2016 | Adler et al. |
| 2016/0359965 A1 | 12/2016 | Murphy et al. |
| 2017/0006141 A1 | 1/2017 | Bhadra |
| 2017/0006643 A1 | 1/2017 | Zakaria et al. |
| 2017/0026157 A1 | 1/2017 | Bugenhagen et al. |
| 2017/0026472 A1 | 1/2017 | Bugenhagen et al. |
| 2017/0059802 A1 | 3/2017 | Elford et al. |
| 2017/0060369 A1 | 3/2017 | Goyal |
| 2017/0093866 A1 | 3/2017 | Ben-Noon |
| 2017/0110784 A1 | 4/2017 | Vermes et al. |
| 2017/0134937 A1 | 5/2017 | Miller |
| 2017/0141575 A1 | 5/2017 | Fulton |
| 2017/0171747 A1 | 6/2017 | Britt et al. |
| 2017/0187807 A1 | 6/2017 | Clernon |
| 2017/0192437 A1 | 7/2017 | Bier |
| 2017/0195318 A1 | 7/2017 | Liu |
| 2017/0201504 A1 | 7/2017 | Funk |
| 2017/0206900 A1 | 7/2017 | Lee et al. |
| 2017/0237815 A1 | 8/2017 | Arsenault |
| 2017/0253258 A1 | 9/2017 | Bramucci |
| 2017/0279620 A1 | 9/2017 | Kravitz et al. |
| 2017/0300953 A1 | 10/2017 | Kim |
| 2017/0317482 A1 | 11/2017 | Elford et al. |
| 2017/0345420 A1 | 11/2017 | Barnett, Jr. |
| 2017/0358025 A1 | 12/2017 | Varma |
| 2017/0358837 A1 | 12/2017 | Schwengler et al. |
| 2017/0358869 A1 | 12/2017 | Schwengler et al. |
| 2018/0040172 A1 | 2/2018 | Funk |
| 2018/0062691 A1 | 3/2018 | Barnett, Jr. |
| 2018/0084596 A1 | 3/2018 | Schwengler et al. |
| 2018/0103579 A1 | 4/2018 | Grufman |
| 2018/0122506 A1 | 5/2018 | Grantcharov |
| 2018/0136424 A1 | 5/2018 | Elford |
| 2018/0168464 A1 | 6/2018 | Barnett, Jr. et al. |
| 2018/0181091 A1 | 6/2018 | Funk et al. |
| 2018/0181095 A1 | 6/2018 | Funk et al. |
| 2018/0183685 A1 | 6/2018 | Cook |
| 2018/0183874 A1 | 6/2018 | Cook |
| 2018/0188704 A1 | 7/2018 | Cella |
| 2018/0196216 A1 | 7/2018 | Elford et al. |

FOREIGN PATENT DOCUMENTS

| | | |
|---|---|---|
| FR | 2750717 | 1/1998 |
| GB | 2327680 | 2/1999 |
| JP | H03139705 | 6/1991 |
| KR | 10-2015-0128346 | 11/2015 |
| WO | WO-2010-140507 | 5/1998 |
| WO | WO-1999-061710 | 12/1999 |
| WO | WO-2002-029947 | 4/2002 |
| WO | WO-2009-098676 | 8/2009 |
| WO | WO-2013-058648 | 4/2013 |
| WO | WO-2013-130644 | 9/2013 |
| WO | WO-2014-151726 | 9/2014 |
| WO | WO-2017-123392 | 7/2017 |

OTHER PUBLICATIONS

Extended European Search Report, European Patent Application No. 14768062.3; dated Oct. 18, 2016; 5 pages.

International Preliminary Report on Patentability, dated Jul. 26, 2018, PCT/US2016/067938, 8 pages.

International Search Report and Written Opinion prepared by the Korean Intellectual Property Office as International Searching Authority for PCT Intl Patent App. No. PCT/US2016/067938 dated Mar. 31, 2017; 11 pages.

International Search Report and Written Opinion prepared by the Korean Intellectual Property Office as International Searching Authority for PCT International Patent Application No. PCT/US2017/034531) dated Aug. 29, 2017; 18 pages.

International Search Report and Written Opinion prepared by the U.S. Patent and Trademark Office as International Search Authority in PCT International Patent Application No. PCT/US2014/026325, dated Aug. 8, 2014; 12 pages.

International Search Report and Written Opinion prepared by the U.S. Patent and Trademark Office as International Searching Authority for PCT International Patent Application No. PCT/US2013/0280 dated May 3, 2013; 20 pages.

Lejun Qi, Linnea Petersson & Tieliang Liu (2014) "Review of Recent Activities on Dielectric Films for Capacitor Applications", Journal of International Council on Electrical Engineering, 6 pages.

International Preliminary Report on Patentability, PCT International Patent Application No. PCT/US2014/026325, dated Sep. 24, 2015; 8 pages.

Preliminary Report on Patentability, PCT International Patent Application No. PCT/US2013/0280 dated Sep. 12, 2014; 13 pages.

Alexander, Chris, et al., "Improved User Authentication in Off-The-Record Messaging", Pub. 2009, 7 pages.

Borisov, Nikita, et al., "Off-the-Record Communication, or, Why Not to Use PGP", Pub. 2004, 8 pages.

De Raimondo, Mario, et al., "Secure Off the Record Messaging", Pub. 2005; 9 pages.

Goldberg, Ian, et al., "Multi-Party Off the Record Messaging", Pub. 2007, 11 pages.

Stedman, Ryan, et al., "A User Study of Off-the-Record Messaging", Pub. Date 2008, 10 pages.

* cited by examiner

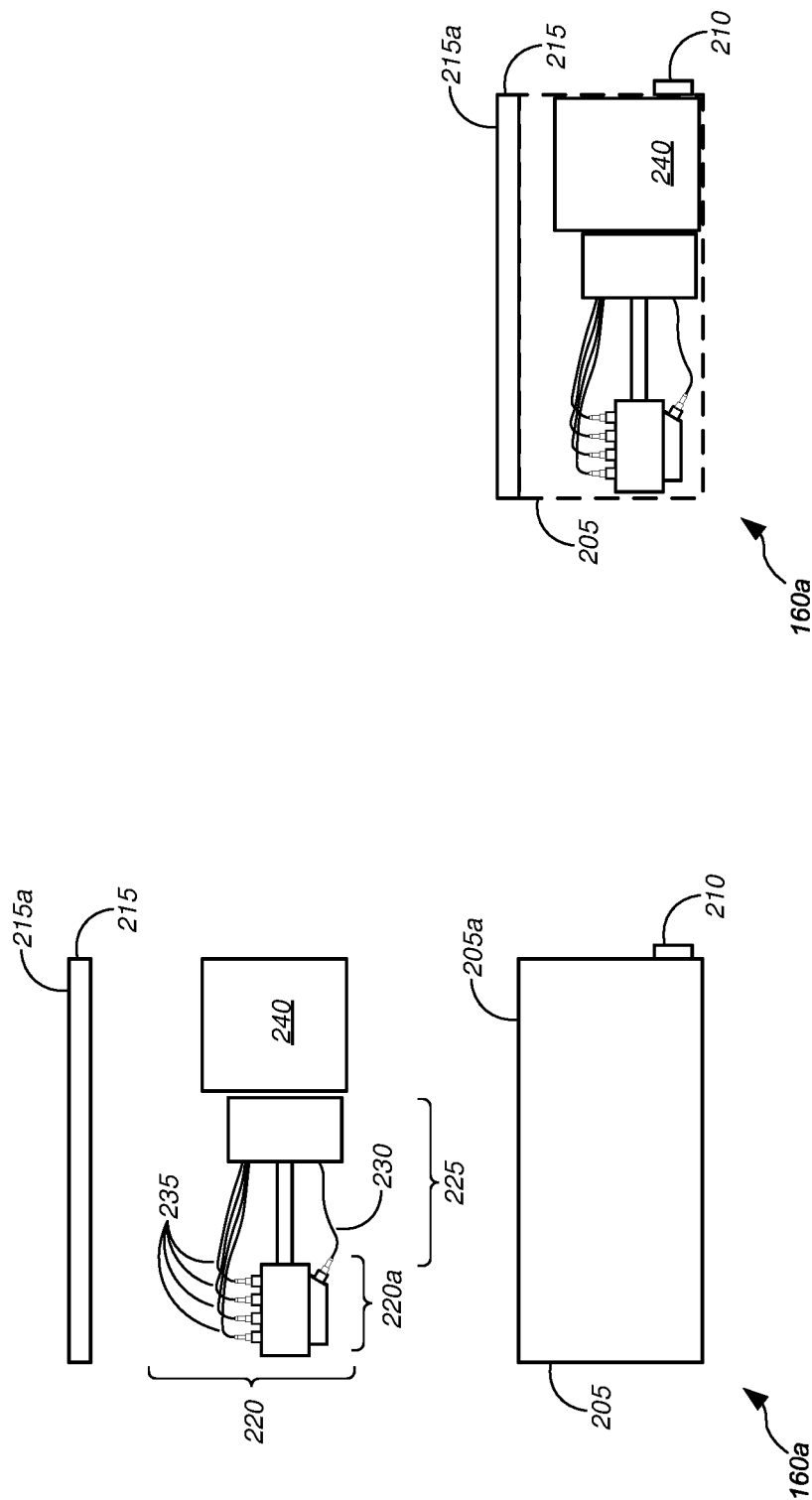

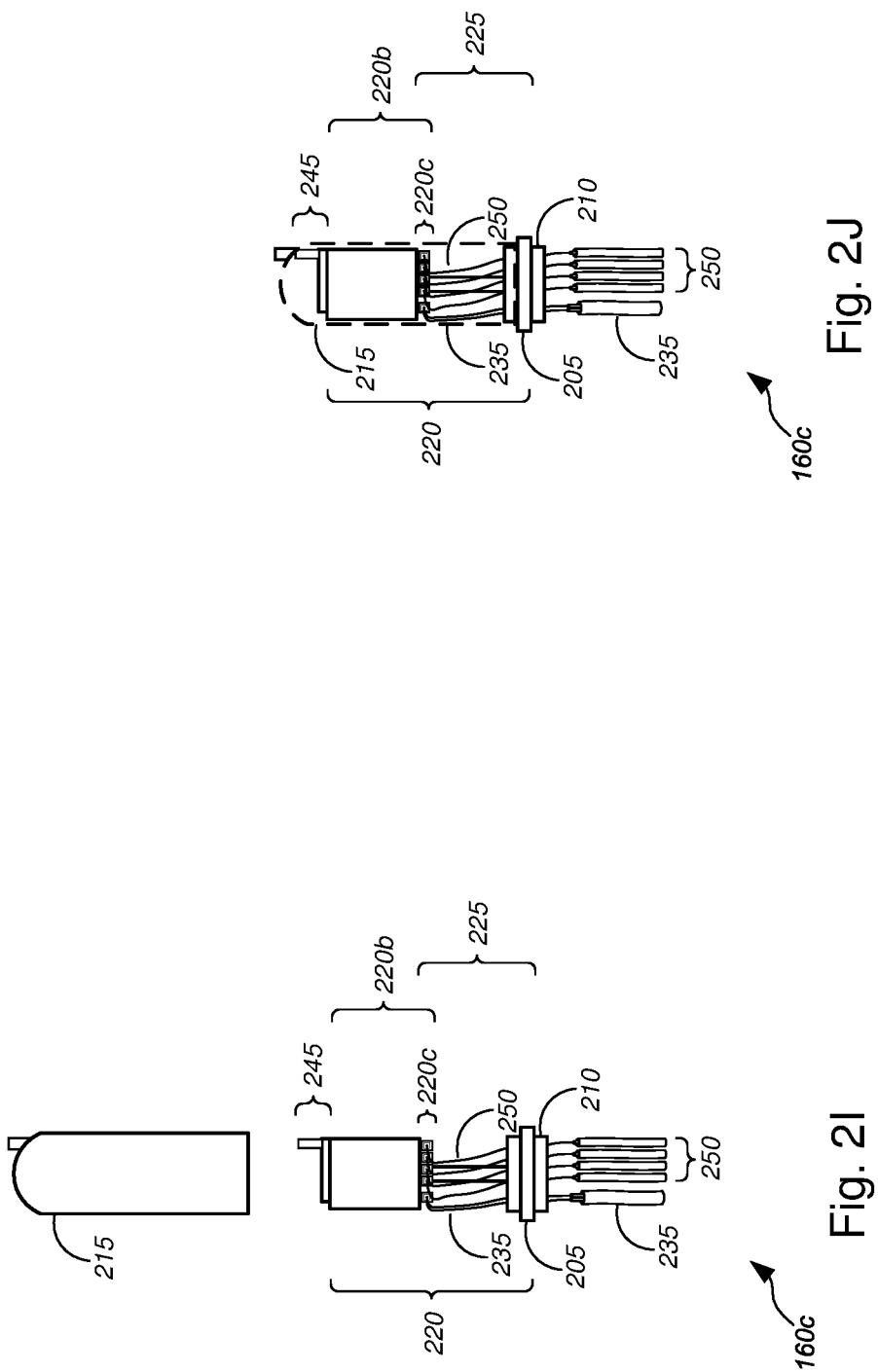

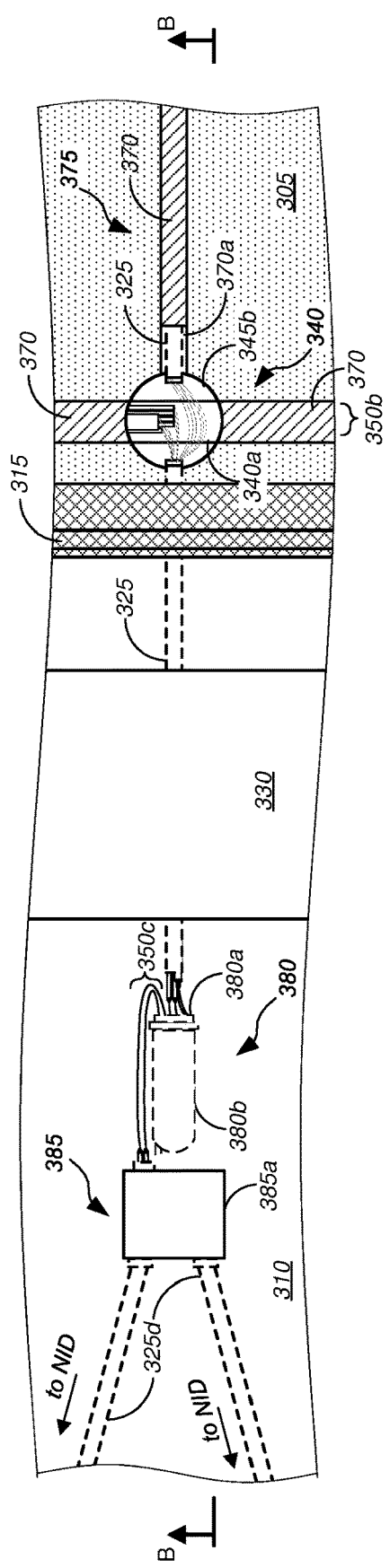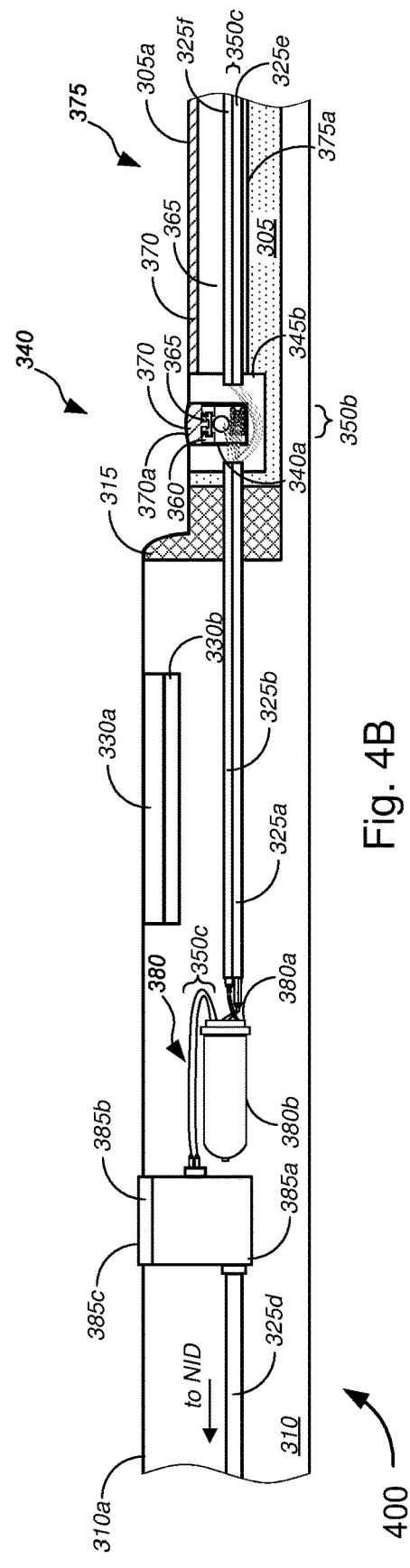
Fig. 4A
Fig. 4B

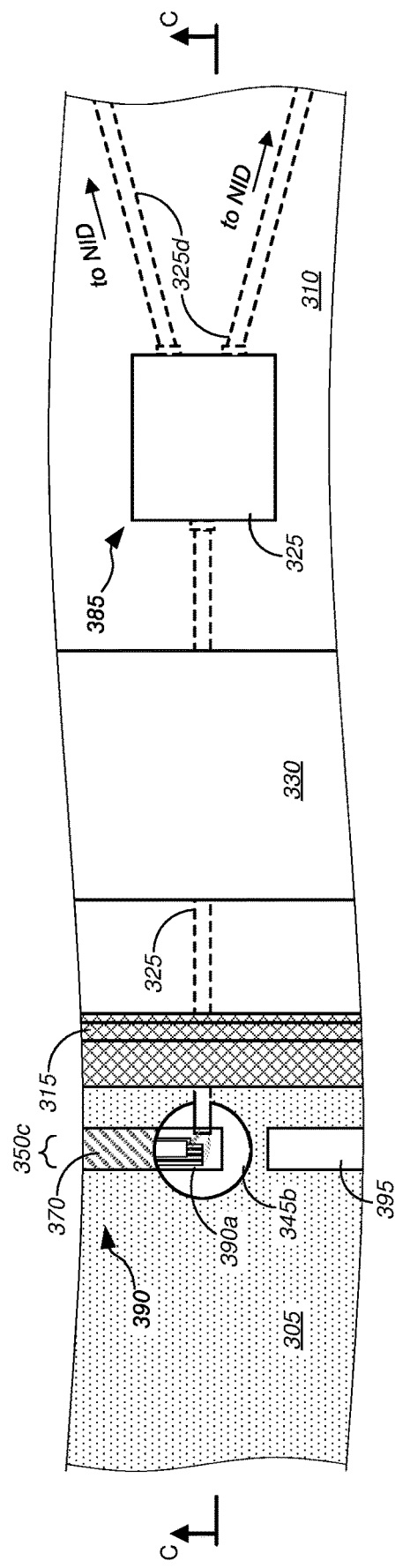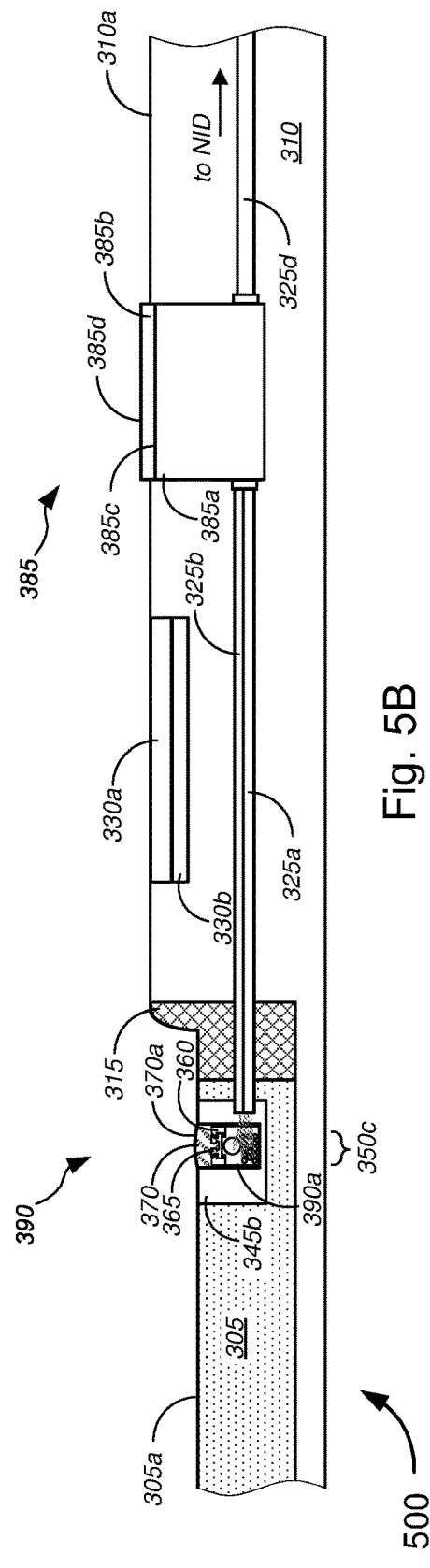

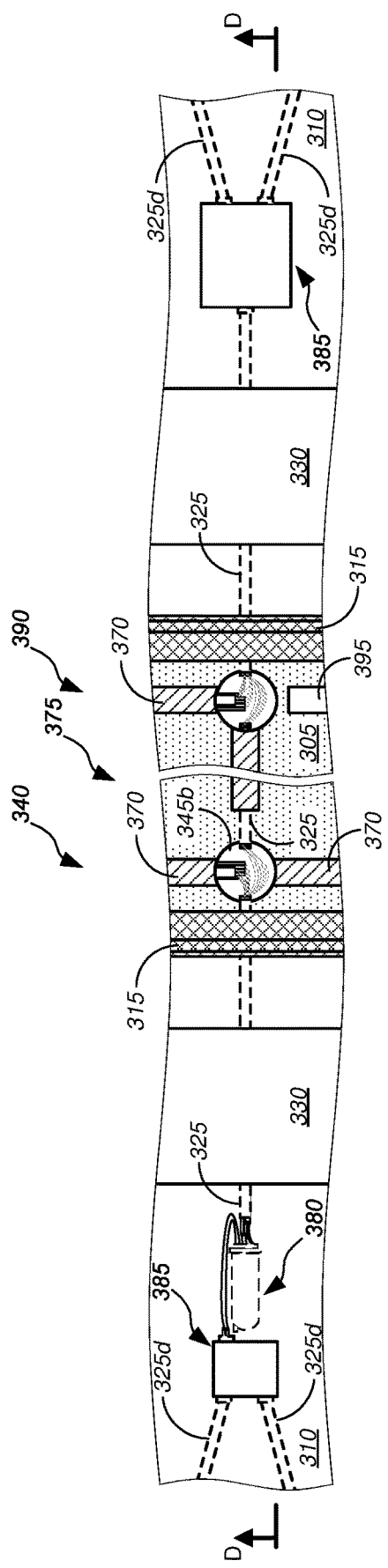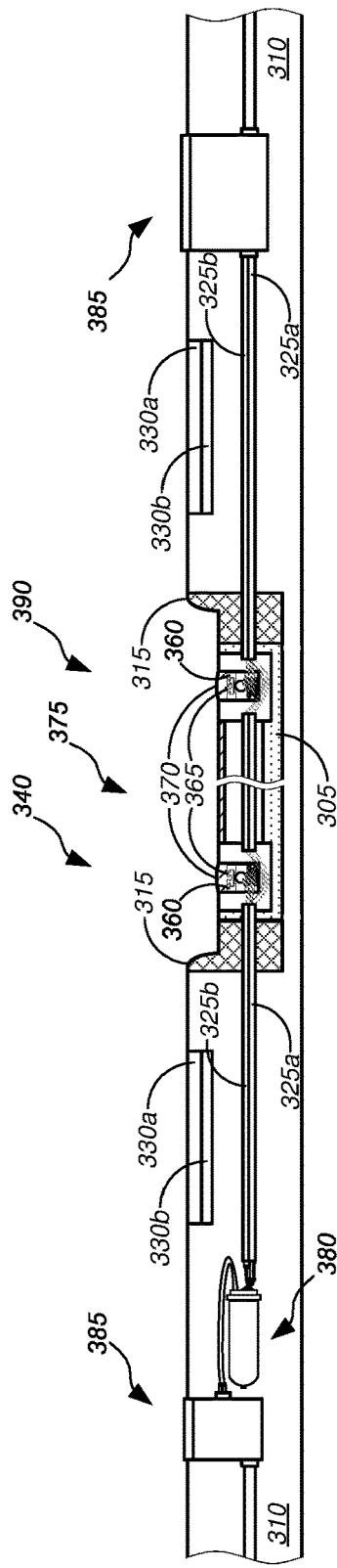

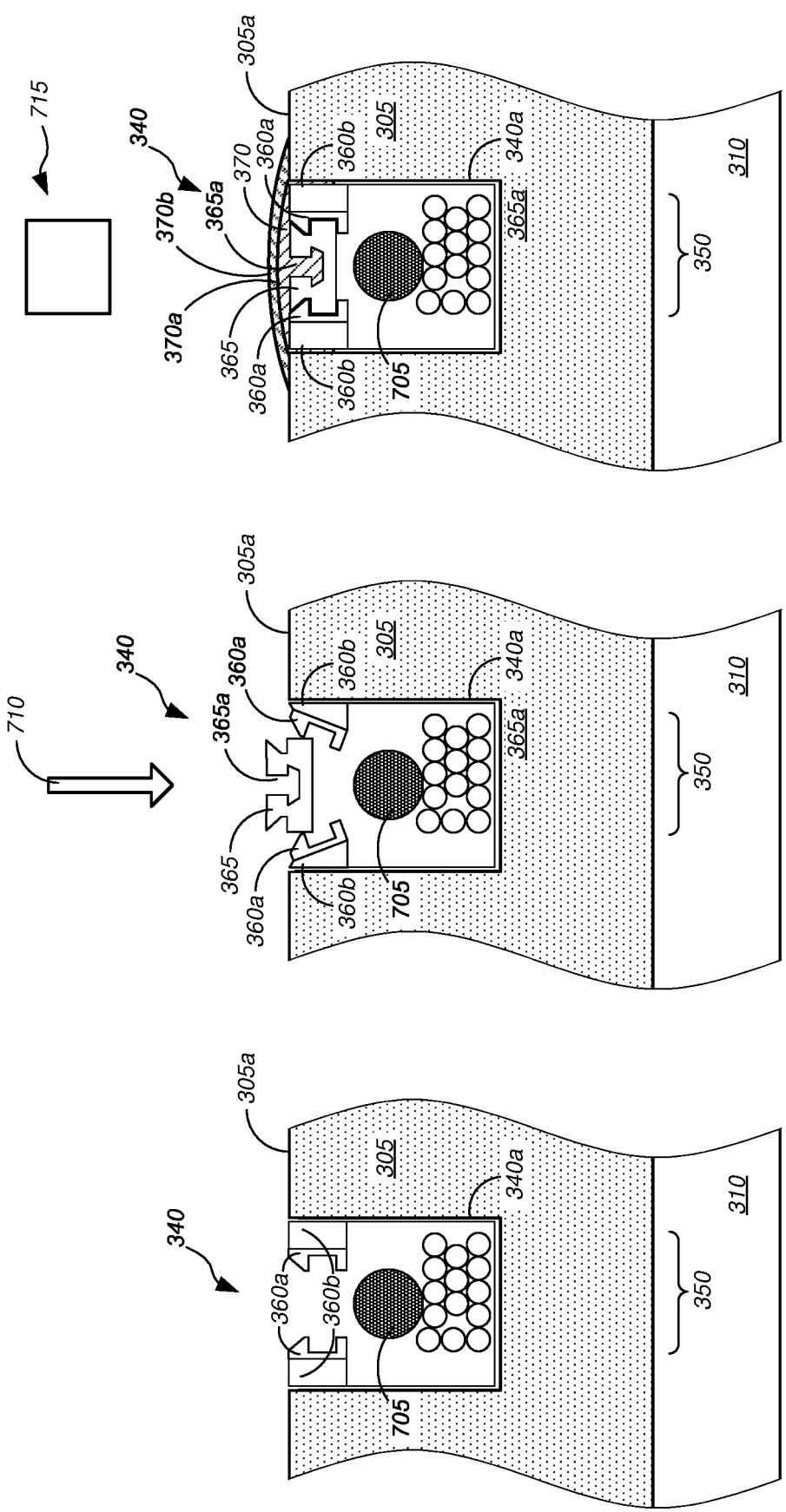

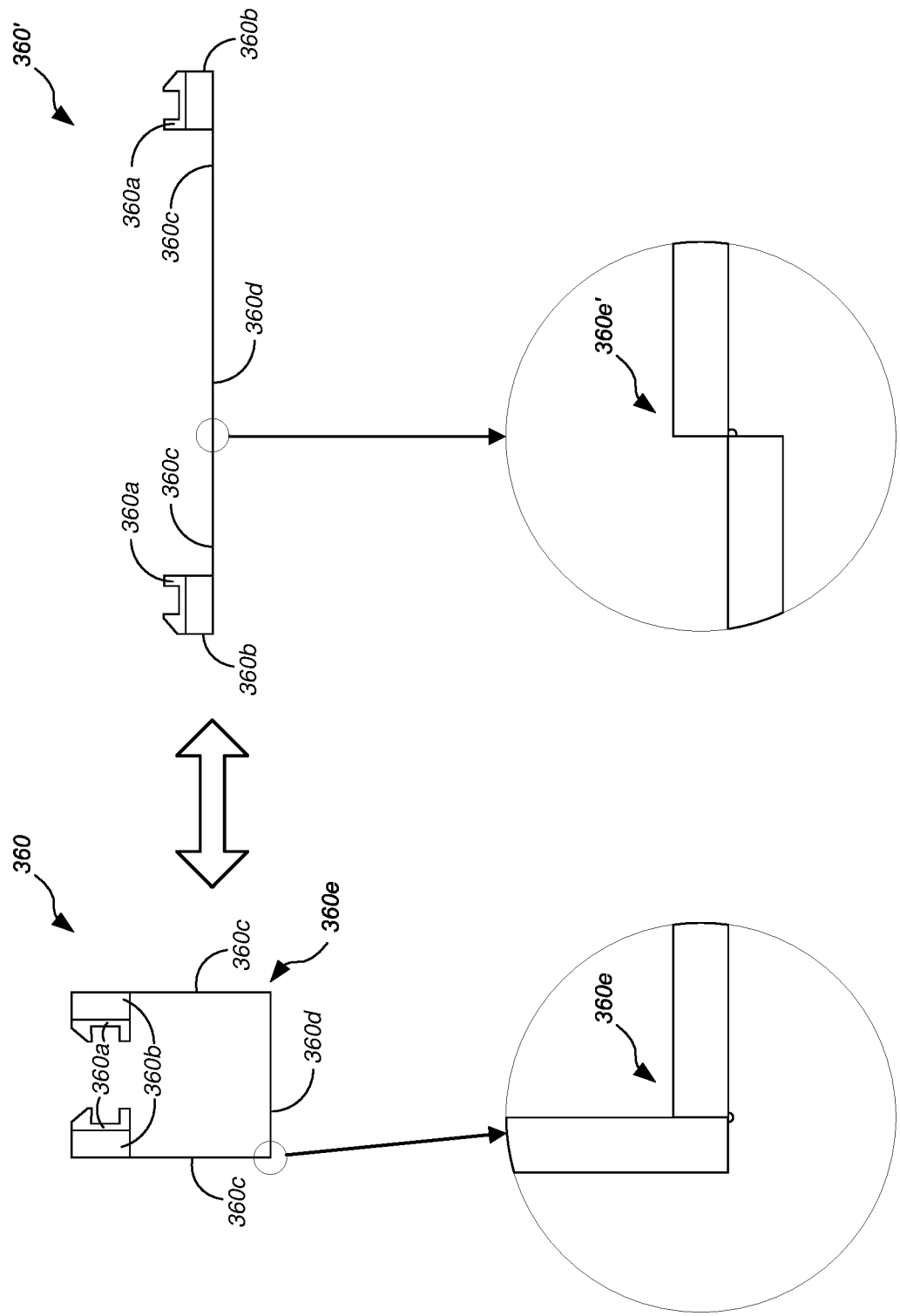

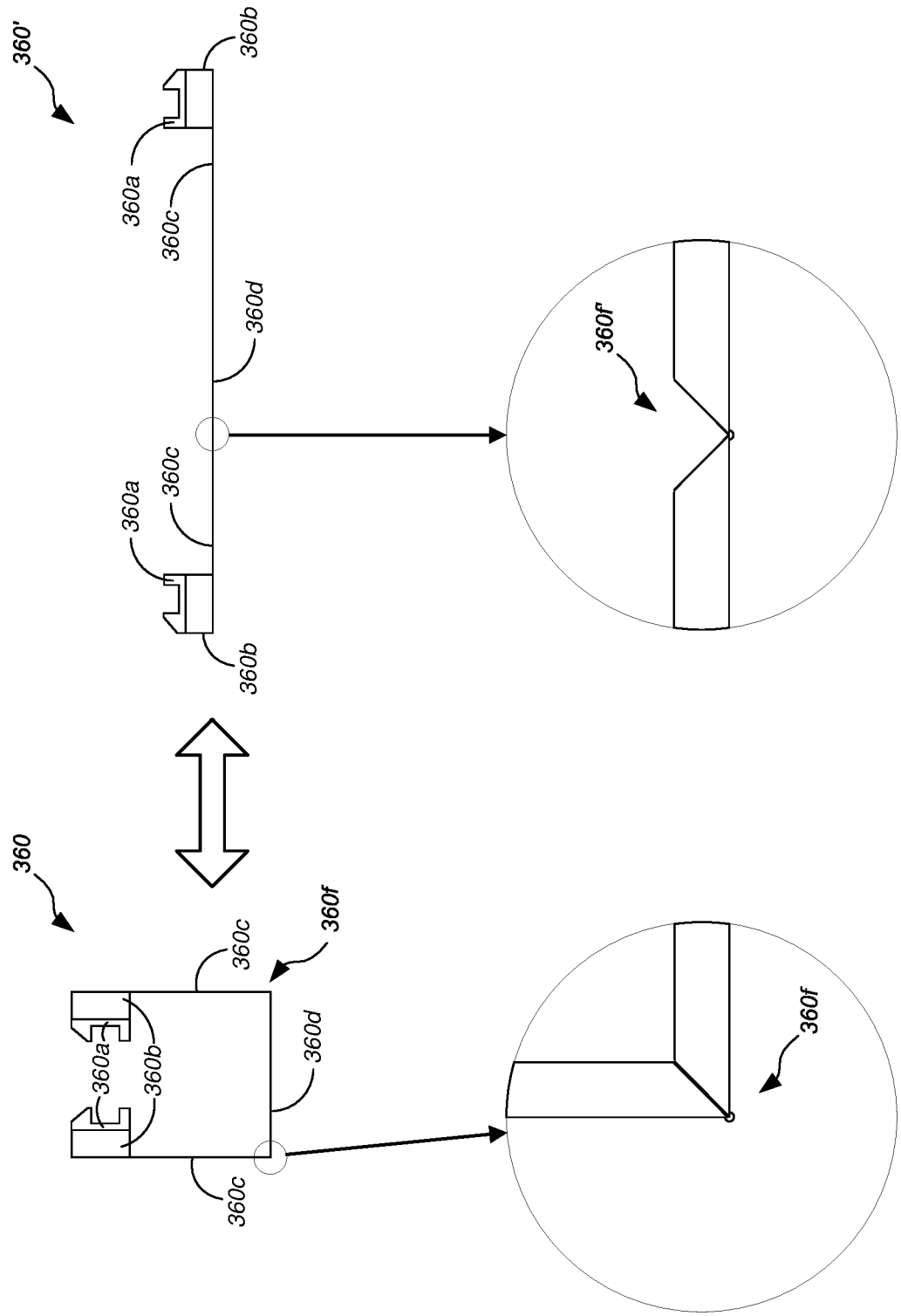

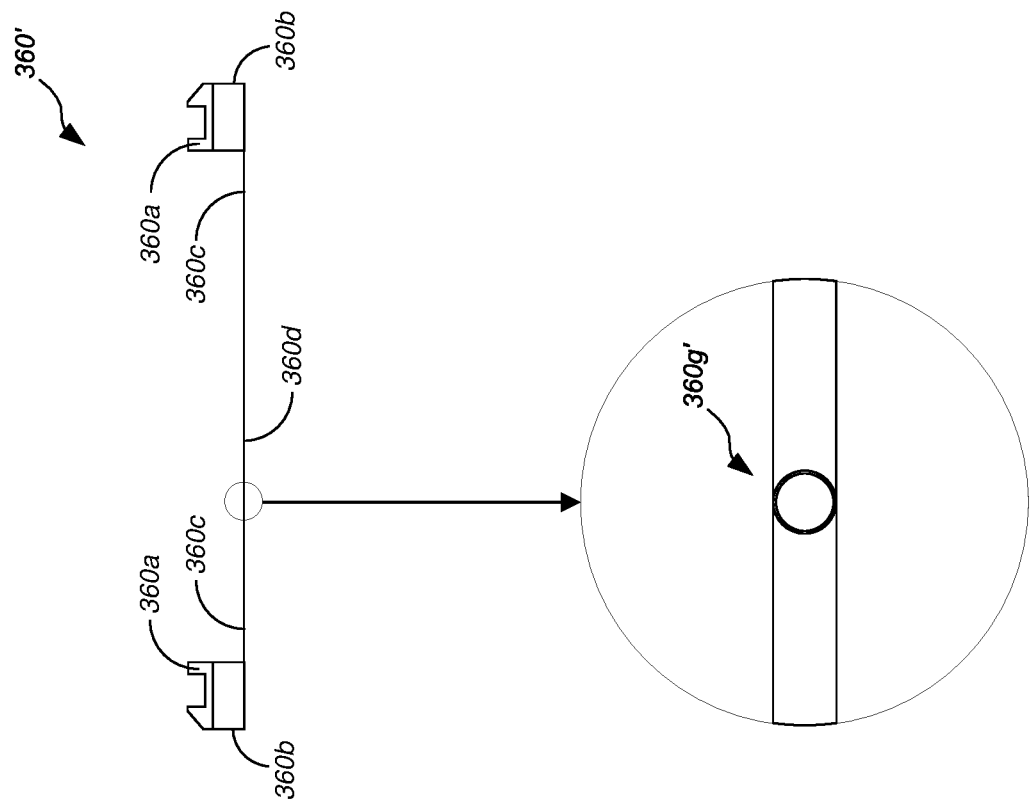
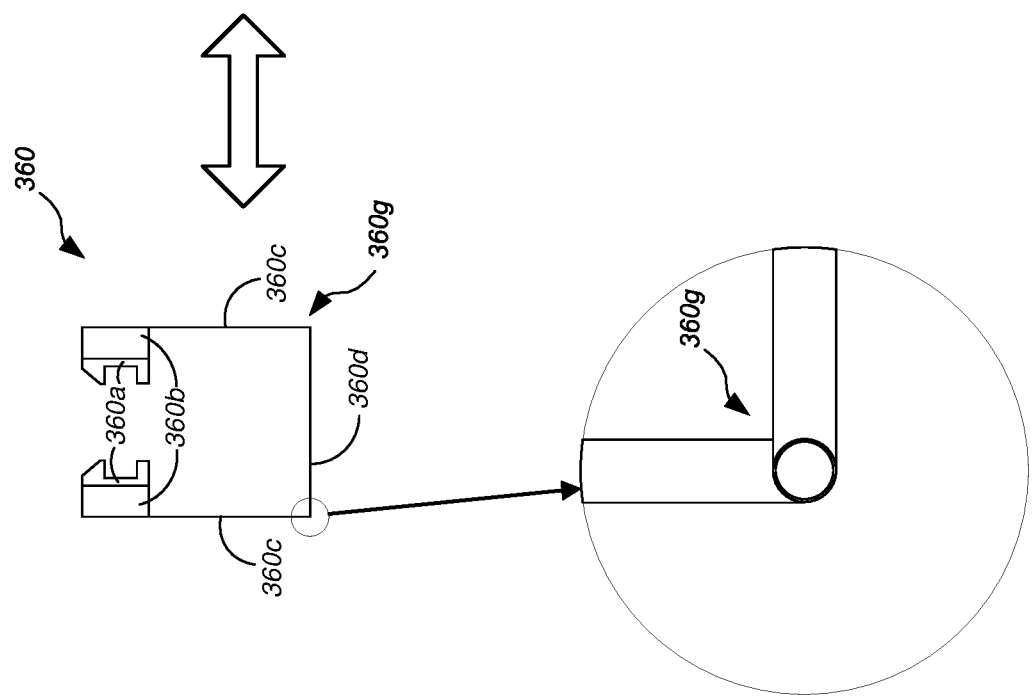
Fig. 7K
Fig. 7J

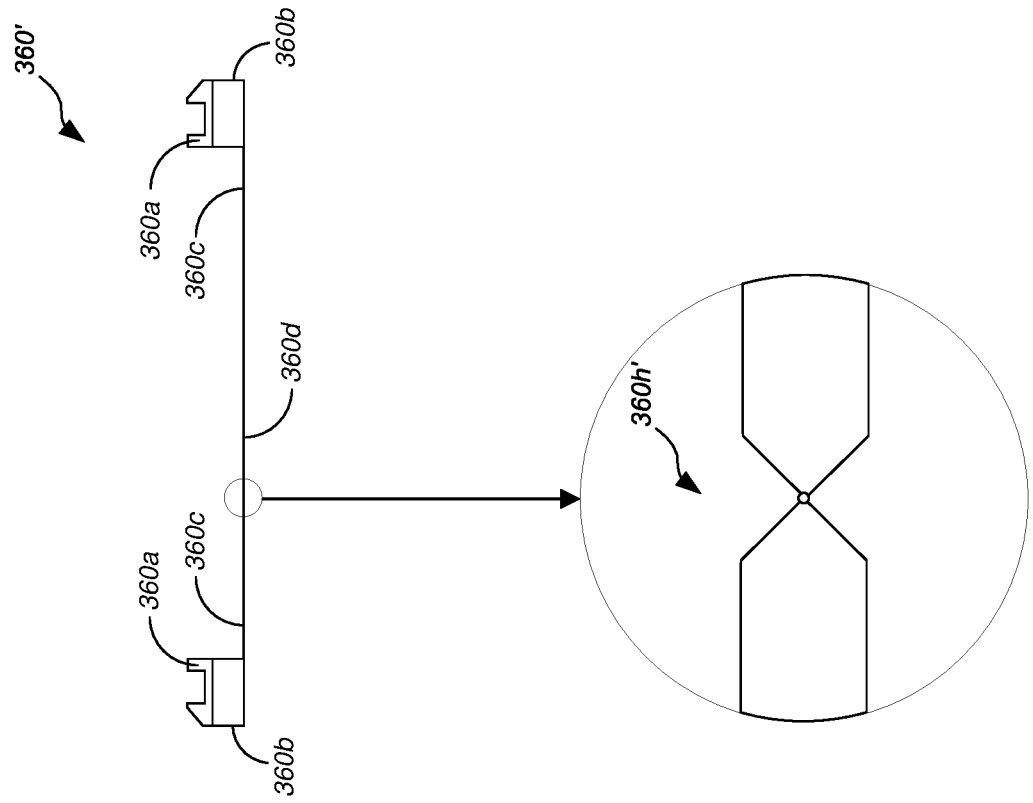
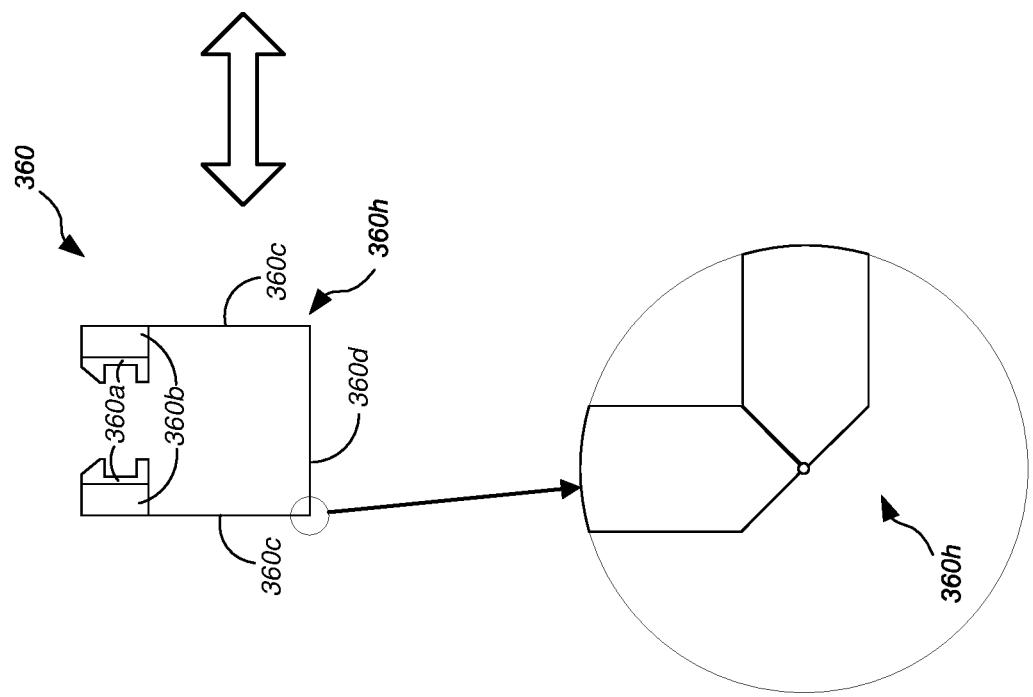

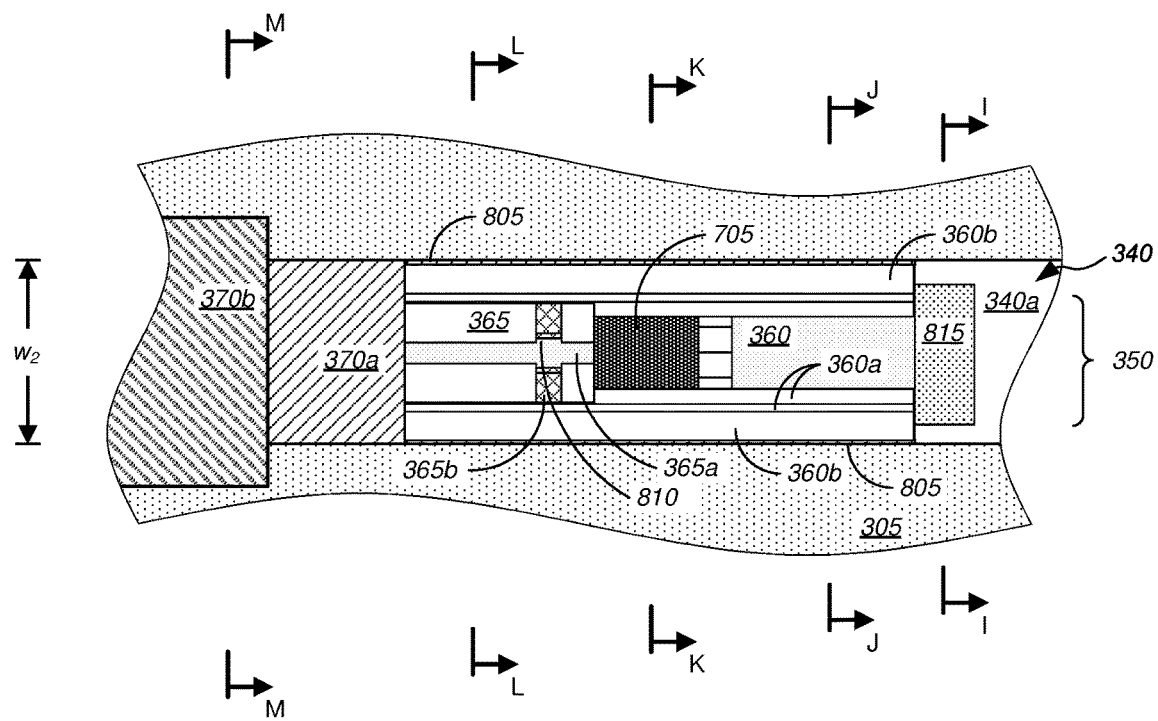
Fig. 8A
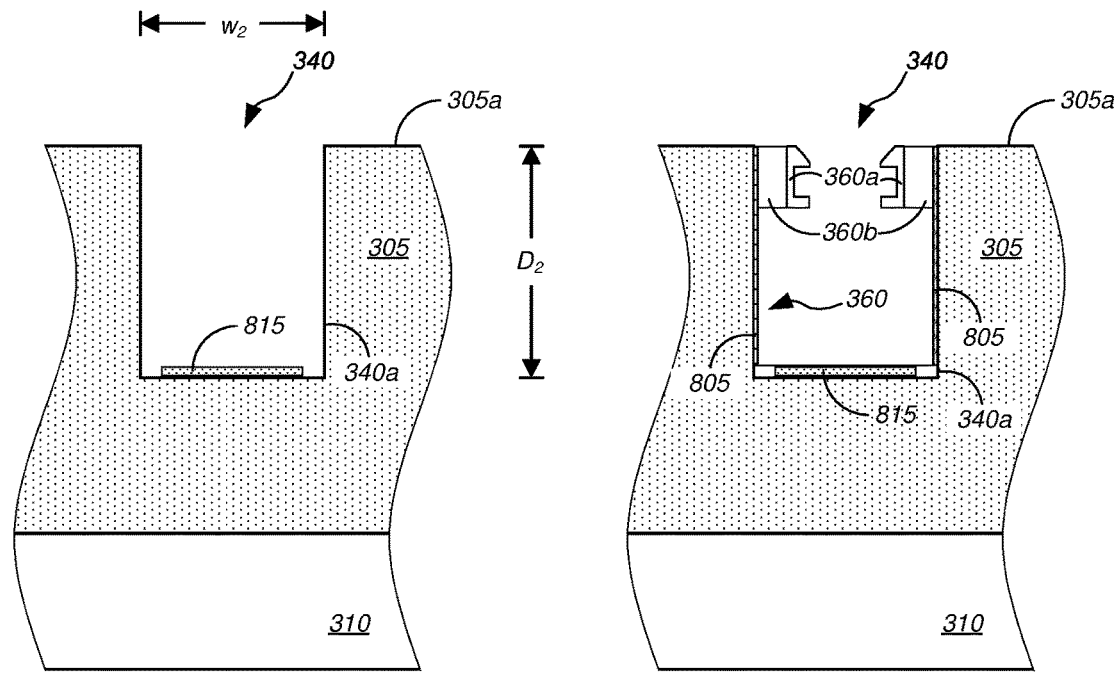
Fig. 8B
Fig. 8C

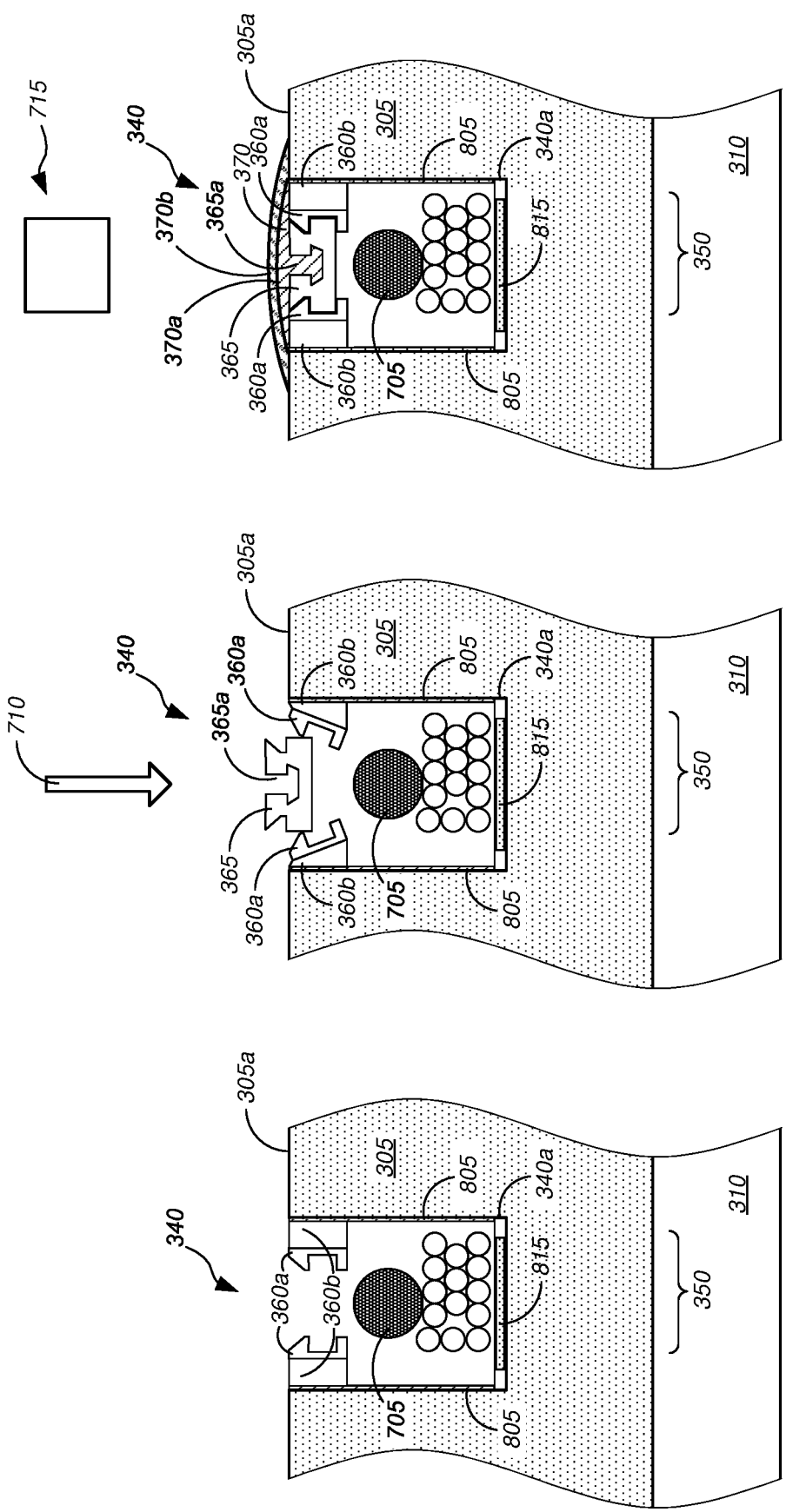

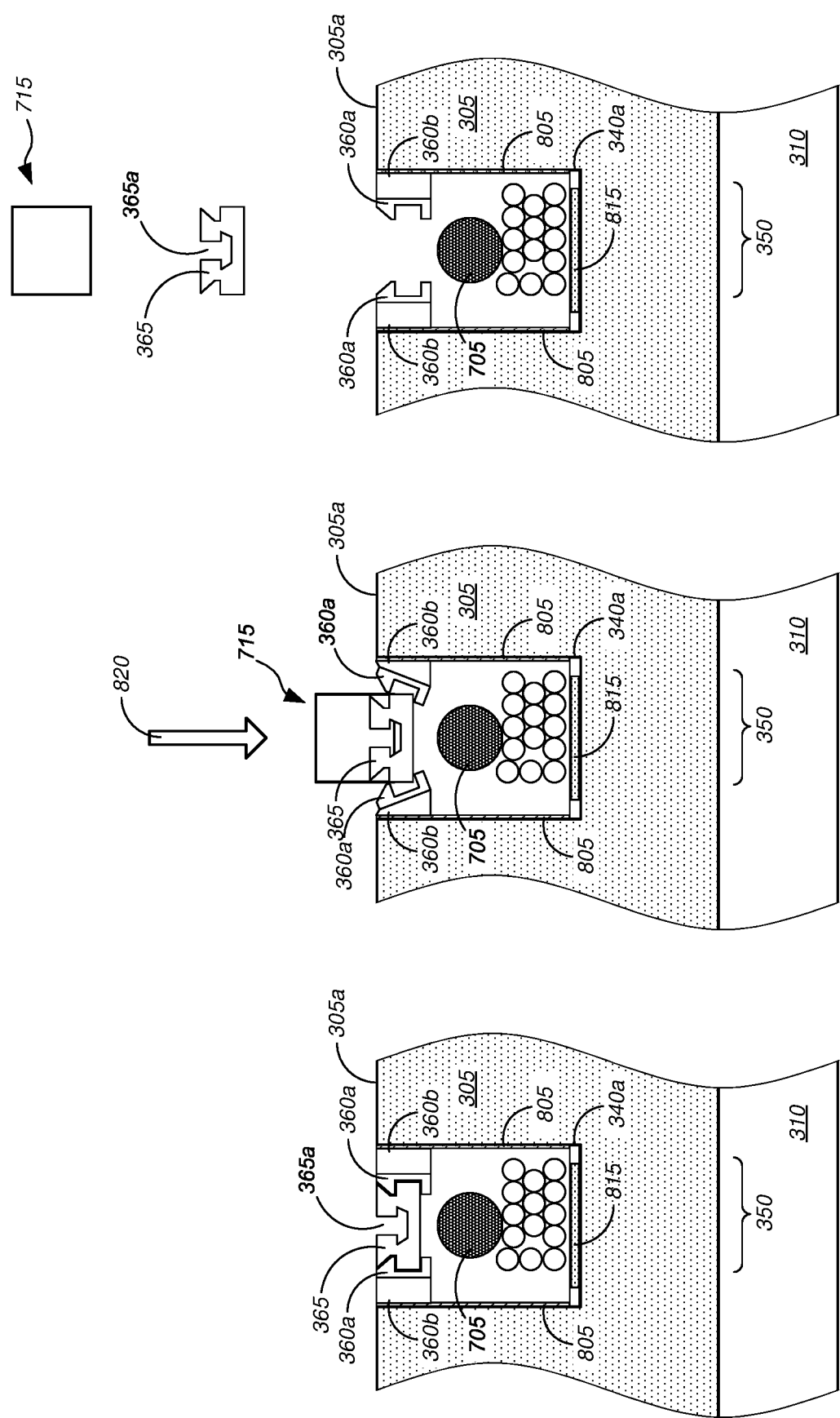

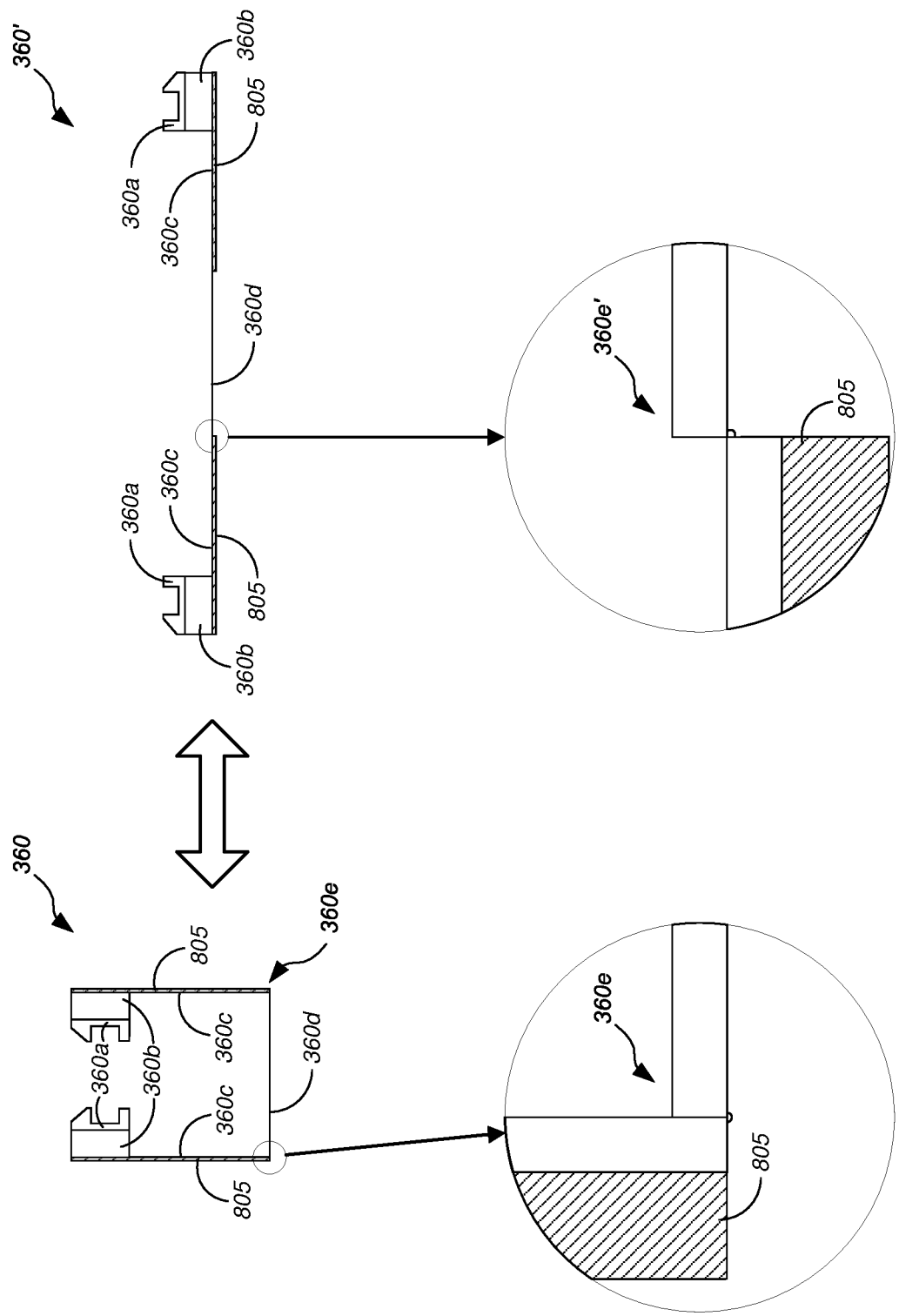

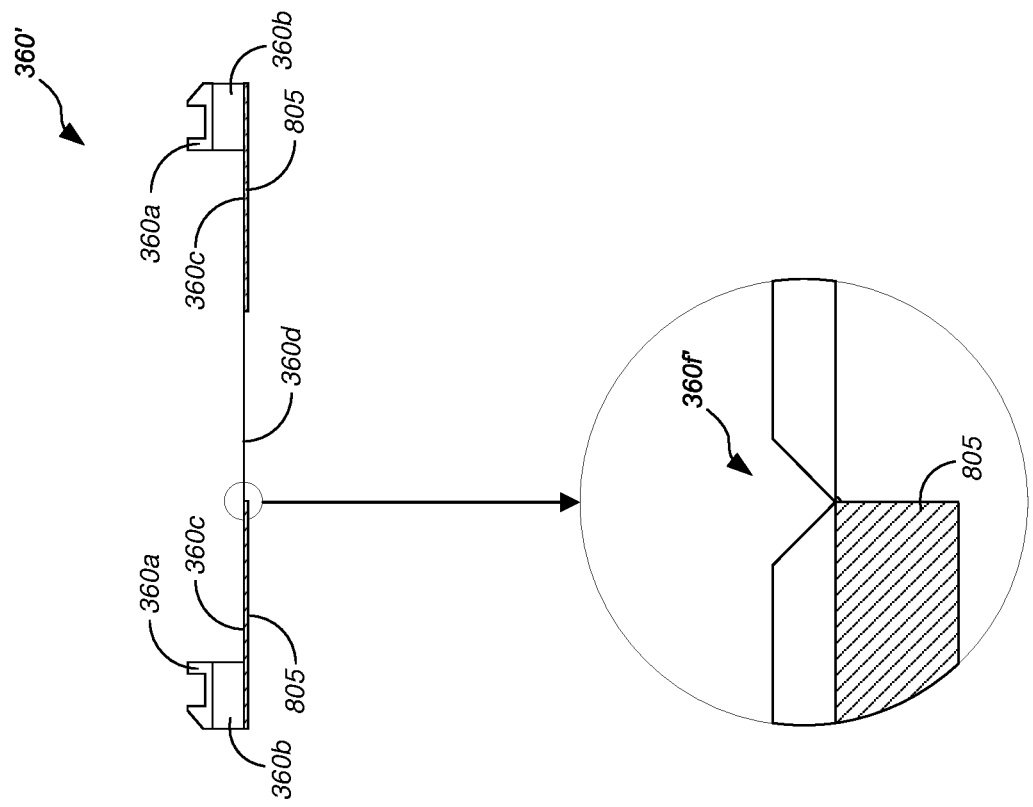
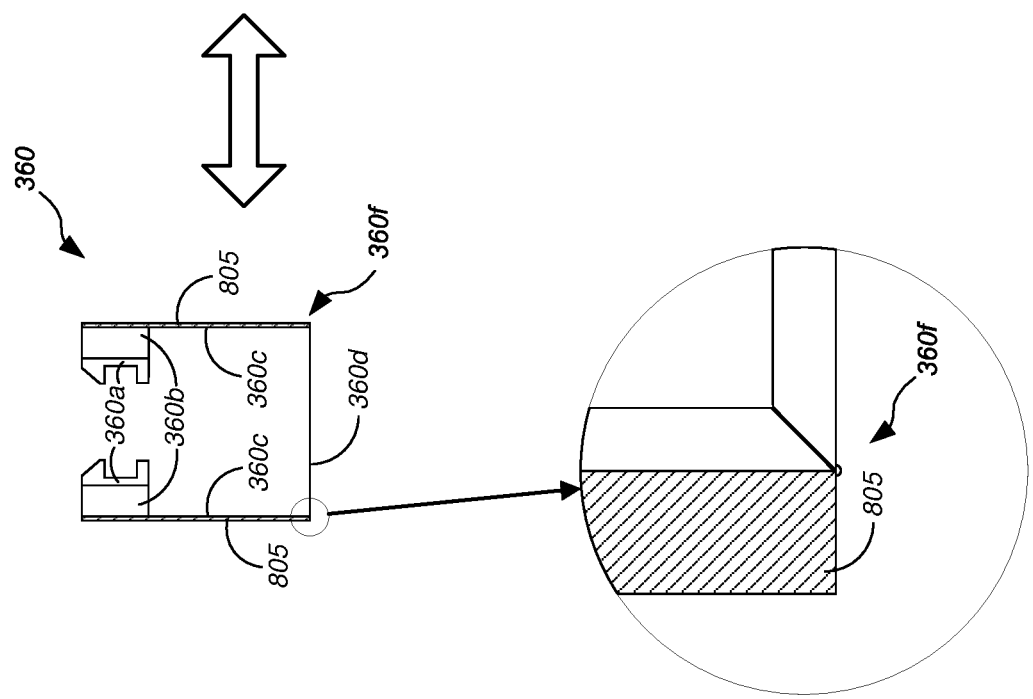

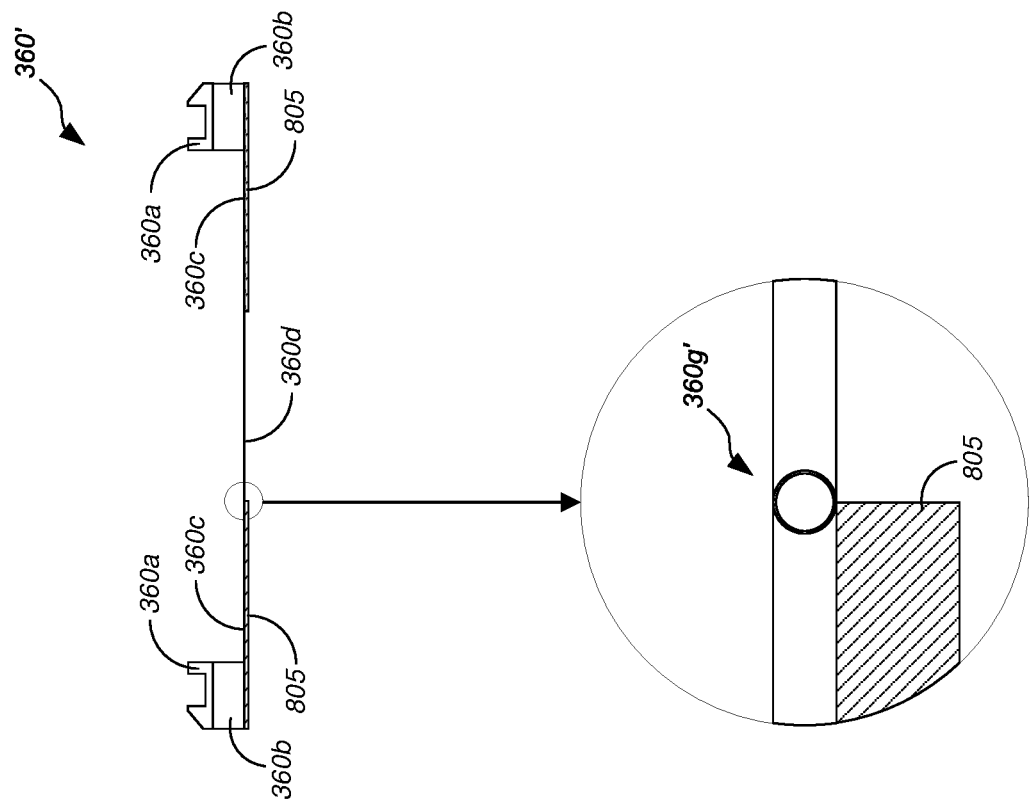
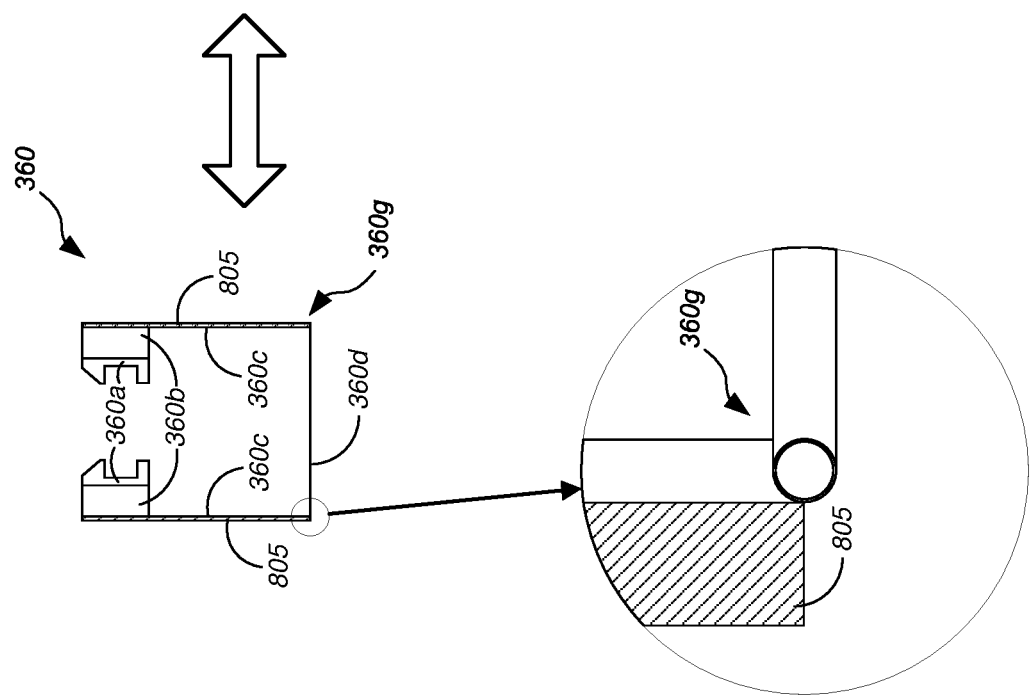

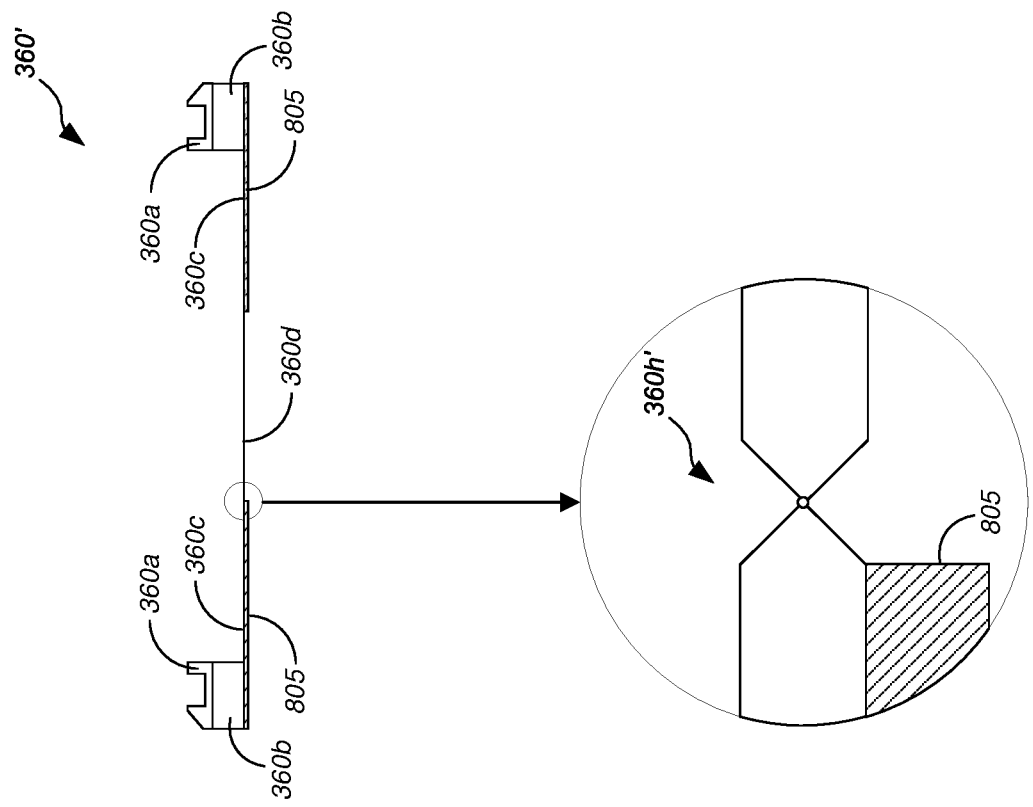
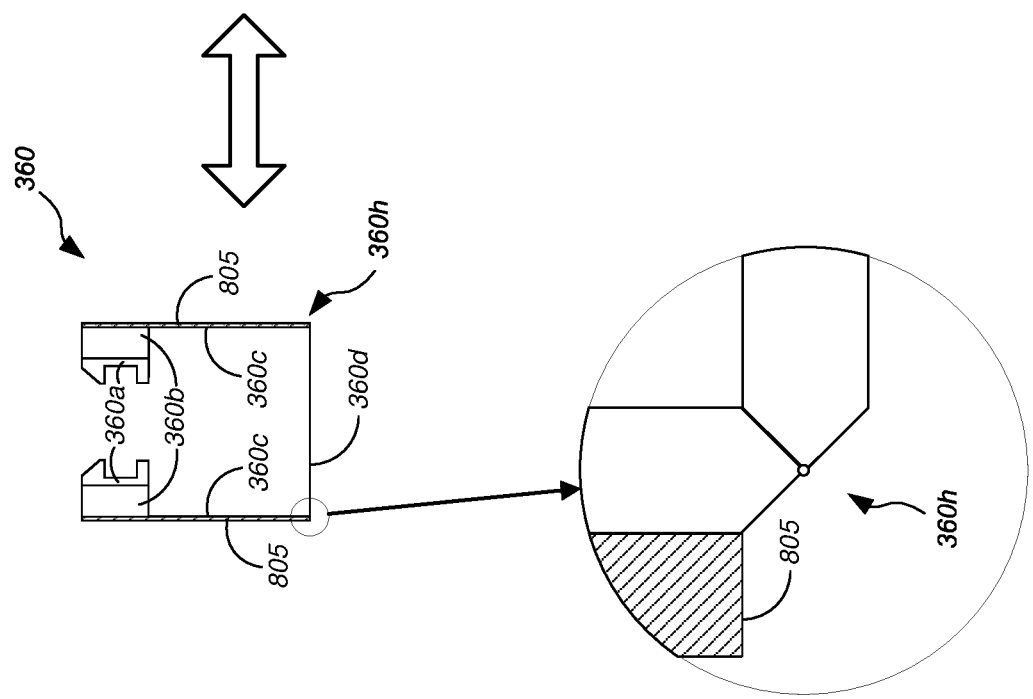
Fig. 8Q
Fig. 8P

APICAL CONDUIT METHOD AND SYSTEM

CROSS-REFERENCES TO RELATED APPLICATIONS

This application is a continuation of U.S. patent application Ser. No. 15/866,624 (the "'624 Application"), filed Jan. 10, 2018 by Michael L. Elford et al., entitled, "Apical Conduit Method and System," which claims priority to U.S. Patent Application Ser. No. 62/444,667 (the "'667 Application"), filed Jan. 10, 2017 by Michael L. Elford et al., entitled, "Apical Fiber," the entire teachings of which are incorporated herein by reference in their entirety for all purposes.

This application may be related to U.S. patent application Ser. No. 14/578,851 (the "'851 Application"), filed Dec. 22, 2014 by Michael L. Elford et al., entitled, "Point-to-Point Fiber Insertion," which claims priority to U.S. Patent Application Ser. No. 61/939,109 (the "'109 Application"), filed Feb. 12, 2014 by Michael L. Elford et al., entitled, "Point-to-Point Fiber Insertion." This application is also a continuation-in-part application of U.S. patent application Ser. No. 14/517,574 (the "'574 Application"), filed on Oct. 17, 2014 by Michael L. Elford et al., entitled, "Fiber-to-the-Premises (FTTP) Methods and Systems," which claims priority to U.S. Patent Application Ser. No. 61/893,034 (the "'034 Application"), filed Oct. 18, 2013 by Michael L. Elford et al., entitled, "Fiber-to-the-Home (FTTH) Methods and Systems."

This application may also be related to U.S. Patent Application Ser. No. 61/874,691 (the "'691 Application"), filed Sep. 6, 2013 by Thomas Schwengler et al., entitled, "Wireless Distribution Using Cabinets, Pedestals, and Hand Holes"; U.S. patent application Ser. No. 14/316,676 (the "'676 Application"), filed on Jun. 26, 2014 by Thomas Schwengler et al., entitled, "Wireless Distribution Using Cabinets, Pedestals, and Hand Holes," which claims priority to the '691 Application"; U.S. Patent Application Ser. No. 61/861,216 (the "'216 Application"), filed Aug. 1, 2013 by Thomas Schwengler et al., entitled, "Wireless Access Point in Pedestal or Hand Hole"; and U.S. patent application Ser. No. 14/316,665 (the "'665 Application"), filed on Jun. 26, 2014 by Thomas Schwengler et al., entitled, "Wireless Access Point in Pedestal or Hand Hole," which claims priority to the '216 Application. This application may also be related to U.S. Patent Application Ser. No. 61/793,514 (the "'514 Application"), filed Mar. 15, 2013 by Erez N. Allouche et al., entitled, "Cast-in-Place Fiber Technology"; U.S. patent application Ser. No. 14/209,754 (the "'754 Application"), filed Mar. 13, 2014 by Erez N. Allouche et al., entitled, "Cast-in-Place Fiber Technology," which claims priority to the '514 Application; U.S. Patent Application Ser. No. 61/604,020 (the "'020 Application"), filed Feb. 28, 2012 by Michael L. Elford et al., entitled, "Apical Conduit and Methods of Using Same," U.S. Patent Application Ser. No. 61/636,227 (the "'227 Application"), filed Apr. 20, 2012 by Michael L. Elford et al., entitled, "Apical Conduit and Methods of Using Same"; and U.S. patent application Ser. No. 13/779,488 (the "'488 Application"), filed Feb. 27, 2013 by Michael L. Elford et al., entitled, "Apical Conduit and Methods of Using Same," which claims priority to the '020 and '227 Applications.

This application may also be related to U.S. patent application Ser. No. 14/973,470 (the "'470 Application"), filed Dec. 17, 2015 by Michael L. Elford et al., entitled, "Apical Filler Layers," which claims priority to U.S. Patent Application Ser. No. 62/188,110 (the "'110 Application"), filed Jul. 2, 2015 by Michael L. Elford et al., entitled, "Apical Filler Layers"; U.S. patent application Ser. No. 14/973,460 (the "'460 Application"), filed Dec. 17, 2015 by Thomas Schwengler et al., entitled, "Apical Radiator," which claims priority to U.S. Patent Application Ser. No. 62/127,701 (the "'701 Application"), filed Mar. 3, 2015 by Thomas Schwengler et al., entitled, "Apical Radiator" and U.S. Patent Application Ser. No. 62/188,100 (the "'100 Application"), filed Jul. 2, 2015 by Thomas Schwengler et al., entitled, "Apical Radiator"; U.S. patent application Ser. No. 14/973,458 (the "'458 Application"), filed Dec. 17, 2015 by Thomas C. Barnett, Jr. et al., entitled, "Touchless Fiber Network," which claims priority to U.S. Patent Application Ser. No. 62/127,699 (the "'699 Application"), filed Mar. 3, 2015 by Thomas C. Barnett, Jr. et al., entitled, "Touchless Fiber Network"; and U.S. patent application Ser. No. 14/971,243 (the "'243 Application"), filed Dec. 16, 2015 by Michael L. Elford et al., entitled, "MediaLink Interconnection Box," which claims priority to U.S. Patent Application Ser. No. 62/109,757 (the "'757 Application"), filed Jan. 30, 2015 by Michael L. Elford et al., entitled, "MediaLink Interconnection Box (MIB)."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses pertaining to installation of telecommunications signal relays, and, more particularly, to a method of installing optical fiber or other telecommunications cables in a ground surface (including, without limitation, a paved surface) and a system used in installation of optical fiber or other telecommunications cables in a ground surface (including, without limitation, a paved surface).

BACKGROUND

Current construction methods for the installation of small conduits and cables consist of excavation equipment, vibratory flows (mainly in green field settings), and various trenchless construction methods such as directional drilling and impact moles. While trenchless methods greatly reduce the surface disturbance, they are associated with significant costs. While these costs can be justified for the placement of natural gas lines or water mains, where the vendor has exclusivity and is assured a very high market penetration, the cost is difficult to justify when laying very small diameter fiber optics where initial market penetration may be only 30-35% and the vendor must operate in an aggressive competitive market environment. While the related applications describe techniques to overcome the conventional methods for installation of small conduits and cables, further improvement to even the advanced techniques of the related applications would yield greater efficiencies and cost savings.

Hence, there is a need for more robust and scalable solutions for implementing an improved method of installing optical fiber or other telecommunications cables in a ground surface (including, without limitation, a paved surface) and an improved system used in installation of optical fiber or other telecommunications cables in a ground surface (including, without limitation, a paved surface).

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 2A-2J are general schematic diagrams illustrating various ground-based signal distribution devices that may be used in implementing FTTP and/or point-to-point fiber insertion within a PON communications system and/or for implementing installation of optical fiber, other telecommunications cables, and/or power lines in a ground surface, in accordance with various embodiments.

FIGS. 4A and 4B are general schematic diagrams illustrating various views of a system for communicatively coupling lines within an apical conduit system and lines within a direct bury network access point ("NAP") for implementing FTTP and/or point-to-point fiber insertion within a PON communications system and/or for implementing installation of optical fiber, other telecommunications cables, and/or power lines in a ground surface, in accordance with various embodiments.

FIGS. 5A and 5B are general schematic diagrams illustrating various views of a system for communicatively coupling lines within an apical conduit system and lines within a hand hole for implementing FTTP and/or point-to-point fiber insertion within a PON communications system and/or for implementing installation of optical fiber, other telecommunications cables, and/or power lines in a ground surface, in accordance with various embodiments.

FIGS. 6A and 6B are general schematic diagrams illustrating various views of a system for communicatively coupling lines within an apical conduit system and lines within a hand hole routed from a NAP through a cross-slot in a road surface for implementing FTTP and/or point-to-point fiber insertion within a PON communications system and/or for implementing installation of optical fiber, other telecommunications cables, and/or power lines in a ground surface, in accordance with various embodiments.

FIGS. 7A-7M are general schematic diagrams illustrating various views of an embodiment for installation of optical fiber, other telecommunications cables, and/or power lines in a ground surface.

FIGS. 8A-8Q are general schematic diagrams illustrating various views of another embodiment for installation of optical fiber, other telecommunications cables, and/or power lines in a ground surface.

DETAILED DESCRIPTION OF CERTAIN EMBODIMENTS

Overview

Figure 1A:
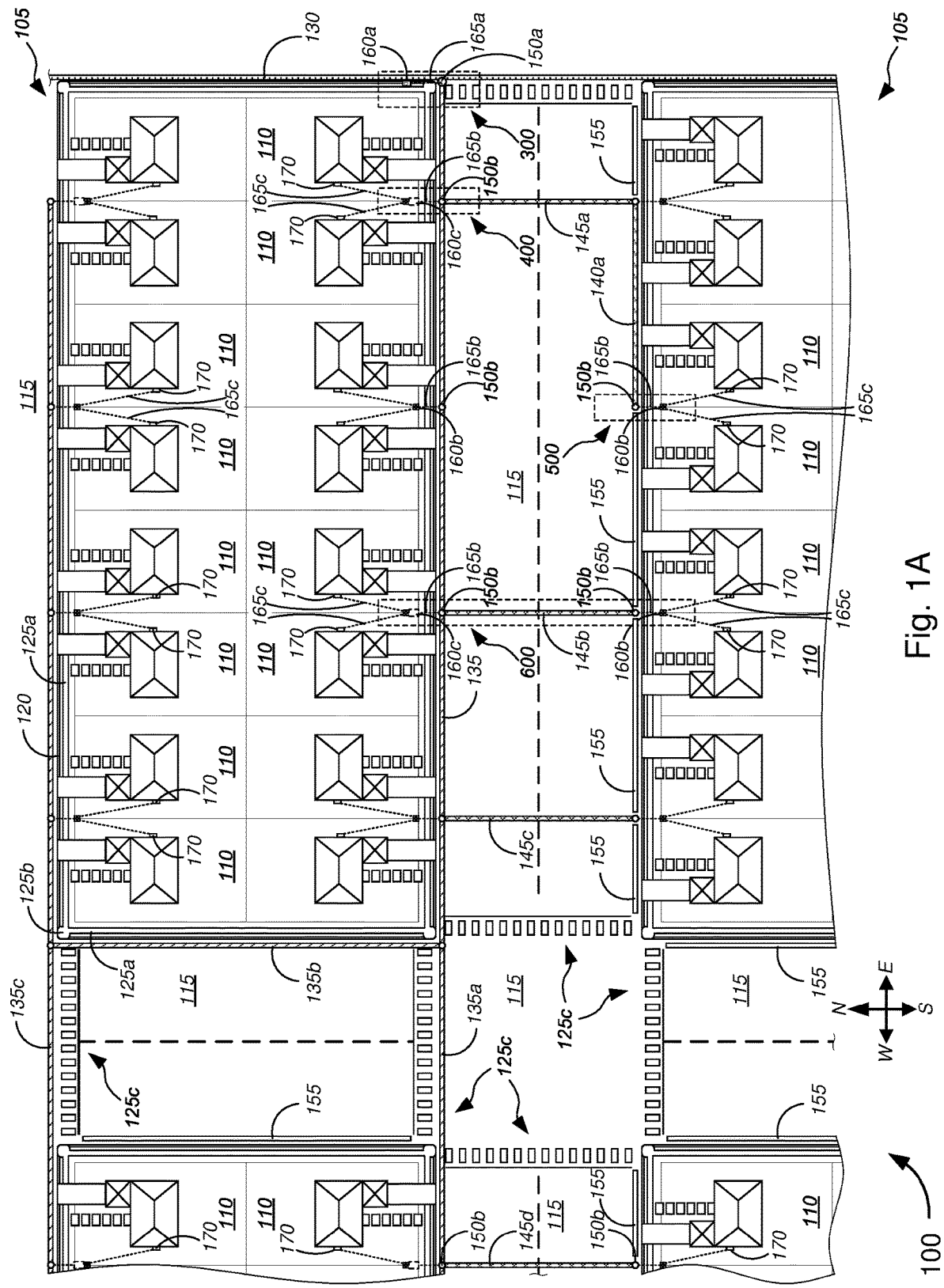
FIGS. 1A and 1B are general schematic diagrams illustrating systems for implementing Fiber-to-the-Premises ("FTTP") and/or point-to-point fiber insertion within a passive optical network ("PON") communications system and/or for implementing installation of optical fiber, other telecommunications cables, and/or power lines in a ground surface, in accordance with various embodiments.

Various embodiments provide tools and techniques for implementing an improved method of installing optical fiber or other telecommunications cables in a ground surface (including, without limitation, a paved surface) and an improved apparatus and system used in installation of optical fiber or other telecommunications cables in a ground surface (including, without limitation, a paved surface).

In various embodiments, a foldable base might be placed in a channel in a ground surface. The foldable base might comprise a base portion, two side wall portions, at least two points of articulation, and two plug contacts, each point of articulation separating the base portion from one of the two side wall portions and allowing each side wall portion to fold relative with the base portion. Each plug contact is disposed at an end of each side wall portion opposite from the corresponding point of articulation. The base portion, when placed in the channel, lies longitudinally along a bottom of the channel and the two side wall portions are in contact with sides of the channel. One or more lines may be placed within a cavity formed by folding of the two side wall portions relative to the base portion of the foldable base that is placed in the channel in the ground surface. A plug may be placed above the one or more lines that are placed in the cavity, the plug engaging with the two plug contacts of the foldable base to secure the plug in place relative to the foldable base in the channel. The plug might comprise a top surface and a microchannel along the top surface, the microchannel being parallel with the channel when the plug engages with the two plug contacts of the foldable base when the foldable base is placed in the channel. One or more layers of capping material may then be placed in the microchannel, the one or more layers of capping material flowing beyond the microchannel and over any openings between the plug and the foldable base and between the foldable base and edges of the channel.

According to some embodiments, at least one of the one or more lines might comprise at least one of one or more telecommunications lines, one or more power lines, one or more optical fiber cables, one or more non-fiber cables, or one or more conduits, and/or the like. In some cases, each of the two plug contacts of the foldable base might comprise deformable portions that allow the two plug contacts to deform when the plug makes contact and mates with the two plug contacts of the foldable base. In some instances, the deformable portions might comprise gel material or the like.

In some embodiments, the foldable base might further comprise at least two sets of friction fingers, wherein when the foldable base is placed in the channel, each set of friction fingers is disposed along a side wall portion between the side wall portion and the corresponding side of the channel, the at least two sets of friction fingers engaging against the sides of the channel to secure the foldable base in place within the channel.

In some cases, prior to placing the foldable base in the channel, an adhesive (or tack coat) layer might be placed in the channel, and the adhesive (or tack coat) layer might be allowed to set while the foldable base is placed thereon so as to hold the foldable base in place within the channel. In some instances, prior to placing the plug above the one or more lines, a swellable joint filler tape might be placed above the one or more lines to fill the cavity above the one or more lines.

These and other aspects of the various embodiments (which are described in detail below with respect to the figures) resolve challenges associated with deploying fiber optic cable (as well as non-fiber cables and/or power lines) in roadways or other ground surfaces in a cost effective manner. Although the apical conduit systems as described in the Related Applications (which have already been incorporated herein by reference in their entirety for all purposes), the various embodiments described herein provide a further improved system and method that allows for even greater ease in construction and access in the event of fiber or other line damage (or for expansion or redistribution of line connections), while also limiting the need for costly backfill materials and labor.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a method might comprise placing a foldable base in a channel in a ground surface. The foldable base might comprise a base portion, two side wall portions, at least two points of articulation, and two plug contacts. Each point of articulation might separate the base portion from one of the two side wall portions and might allow each side wall portion to fold relative with the base portion. Each plug contact might be disposed at an end of each side wall portion opposite from the corresponding point of articulation. The base portion, when placed in the channel, might lie longitudinally along a bottom of the channel and the two side wall portions are in contact with sides of the channel. The method might also comprise placing one or more lines within a cavity formed by folding of the two side wall portions relative to the base portion of the foldable base that is placed in the channel in the ground surface, and placing a plug above the one or more lines that are placed in the cavity, the plug engaging with the two plug contacts of the foldable base to secure the plug in place relative to the foldable base in the channel. The plug might comprise a top surface and a microchannel along the top surface, the microchannel being parallel with the channel when the plug engages with the two plug contacts of the foldable base when the foldable base is placed in the channel. The method might further comprise placing one or more layers of capping material in the microchannel, the one or more layers of capping material flowing beyond the microchannel and over any openings between the plug and the foldable base and between the foldable base and edges of the channel.

In some embodiments, at least one of the one or more lines might comprise at least one of one or more telecommunications lines, one or more power lines, one or more optical fiber cables, one or more non-fiber cables, or one or more conduits, and/or the like. In some cases, the two points of articulation might each comprise one of a folding groove, a folding crease, or a hinge, and/or the like.

According to some embodiments, the plug might further comprise side engagement contacts on either side of the plug, wherein each of the two plug contacts might comprise a complementary engagement contact that mates with a corresponding one of the side engagement contacts of the plug, wherein the plug engaging with the two plug contacts of the foldable base to secure the plug in place relative to the foldable base in the channel might comprise the side engagement contacts of the plug engaging with the corresponding complementary engagement contacts of the two plug contacts of the foldable base to secure the plug in place relative to the foldable base in the channel. In some cases, one set of side engagement contact and corresponding complementary engagement contact might be symmetrical with the other set of side engagement contact and corresponding complementary engagement contact. In some instances, each of the two plug contacts of the foldable base might comprise deformable portions that allow the two plug contacts to deform when the plug makes contact and mates with the two plug contacts of the foldable base. In some cases, the deformable portions might comprise gel material.

In some embodiments, the foldable base might further comprise at least two sets of friction fingers, wherein when the foldable base is placed in the channel, each set of friction fingers is disposed along a side wall portion between the side wall portion and the corresponding side of the channel, the at least two sets of friction fingers engaging against the sides of the channel to secure the foldable base in place within the channel. In some cases, the plug might further comprise one or more maintenance access slots that are disposed at intervals along a longitudinal length of the plug, each maintenance access slot being perpendicular to the longitudinal length of the plug. In some instances, at least one of the one or more layers of capping material might comprise a shearable top coat.

According to some embodiments, the method might further comprise placing an adhesive layer in the channel prior to placing the foldable base in the channel. In some cases, the method might further comprise placing a swellable joint filler tape above the one or more lines in the cavity prior to placing the plug above the one or more lines. In some embodiments, the method might further comprise spreading, using a spreader tool, the one or more layers of capping material over the plug and over any openings between the plug and the foldable base and between the foldable base and edges of the channel.

In another aspect, a system might comprise a foldable base, a plug, and one or more layers of capping material. The foldable base might comprise a base portion; two side wall portions; at least two points of articulation; and two plug contacts. Each point of articulation might separate the base portion from one of the two side wall portions and might allow each side wall portion to fold relative with the base portion. Each plug contact might be disposed at an end of each side wall portion opposite from the corresponding point of articulation. The base portion, when placed in a channel in a ground surface, might lie longitudinally along a bottom of the channel and the two side wall portions are in contact with sides of the channel. When placed in the channel in the ground surface, the two side wall portions might fold relative to the base portion of the foldable base to form a cavity, wherein one or more lines are placed in the cavity.

The plug might comprise a top surface and a microchannel along the top surface. The plug, when placed above the one or more lines that are placed in the cavity, engages with the two plug contacts of the foldable base to secure the plug in place relative to the foldable base in the channel, wherein the microchannel is parallel with the channel when the plug is engaged with the two plug contacts.

After the plug engages with the two plug contacts of the foldable base, the one or more layers of capping material might form a layer that flows beyond the microchannel and over any openings between the plug and the foldable base and between the foldable base and edges of the channel.

In some embodiments, at least one of the one or more lines might comprise at least one of one or more telecommunications lines, one or more power lines, one or more optical fiber cables, one or more non-fiber cables, or one or more conduits, and/or the like. In some cases, the two points of articulation might each comprise one of a folding groove, a folding crease, or a hinge, and/or the like.

According to some embodiments, the plug might further comprise side engagement contacts on either side of the plug, wherein each of the two plug contacts might comprise a complementary engagement contact that mates with a corresponding one of the side engagement contacts of the plug, wherein the plug engaging with the two plug contacts of the foldable base to secure the plug in place relative to the foldable base in the channel might comprise the side engagement contacts of the plug engaging with the corresponding complementary engagement contacts of the two plug contacts of the foldable base to secure the plug in place relative to the foldable base in the channel. In some cases, one set of side engagement contact and corresponding complementary engagement contact might be symmetrical with the other set of side engagement contact and corresponding complementary engagement contact. In some instances, each of the two plug contacts of the foldable base might comprise deformable portions that allow the two plug contacts to deform when the plug makes contact and mates with the two plug contacts of the foldable base. In some cases, the deformable portions might comprise gel material.

In some embodiments, the foldable base might further comprise at least two sets of friction fingers, wherein when the foldable base is placed in the channel, each set of friction fingers is disposed along a side wall portion between the side wall portion and the corresponding side of the channel, the at least two sets of friction fingers engaging against the sides of the channel to secure the foldable base in place within the channel. In some cases, the plug might further comprise one or more maintenance access slots that are disposed at intervals along a longitudinal length of the plug, each maintenance access slot being perpendicular to the longitudinal length of the plug. In some instances, at least one of the one or more layers of capping material might comprise a shearable top coat.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Merely by way of example, in some embodiments, antenna structures might be implemented to optimize transmission and reception of wireless signals from ground-based signal distribution devices, which include, but are not limited to, FDH, hand holes, and/or NAPs. In some cases, antenna structures might also be implemented within devices (e.g., wireless access point devices) that are imbedded or located within apical conduit channels, as described in detail in the '574 Application and in the '460 Application, both of which have been incorporated herein by reference in their entirety. Wireless applications with such devices and systems might include, without limitation, wireless signal transmission and reception in accordance with IEEE 802.11a/b/g/n/ac/ad/af standards, UMTS, CDMA, LTE, PCS, AWS, EAS, BRS, and/or the like. In some embodiments, an antenna might be provided within a signal distribution device, which might include a container disposed in a ground surface. A top portion of the container might be substantially level with a top portion of the ground surface. The antenna might be communicatively coupled to one or more of at least one conduit, at least one optical fiber line, at least one conductive signal line, or at least one power line via the container and via an apical conduit system(s) installed in a roadway.

According to some embodiments, the methods, apparatuses, and systems might be applied to 2.4 GHz and 5 GHz wireless broadband signal distribution as used with today's IEEE 802.11a/b/g/n/ac lines of products. Given the low profile devices, such methods, apparatuses, and systems may also be applicable to upcoming TV white spaces applications (and the corresponding IEEE 802.11af standard). In addition, small cells at 600 MHz and 700 MHz may be well-suited for use with these devices. In some embodiments, higher frequencies can be used such as 60 GHz and the corresponding standard IEEE 802.11ad. The '574, '216, and '665 Applications and the '460 Application, which have been incorporated herein by reference in their entirety, describe in further detail embodiments utilizing wireless access points based on IEEE 801.11ad and a system of ground-based signal distribution devices having these 60 GHz wireless access points disposed therein that are in line of sight of the customer premises. Methods for placing, powering, and backhauling radio access units using a combination of existing copper lines, cabinets, pedestals, hand holes, new power lines, new optical fiber connections to the customer premises, placement of radio equipment in pedestals or hand holes, and/or the like, via use of apical conduit systems are described in detail in the '034, '574, '691, '676, '216, and '665 Applications, which are already incorporated herein by reference in their entirety.

According to some embodiments, a method may be provided for repairing any damage to any of the lines within apical conduit systems. Such a method might include locating the damage in the lines, removing the capping material over a predetermined length (e.g., 30 ft) approximately centered about the damage in the line, removing the filler material encapsulating the damaged line(s) and/or microduct(s) to expose first ends and second ends of the damaged line(s) and/or microduct(s), and lifting the first ends and the second ends of the damaged line(s) and/or microduct(s) from the channel of the source/main/cross/far-side slot of the apical conduit system. The method might further include, without limitation, splicing the first ends and the second ends of the damaged line(s) and/or microduct(s) with splices (and in some cases, service loops), placing the spliced damaged line(s) and/or microduct(s) in the channel (in some instances, within a splice box that has been placed in the channel, e.g., during the repair process), placing the filler material in the channel, and placing the capping material in the channel over the filler material. Such repair techniques are described in detail in the '574 Application.

Some advantages of the systems described herein include, without limitation, relatively low cost, efficiency, flexibility, system strength and reliability, minimal ecological impact, visual unobstructiveness, and/or the like, especially in conjunction with the use of surface trenching techniques as applied to apical conduit systems and the use of ground-based signal distribution systems. Herein, surface trenching refers to a technique that is not unlike conventional micro-trenching techniques, except that trenching is within the top layer (e.g., asphalt layer or concrete layer, etc.) and not below the top layer. In conventional micro-trenching techniques, trenches might extend 12 to 18 inches below the surface of the top layer, and in some cases deeper (reaching below the top layer into or beyond a sub-base layer). In contrast, for surface trenching, trenches might extend a few inches (e.g., 2 to 6 inches), while remaining within the top layer (and not deeper than the top layer). Because surface trenching for apical conduit systems require smaller profile channels or trenches compared to other buried solutions, labor costs and/or equipment costs may be kept low. Surface trenching also allows for flexibility in terms of routing and laying channels and surface trenches, relatively high system strength due to the use of polyurea and/or other thermosetting materials that have been proven in lab tests to have similar (and sometimes better) strength characteristics compared to asphalt (in which the channels or surface trenches are laid) thus leading to reliability, minimal ecological impact due to similar impact compared to asphalt and the like, efficiency in terms of implementing FTTP using apical conduit system techniques and in terms of line repair (as described above).

Surface trenching also has an important advantage of better preserving the structural integrity of the road compared with micro-trenching, as it leaves intact the lower layers that are important for long term integrity of the road. Further, visual unobstructiveness may be achieved by the use of the apical conduit system laid in roadway and other ground surfaces, in conjunction with ground-based signal distribution devices, including a FDH (which includes a pedestal-based FDH with only its pedestal extending above ground surface or a non-pedestal FDH whose lid is substantially level with a ground surface), a NAP(s) (which may be a direct buried NAP that is completely underground), hand holes (whose lids may be substantially level with a ground surface), and/or the like.

Telecommunications companies have precious assets in the ground, and deploy more. The various embodiments herein utilize these assets (and, in some cases, minimal radio infrastructure costs to overlay a fiber or copper plant or network with wireless broadband) to overlay one or more networks distributed within one or more apical conduit systems. In so doing, a cost effective fiber and cable network, with a network for backhaul, may be provided.

In some embodiments, the various embodiments described herein may be applicable to brownfield copper plants, to greenfield fiber roll-outs, and/or the like. Herein, "brownfield" might refer to land on which industrial or commercial facilities are converted (and in some cases decontaminated or otherwise remediated) into residential buildings (or other commercial facilities; e.g., commercial offices, etc.), while "greenfield" might refer to undeveloped land in a city or rural area that is used for agriculture, used for landscape design, or left to naturally evolve. In the telecommunications context, "brownfield" might also refer to land on which a telecommunications company might have some existing facilities and/or inventory (e.g., copper, etc.) and may not require converting the land and/or repurposing commercial facilities, while "greenfield" might also refer to land (which may have existing buildings) on which the telecommunications company might not already have some existing facilities, inventory, and/or services and might require converting the land and/or repurposing commercial or other facilities.

Specific Exemplary Embodiments

We now turn to the embodiments as illustrated by the drawings. FIGS. 1-9 illustrate some of the features of the method, system, and apparatus for implementing an improved method of installing optical fiber or other telecommunications cables in a ground surface (including, without limitation, a paved surface) and an improved apparatus and system used in installation of optical fiber or other telecommunications cables in a ground surface (including, without limitation, a paved surface), as referred to above. The methods, systems, and apparatuses illustrated by FIGS. 1-9 refer to examples of different embodiments that include various components and steps, which can be considered alternatives or which can be used in conjunction with one another in the various embodiments. The description of the illustrated methods, systems, and apparatuses shown in FIGS. 1-9 is provided for purposes of illustration and should not be considered to limit the scope of the different embodiments.

Throughout these embodiments, wireless access points—such as ones operating under any of the IEEE 802.11a/b/g/n/ac/ad/af standards discussed above, and described in detail in the '034, '574, '691, '676, '216, and '665 Applications, which are already incorporated herein by reference in their entirety—may be implemented in any of the ground-based signal distribution devices (including, without limitation, the FDH, the NAPs, the handholes, the NIDs, the ONTs, and/or the like). In some embodiments, wireless access points may be disposed within compact devices that are disposed within apical conduit channels, at the top of apical conduit channels, or near the top of apical conduit channels, as described in detail in the '574 Application. In some cases, some or all of these wireless access points may be powered by power lines that are disposed along with the signal lines or fiber lines within the apical conduit system, and such powering of wireless access points is described in detail in the '691 and '676 Applications, already incorporated herein by reference in their entirety. The wireless access points may be part of small cells, micro cells, femto cells, pico cells, and/or the like, as appropriate or desired.

Figure 1B:
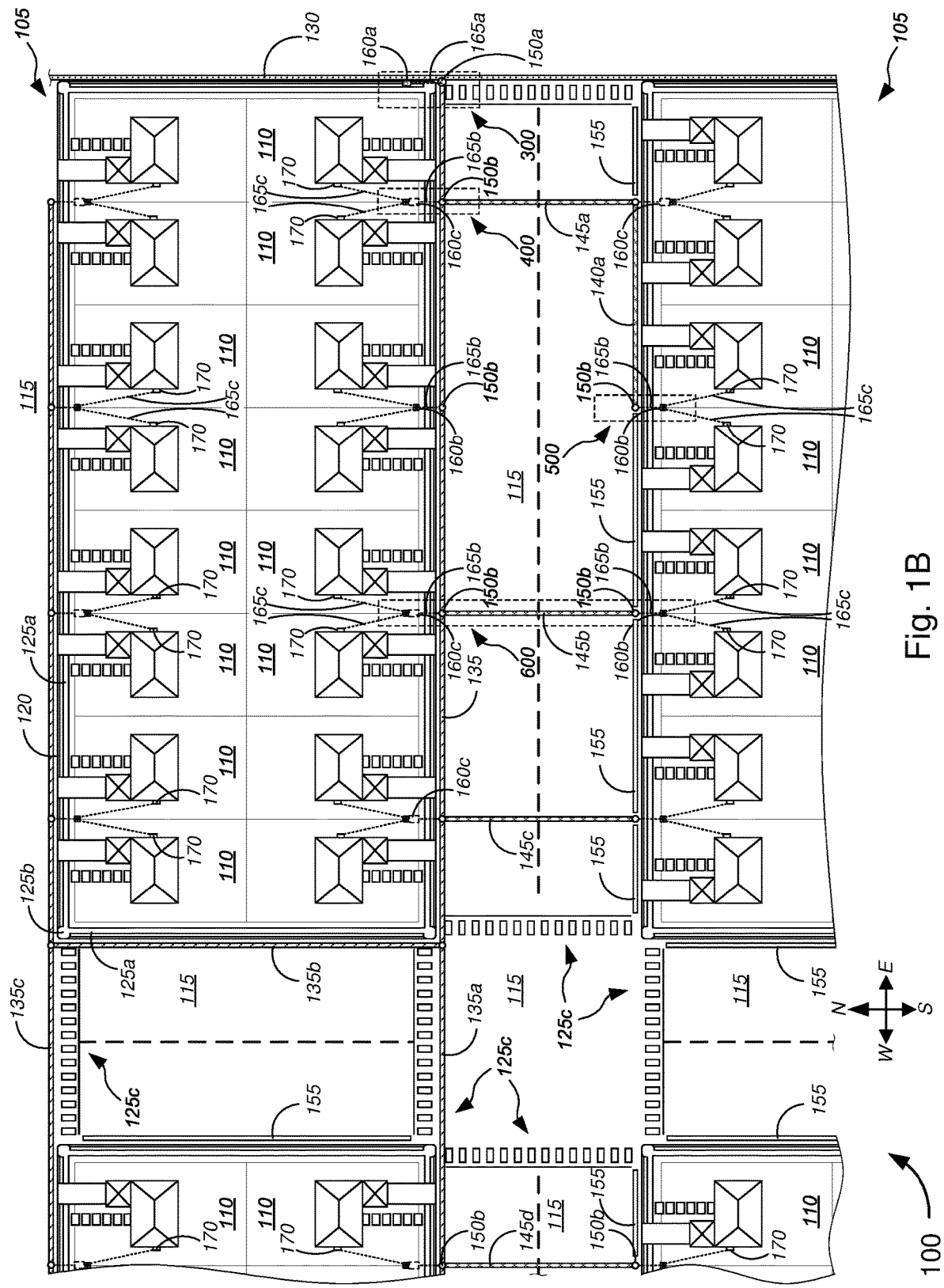

With reference to the figures, FIGS. 1A and 1B (collectively, "FIG. 1") are general schematic diagrams illustrating systems 100 for implementing Fiber-to-the-Premises ("FTTP") and/or point-to-point fiber insertion within a passive optical network ("PON") communications system and/or for implementing installation of optical fiber, other telecommunications cables, and/or power lines in a ground surface, in accordance with various embodiments. For simplifying the illustration, the customer premises 110 are shown to be in a grid-like block pattern, and are shown to be of similar design and build. The grid-like block of customer premises is also shown to be oriented along particular cardinal directions (i.e., north, south, east, and west), as indicated in FIG. 1. However, the various embodiments are not so limited, and any arrangement of customer premises (of any variety of sizes and builds) may be applicable, in any arrangement or orientation with respect to the cardinal directions, as appropriate or desired. Moreover, the tools and techniques described herein may be implemented for established neighborhoods/blocks of customer premises or newly constructed ones.

Further, the various embodiments allow for any layout and arrangement of the apical conduit system and components (including, without limitation, source slot, main slot(s), cross-slots, far-side slots, bore holes, missile bores, and/or the like), not necessarily as shown in FIG. 1; the particular layout and arrangement of the apical conduit system and components in FIG. 1 represents only one particular set of embodiments. Although FIG. 1 shows a plurality of customer premises that are single-family home residences within a neighborhood setting, the various embodiments are not so limited, and the various systems and methods described with respect to FIG. 1 may be applicable to any arrangement and type of customer premises (including, without limitation, customer residences, multi-dwelling units ("MDUs"), commercial customer premises, industrial customer premises, and/or the like) within one or more blocks of customer premises (e.g., residential neighborhoods, university/college campuses, office blocks, industrial parks, mixed-use zoning areas, and/or the like), in which roadways and/or pathways might be adjacent to each of the customer premises.

With reference to the different embodiments shown in FIGS. 1A and 1B, FIG. 1A depicts an embodiment in which each network access point ("NAP") 160c is configured to serve more customer premises (i.e., 8 houses in the example of FIG. 1), and thus fewer NAPs 160c need be deployed. FIG. 1B depicts an embodiment in which each NAP 160c is configured to serve relatively fewer customer premises (i.e., 4 houses in the example of FIG. 1), and thus more NAPs 160c are deployed. In some embodiments, the use of simplex or duplex fiber optic lines might determine how many ports each NAP might have, and thus how many customer premises can be served by each NAP; of course, the use of duplex lines allows for double the capacity, and thus can serve more customer premises compared with simplex lines. According to some embodiments, FIG. 1A might represent a system that incorporates a PON communications system, which utilizes single (duplex) fiber connections to the customer premises 110, and thus may require only 1 single (duplex) fiber line to be routed from the NAP 160c to each customer premises 110 (i.e., to the NID or ONT of the customer premises 110). In some cases, a second single (duplex) fiber line might be routed along with the first single (duplex) fiber line to serve as a backup or to allow for other services that require simplex connections. In some embodiments, FIG. 1B might represent either a PON communications system having 2 single (duplex) fiber lines (one of which serves as a backup) or a service that requires simplex fiber connections (including, but not limited to Ethernet fiber connections, which requires separate simplex fiber connections for uploading and downloading data). The embodiments of FIGS. 1A and 1B would otherwise be similar, if not identical, in terms of functionality, operation, and deployment. The various embodiments, however, are not limited to either embodiments shown in FIGS. 1A and 1B, and the NAPs 160c can each be configured to serve any suitable number of customer premises. Further, although FIG. 1 is specifically described in terms of PON implementation using an apical conduit system, the various embodiments are not so limited, and some embodiments may be directed to implementing installation of any combination of optical fiber, other telecommunications cables, and/or power lines in a ground surface within an apical conduit system, as described herein.

In the non-limiting examples of FIG. 1, blocks 105 might each have located thereon one or more customer premises 110 (which are depicted as single-family homes in FIG. 1, for the sake of illustration). Some of the one or more customer premises 110 might include an attached or detached garage and a driveway, which connects the garage to a roadway 115. Herein, "roadway" might refer to any type of path on which people, vehicles, and the like might travel, and might include asphalt roads, concrete roads, and/or the like. Each block 105 might include a curb 120 along at least portions of the perimeter of the block 105, as well as pathways 125 (which might include, without limitation, sidewalks 125a, street-corner sidewalks 125b, and crosswalks 125c, and/or the like). According to some embodiments, pathways 125 might be made of materials including, but not limited to, asphalt, concrete, pavers, tiles, stone, and/or the like. In some cases, the areas bordered and defined by curb 120, sidewalks 125a, and street-corner sidewalks 125b might include grassy areas, mulch-filled areas, and/or gravel-filled areas (in some cases, with one or more trees, one or more shrubs, and/or one or more hedges, or the like). In some instances, sidewalks 125a might extend toward, and might be positioned immediately adjacent to, curb 120.

System 100, as shown in FIG. 1, might include, on roadway 115, apical conduit source slot 130, one or more apical conduit main slots 135, one or more apical conduit far-side slots 140, one or more apical conduit cross slots 145, road bores 150, road lines 155, and/or the like. Herein, "apical conduit" might refer to any type of conduit, groove, or channel disposed in a ground surface (particularly, a roadway or pathway surface), in which one or more lines are disposed. The one or more lines might include, without limitation, at least one of one or more conduits, one or more optical fiber cables, one or more conductive signal lines, one or more power lines, and/or the like. The conduit, groove, or channel may be covered with a filler material, including, but not limited to, a thermosetting material (which might include polyurea or the like), as described, e.g., in some of the Related Applications (which have already been incorporated herein by reference in their entirety). Alternatively, the structure as shown and described below with respect to FIGS. 7A-8L might be used in lieu of the filler material. In some cases, a capping material might be placed on top of the filler material (or the structure of FIGS. 7A-8L) of the apical conduit, and the capping material might be set to have particular colors, so as to additionally serve as road lines on a roadway surface. In some embodiments, there might be a gap between road lines 155 and any of the apical conduit slots 130-145, while, in some instances, road lines 155 might be extended to abut adjacent apical conduit slots 130-145. According to some embodiments, colored capping material might be used to fill at least a portion of the channel, as well as to extend further along the surface of the roadway to serve as a continuous road line.

Road bores 150 provide vertical access, from a top surface of roadway 115, to the one or more lines disposed within (typically at or near the bottom of) the groove or channel of the apical conduit slots, and can be filled with the filler and/or capping material similar to any of the apical conduit slots 130-145. In some embodiments, road bores 150 might have diameters ranging from ~0.5 inches (~1.3 cm) to ~6 inches (~15.2 cm), preferably ~6 inches (~15.2 cm) for road bores 150 near FDHs, cabinets, and/or the like, and preferably ~2 inches (~5.1 cm) for most other road bores 150.

In the example of FIG. 1, the source slot 130 might extend from a central office ("CO"), a digital subscriber line access multiplexer ("DSLAM"), and/or near/within a block or neighborhood of customer premises (collectively, "source"), extending along, under, or beside portions of a curb (e.g., curb 120). The source slot 130 might carry (or might otherwise have placed in a channel therein) at least one line from the source, including, without limitation, one or more F-1 fiber cables, and/or the like. In some embodiments, the at least one line might further comprise, but is not limited to, at least one of one or more conductive signal lines, one or more power lines, and/or the like.

Further, in the embodiment of FIG. 1, the main slot 135 might extend along a significant length of roadway 115, disposed close to one of the curbs 120 of one of the blocks 105, while far-side slot 140 might extend along a shorter length of roadway 115 on the side of the roadway 115 opposite to the side along which the main slot 135 is disposed. Cross slots 145 might connect main slot 135 with far-side slot 140, and thus are disposed across an approximate width of the roadway 115. Although main slot 135 and far-side slot 140 are shown in FIG. 1 to be parallel to each other, they may be at any suitable angle with respect to each other, so long as they are at appropriate positions along the roadway 115 and/or beside curb 120 (e.g., in some cases, to serve as road lines, or the like, which in some cases might mean that one of the main slot 135 or the far-side slot 140 is positioned in the middle of the roadway 115 to serve as a middle road line). Although cross slots 145 are shown in FIG. 1 as being perpendicular to at least one of main slot 135 and far-side slot 140, cross slots 145 may be at any suitable angle relative to one or both of main slot 135 and far-side slot 140, so long as cross slots 145 connect main slot 135 with far-side slot 140, such that the one or more lines may be appropriately routed through these slots 130-145.

In some embodiments, one or more ground-based distribution devices 160 might be provided to service one or more customer premises 110. The one or more lines disposed in the apical conduit slots 130-145 might be routed underground, via conduits, missile bores, or the like (collectively, "conduits 165"), to containers of each of the one or more ground-based distribution devices 160, in a manner as described in detail with respect to FIGS. 1-4 as described in detail in the '676 Application, which has already been incorporated herein by reference in its entirety. In some embodiments, conduits 165c might be provided below ground between a container of a ground-based distribution device 160 to a position below and near a NID or ONT 170 that is mounted on an exterior wall of a customer premises. In some cases, conduits 165c might extend from the position below and near the NID or ONT 170 to communicatively couple with the appropriate wiring connections (i.e., with the optical fiber connections, conductive signal connections, and/or the like) within the NID or ONT 170. Although shown in FIG. 1 as being a direct route between the position near the NID or ONT 170 and the container of the ground-based distribution device 160, conduit 165c may be at right-angles, may be curved, and/or might follow other routes. In some embodiments, the ground-based distribution device 160 might include, without limitation, a FDH platform 160a, a hand hole 160b, a NAP 160c (which might be an above-surface platform NAP, a sub-surface NAP (which might extend from above the surface to below the surface), or a direct-bury NAP, or the like), and/or the like. Although the FDH platform 160a is shown communicatively coupled to the apical conduit system through the main slot 135, in some embodiments, the FDH platform 160a may be coupled to the apical conduit system through the source slot 130. In some instances, the FDH platform 160a might link two or more apical conduit systems (either through the main slots and/or source slots of these systems).

In some embodiments, the combination of main slot 135, far-side slot 140, and/or cross slots 145 might form particular configurations including, without limitation, an "h" configuration (i.e., as shown in the combination of main slot 135, far-side slot 140a, and cross slot 145a in FIG. 1), a "c" configuration (i.e., as shown in the combination of main slot 135 and cross slots 145b and 145c in FIG. 1), and/or the like. The "h" and "c" configurations each provide ways of routing lines from NAP 160c to hand holes 160b on the opposite side of roadway 115 to service NIDs and ONTs 170 across the road 115. Any other suitable configuration may be implemented, however.

Figure 2B:
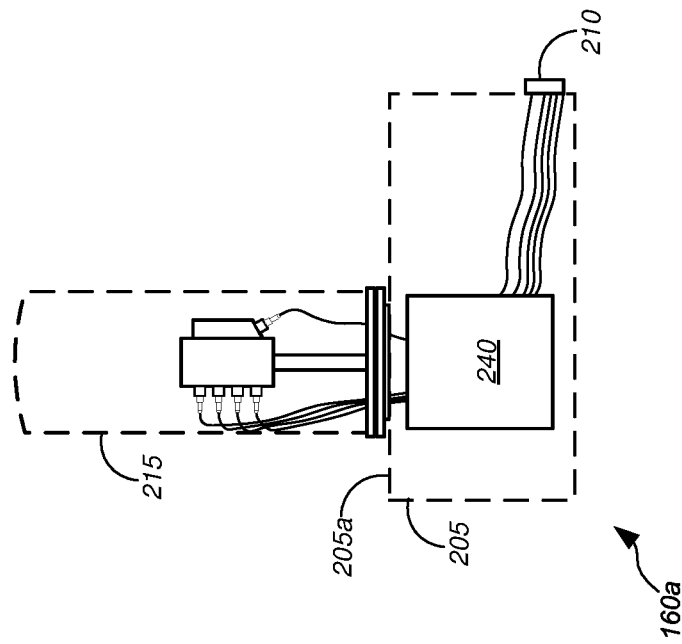

We now turn to FIGS. 2A-2J (collectively, "FIG. 2"), which are general schematic diagrams illustrating various ground-based signal distribution devices that may be used in implementing FTTP and/or point-to-point fiber insertion within a PON communications system and/or for implementing installation of optical fiber, other telecommunications cables, and/or power lines in a ground surface, in accordance with various embodiments. In FIG. 2, dash-lined boxes, covers, or containers depict outlines of said boxes, covers, or containers in order to illustrate examples of contents disposed therein. Although particular configurations and components are shown in FIG. 2, the various embodiments are not necessarily limited to those configurations and components shown, but may include any suitable configurations and/or components, as appropriate or as desired. FIGS. 2A-2D depict various example embodiments of FDHs 160a, while FIGS. 2E-2H depict various example embodiments of handholes 160b, and FIGS. 2I-2J depict example embodiments of NAPs 160c.

Figure 2A:
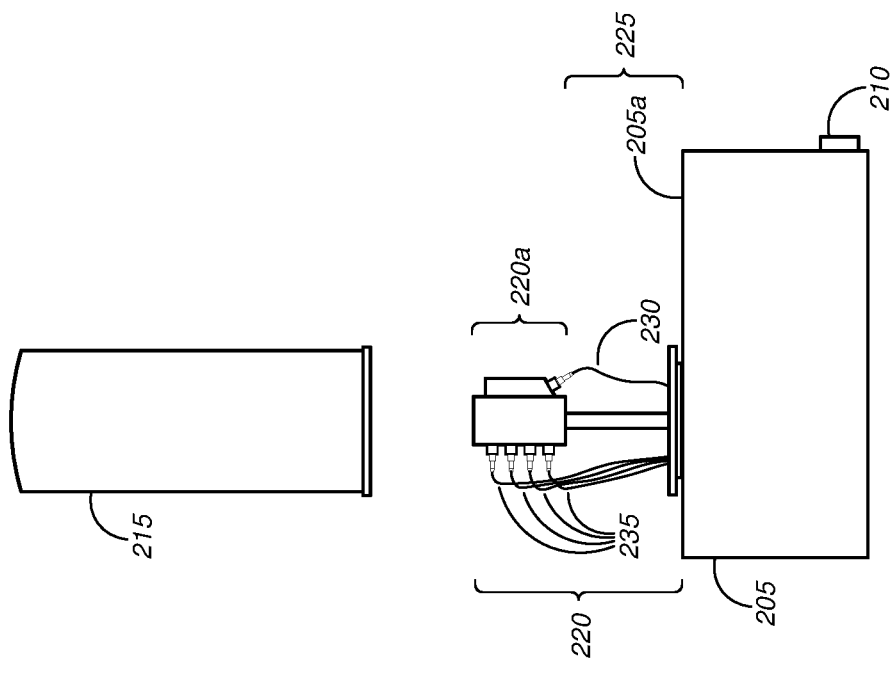

In FIGS. 2A-2B, a pedestal-based FDH 160a is shown, which comprises, without limitation, a container 205, at least one conduit port 210, a cover or lid 215, and a cable distribution system 220. The container 205 might include a square or rectangular box that is made of a material that can durably and resiliently protect contents thereof while being disposed or buried in the ground surface (i.e., disposed or buried under the ground surface), and especially against damage caused by shifting ground conditions (such as by expansive soils, tremors, etc.). The container 205 is ideally constructed to be waterproof to protect electronics components disposed therein from getting wet; such a waterproof container can also protect against entry of dust, dirt, debris, and the like, which might affect or damage optical cables and/or optical cable connections, or other cable connections. In some embodiments, cable distribution system 220—which is at least in part disposed in the pedestal portion that is above container 205 (and covered by or disposed within lid 215 during operation)—might include, but is not limited to, a signal distribution/splitting/splicing system 220a, a support structure 225, one or more first cables 230, and one or more second cables 235. In some cases, FDH 160a might further comprise an optional cable routing system 240, which is a system disposed in container 205 to route the one or more first and second cables 230 and 235 between the cable distribution system 220 and the at least one conduit port 210. In some embodiments, the optional cable routing system 240 might be disposed in the pedestal portion along with the cable distribution system 220 (not shown). In other embodiments, both the optional cable routing system 240 and the cable distribution system 220 might be disposed in the container 205 (also not shown). Embodiments of the optional cable routing system are described in greater detail with respect to FIGS. 8-10 in the '851 Application.

According to some embodiments, the one or more first cables 230 might include, without limitation, F-1 or F1 optical fiber cables routed from a CO, a DSLAM, and/or near/within a block or neighborhood of customer premises (collectively, "source") to the FDH 160a, while the one or more second cables 235 might include, but are not limited to, F-2 or F2 optical fiber cables routed between the FDH 160a and one or more NAPs 160c.

The embodiments of FIGS. 2C-2D are similar, if not identical, to those of FIGS. 2A-2B, except that the FDHs 160a of FIGS. 2C-2D are substantially disposed within the ground surface, with either top surface 205a (of container 205) or top surface 215a (of lid 215) being substantially level with a top surface of the ground surface, and without a pedestal portion. In these embodiments of FDH 160a, the signal distribution/splitting/splicing system 220a, the support structure 225, the one or more first cables 230, the one or more second cables 235, and the (optional) cable routing system 240 are all disposed within the container, and all covered by substantially flat lid 215. Because of the similarity of the components therein, the description of FDH 160a in FIGS. 2A-2B is applicable to the FDH 160a of FIGS. 2C-2D.

Figure 2E:
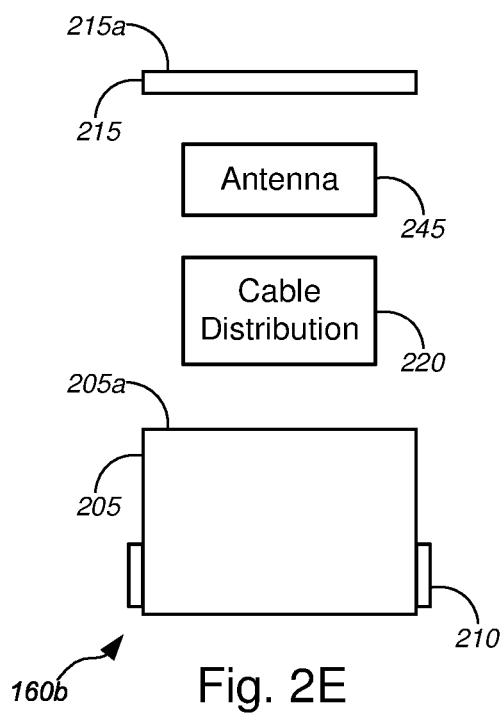

The hand holes 160b of FIGS. 2E-2H are similar, if not identical, to the hand holes described in detail in the '676 Application, which is already incorporated by reference herein in its entirety. With reference to FIGS. 2E-2H, an embodiment of hand hole 160b is shown in FIG. 2E, which hand hole 160b comprises a container 205, at least one conduit port 210, a lid 215, a cable distribution system 220, and an (optional) antenna 245. The container 205 might be similar, if not identical, to the container 205 described in detail with respect to FIGS. 2A-2D; accordingly, the descriptions above apply similarly to container 205 in FIGS. 2E-2H. The (optional) antenna 245 is configured to be disposed or mounted within the interior of the container 205, and can include any suitable antenna, antenna array, or arrays of antennas, as described in detail with respect to FIG. 3 of the '676 Application, or any other suitable antenna, antenna array, or arrays of antennas. The lid 215 is ideally made of a material that provides predetermined omnidirectional azimuthal rf gain.

The at least one conduit port 210 (with two conduit ports shown in FIG. 2, or three conduit ports shown in FIGS. 4-6) is configured to sealingly connect with the one or more conduits 165b or 165c. In this manner, at least one optical fiber line, at least one conductive signal line (including, but not limited to, copper data lines, copper voice lines, copper video lines, or any suitable (non-optical fiber) data cables, (non-optical fiber) video cables, or (non-optical fiber) voice cables, and/or the like), and/or the like that are provided in the one or more conduits 165b might be routed through the at least one conduit port 210 and into the interior of the container 205, to be correspondingly communicatively coupled to the antenna 245 or to the NIDs/ONTs 170 via cable distribution system 220. Cable distribution system 220 may also be configured to route (via container 205) the at least one power line that is provided in the one or more conduits 105 to appropriate power receptacles, cabinets, or power relay systems that are located above the ground surface.

Figure 2F:
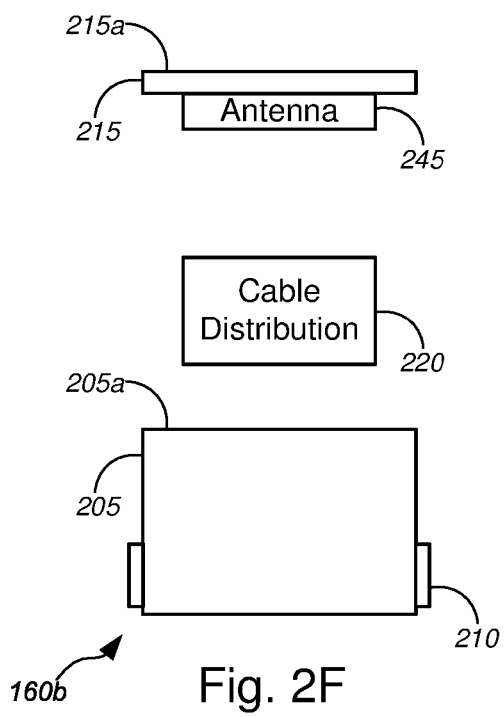

FIG. 2F shows another embodiment of hand hole 160b. In FIG. 2F, the hand hole 160b comprises (optional) antenna 245, which is part of lid 215, either disposed completely within the lid 215, disposed below (but mounted to) the lid 215, or disposed partially within the lid 215 and partially extending below the lid 215. Hand hole 115 in FIG. 2F is otherwise similar, or identical to, and has similar, or identical, functionalities as hand hole 115 shown in, and described with respect to, FIG. 2E. Accordingly, the descriptions of the hand hole 115 of FIG. 2E are applicable to the hand hole 115 of FIG. 2F.

Figure 2G:
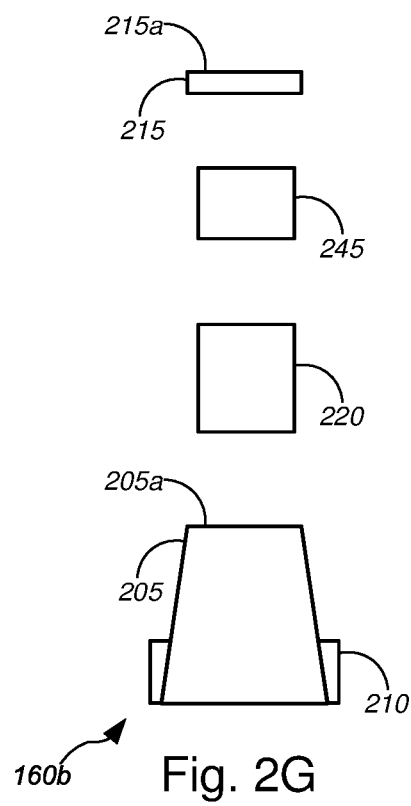
Figure 2H:
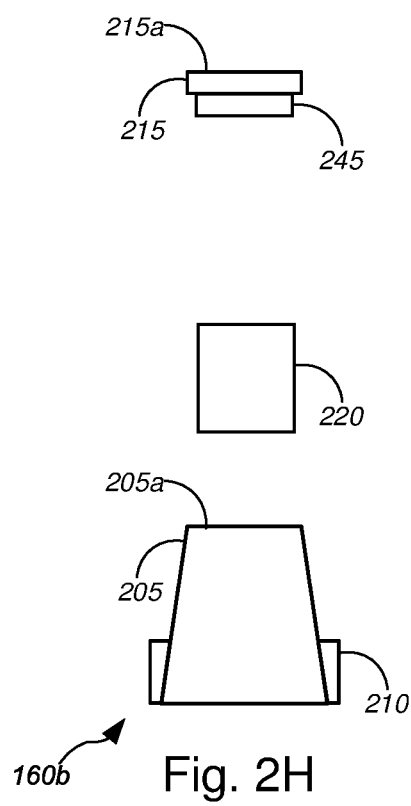

FIGS. 2G and 2H show two embodiments of flowerpot hand holes 160b. The differences between the hand holes 160b of FIGS. 2E and 2F and the flowerpot hand holes 160b of FIGS. 2G and 2H include a more compact structure (and a correspondingly compact set of (optional) antenna(s) 245 and cable distribution systems 220), a container 205 having a generally cylindrical or (truncated) conical shape (not unlike a flower pot for planting flowers), a lid 215 having a generally circular shape to fit the generally cylindrical or conical container 205, and the like. The flowerpot hand holes 120 are otherwise similar, or identical to, and have similar, or identical, functionalities as hand holes 160b of FIGS. 2E and 2F, respectively. Accordingly, the descriptions of hand holes 160b of FIGS. 2E and 2F are respectively applicable to the flowerpot hand holes 160b of FIGS. 2G and 2H.

According to some embodiments, a wide range of hand holes (some including the hand holes 160b above) may be used, with polymer concrete lids of various shapes and sizes. In some cases, all splitting and/or splicing can be performed below the ground surface and no pedestal is added. In some instances, some splitting and/or splicing (e.g., using cable distribution system 220, or the like) can be performed above the ground surface, such as in pedestal type FDH 160a (shown in FIGS. 2A-2B) or other platforms, including, without limitation, pedestal platforms, NAP platforms, FDH platforms, and/or the like shown in FIG. 2 of the '676 Application, already incorporated herein by reference in its entirety.

In some embodiments, if the hand hole is not placed in a driveway or sidewalk, or the like, the lid 215 (as shown in FIGS. 2E-2H) may be replaced by a pedestal lid 215 (such as shown in FIGS. 2G-2J), or the like. In other words, a small (i.e., short) radio-only pedestal (or pedestal lid) can be added, with no need for any splitter, any splice tray, or the like, just a simple antenna structure. The result might look like a few-inch high (i.e., a few-centimeter high) pedestal with antenna structures as described in the '676 Application.

An advantage with this approach is that the radio pedestal can be easily replaced, maintained, or the like, as it contains only the radio element.

Merely by way of example, in some instances, polymer concrete lids (such as used with typical hand holes) may be built with antenna elements in the lids. In particular, a ground plane can be placed below the lid, and the polymer concrete can be considered a low dielectric constant (i.e., as it has a dielectric constant or relative permittivity $\varepsilon_r$ similar to that of air—namely, $\varepsilon_r$ of about 1.0). In some cases, patch elements and/or directors may be included within the lid, subject to manufacturing processes.

Alternatively, planar antennas (such as described in detail in the '676 Application) may be placed below the lid, with the concrete surface having negligible impact on radio frequency propagation. A low elevation (i.e., below street level) setting of the radio typically limits the distance of propagation of rf signals. However, architectures having hand holes placed every few customer premises (e.g., homes) in a particular area (i.e., neighborhood or block of customer premises) may sufficiently compensate for the limited distance of rf signal propagation. Some embodiments include hand holes 160b without any antennas 245.

In FIGS. 2I-2J, a NAP 160c is shown, which includes, without limitation, a base 205, a conduit port 210, a cover 215, and a cable distribution system 220. In some embodiments, cable distribution system 220 might include, but is not limited to, a signal distribution/splitting/splicing system 220b, a plurality of ports 220c, a support structure 225, one or more second cables 235, an (optional) antenna 245, and one or more third cables 250. In some cases, NAP 160c might be an above-surface NAP, a direct bury NAP, or a NAP disposed in the ground surface and extending above the ground surface. In some embodiments, the one or more second cables 235 might include, but are not limited to, F-2 or F2 optical fiber cables routed between the FDH 160a and one or more NAPs 160c, while the one or more third cables 250 might include, without limitation, F-3 or F3 optical fiber cables routed between a NAP 160c and one or more NIDs/ONTs 170 (in some cases, via one or more hand holes 160b). In some embodiments, NAP 160c might further comprise an optional cable routing system 240 (not shown), not unlike the optional cable routing system 240, as shown and described in detail above with respect to FIGS. 2A-2D.

FIGS. 3A-6B illustrate embodiments of FTTP implementation (such as in a PON communications system implementation, in an Ethernet fiber communications system implementation, in an EPON, NGPON, or NGPON2 communications system implementation, and/or the like) and/or point-to-point fiber insertion implementation within the PON communications system (or alternatively, within an Ethernet fiber communications system implementation, within an EPON, NGPON, or NGPON2 communications system implementation, and/or the like) and/or embodiments of installation of optical fiber, other telecommunications cables, and/or power lines in a ground surface, in some cases, depicting zoomed-in views of features shown in FIG. 1, and in other cases depicting several alternative embodiments of specific features. FIGS. 7A-9 illustrate embodiments of an improved method of installing optical fiber or other telecommunications cables in a ground surface (including, without limitation, a paved surface) and an improved apparatus and system used in installation of optical fiber or other telecommunications cables in a ground surface (including, without limitation, a paved surface).

Figure 3A:
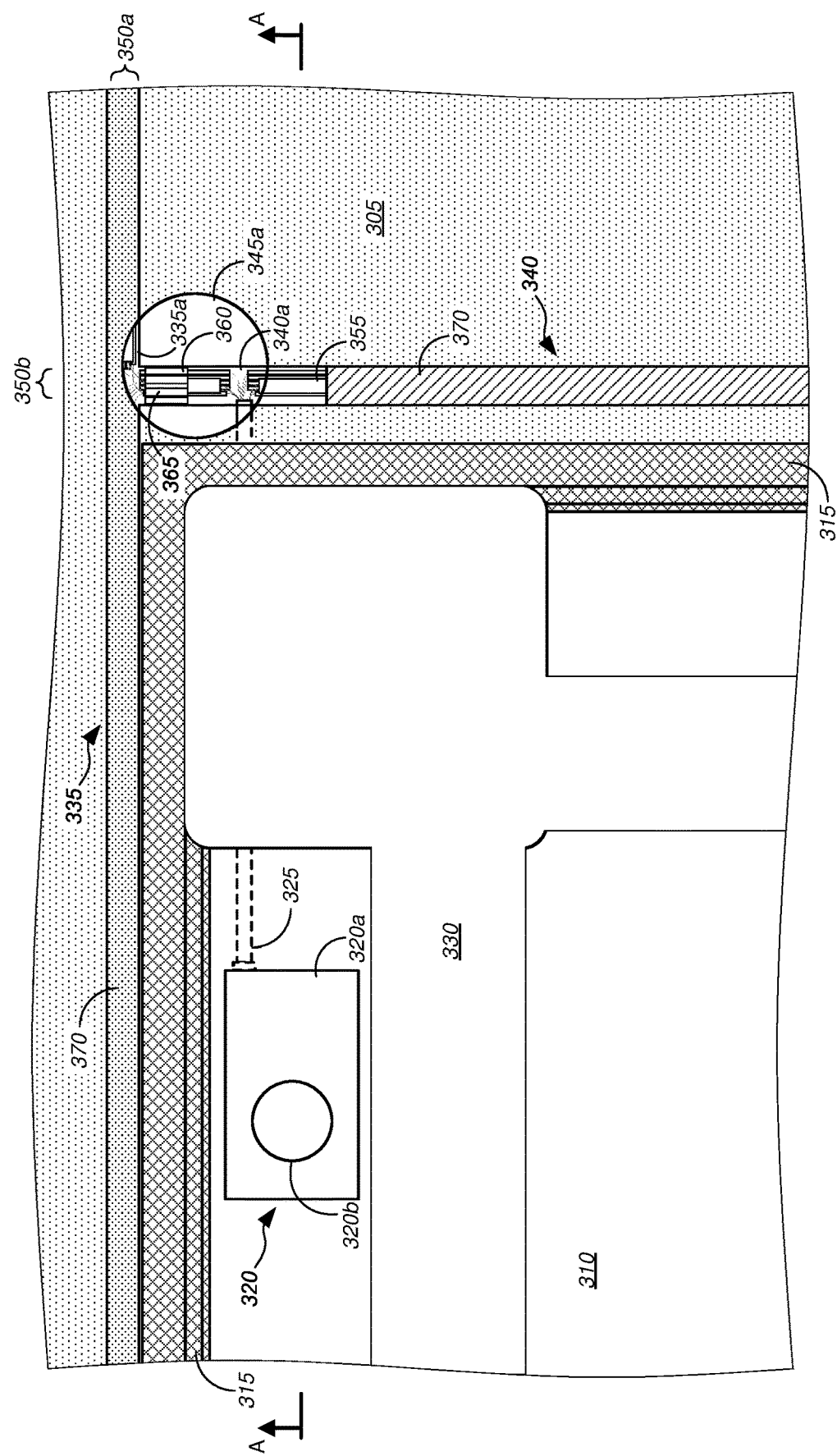
FIGS. 3A-3D are general schematic diagrams illustrating various views of a system for communicatively coupling lines within an apical conduit system and lines within a fiber distribution hub ("FDH") for implementing FTTP and/or point-to-point fiber insertion within a PON communications system and/or for implementing installation of optical fiber, other telecommunications cables, and/or power lines in a ground surface, in accordance with various embodiments.
Figure 3B:
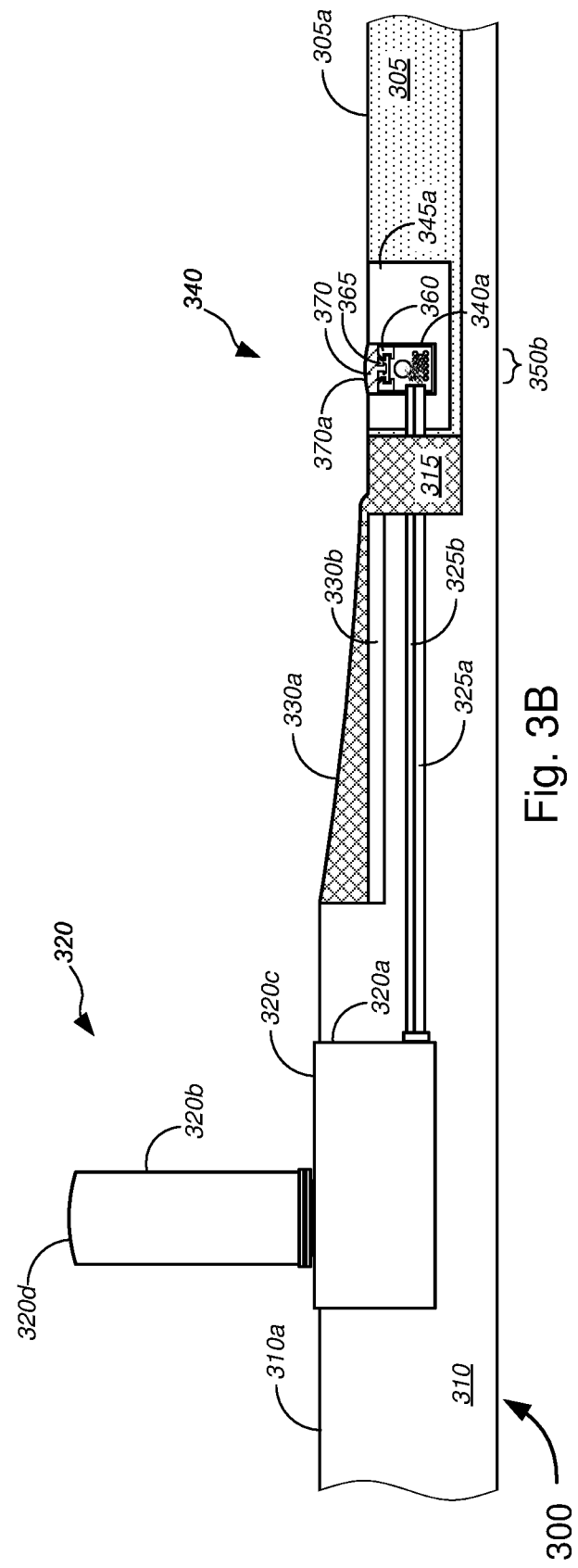
Figure 3C:
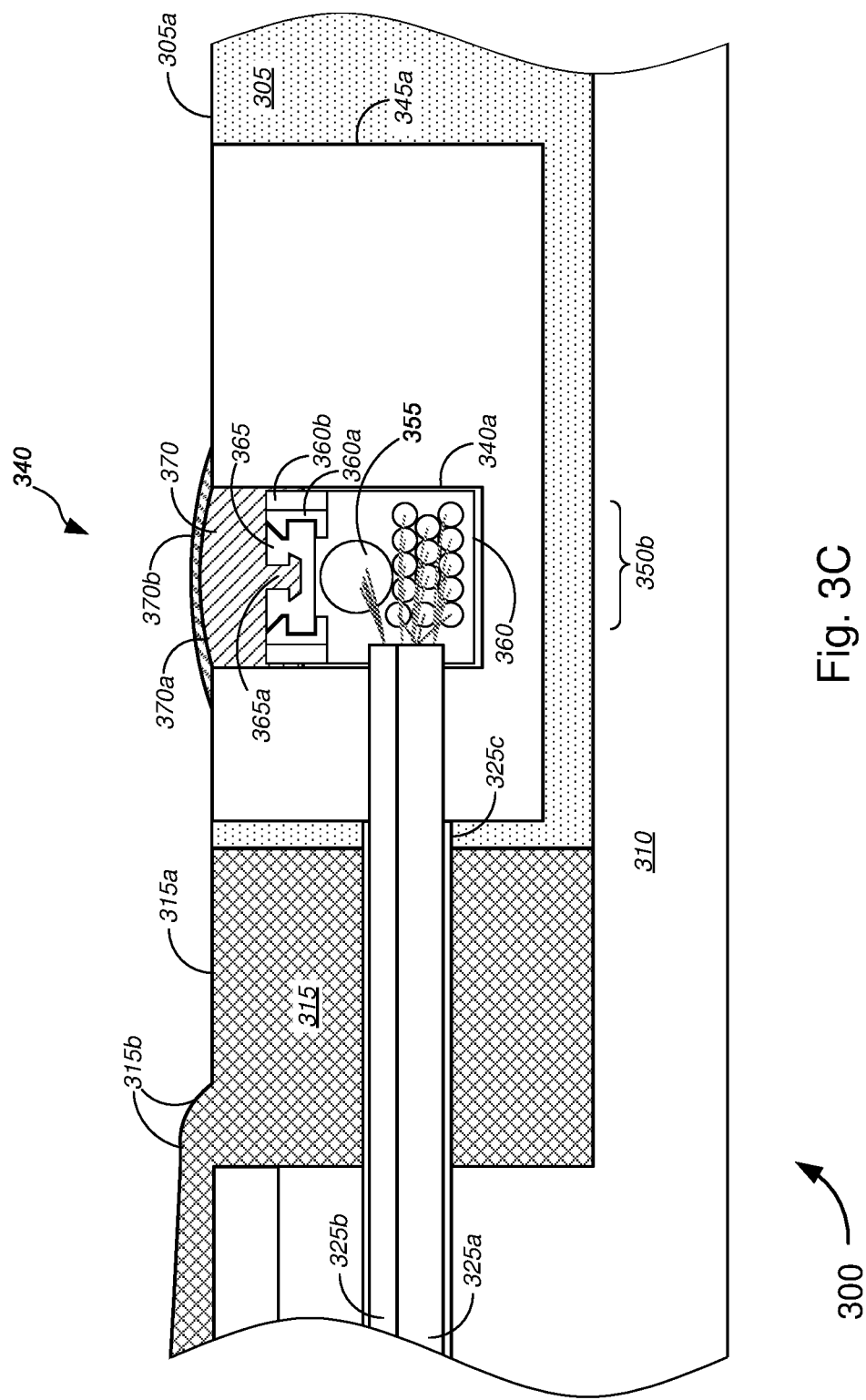
Figure 3D:
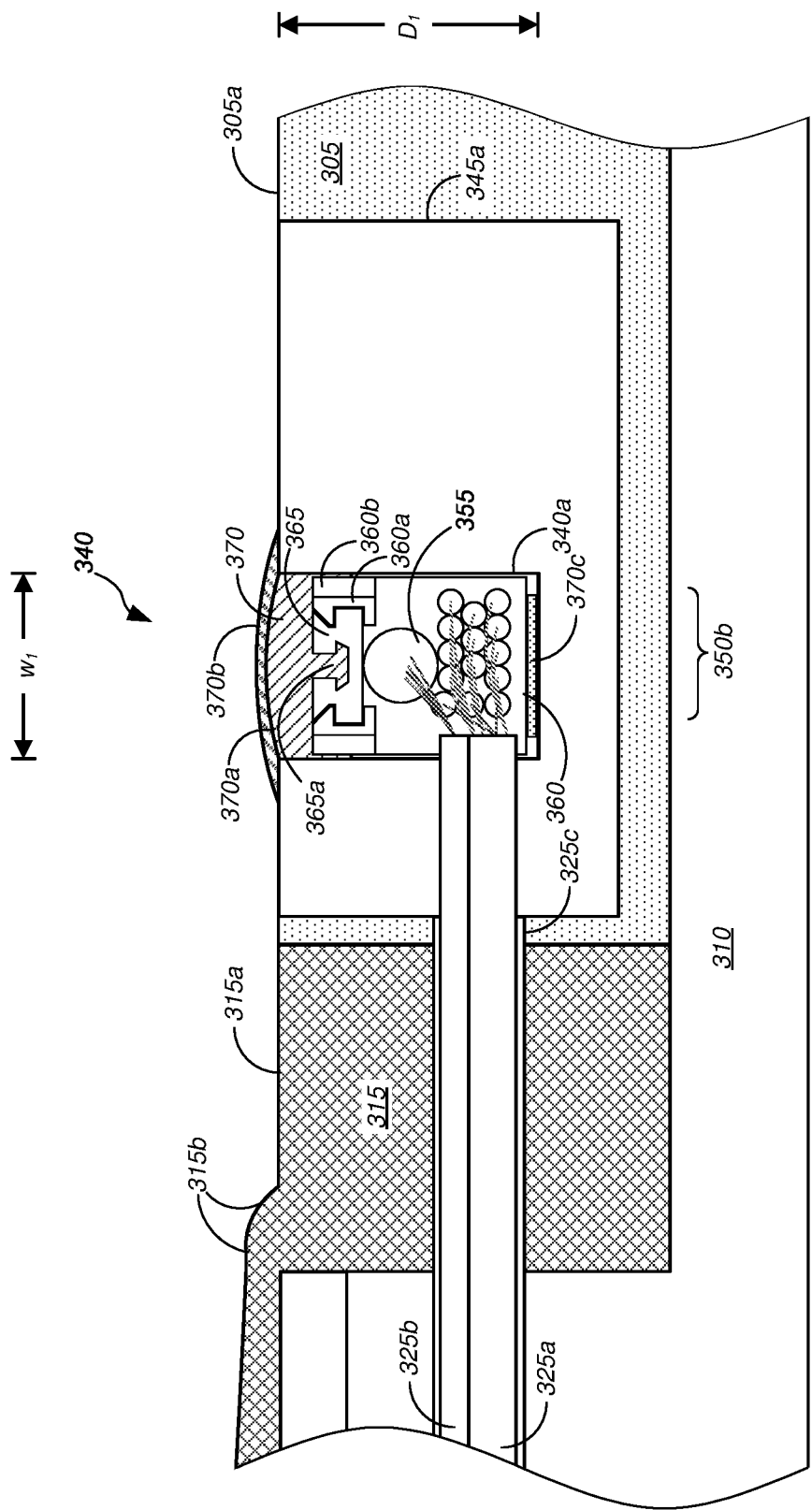

In particular, FIGS. 3A-3D (collectively, "FIG. 3") are general schematic diagrams illustrating various views of a system 300 for communicatively coupling lines within an apical conduit system and lines within a fiber distribution hub ("FDH") for implementing FTTP and/or point-to-point fiber insertion within a PON communications system (or alternatively, within an Ethernet fiber communications system implementation, within an EPON, NGPON, or NGPON2 communications system implementation, and/or the like) and/or for implementing installation of optical fiber, other telecommunications cables, and/or power lines in a ground surface, in accordance with various embodiments. FIG. 3A shows a top view of a section of ground in which components of a ground-based distribution device and components of an apical conduit system are disposed. FIG. 3B shows a partial sectional view of the system 300 of FIG. 3A, as shown along the A-A direction indicated in FIG. 3A. FIG. 3C shows an enlarged partial view of the portion of system 300 shown in FIG. 3B. FIG. 3D shows an alternative embodiment to FIG. 3C in which an adhesive layer 370c is placed (e.g., as a tack coat layer or the like) to hold the structure (the cavity of which holds microduct/cables or the like) in place within the channel (i.e., source slot 335, main slot 340, cross slot 375, or far-side slot 390, etc.). System 300 in FIG. 3 generally corresponds to a section of ground as, for example, indicated by (but not necessarily precisely depicting) dash-lined rectangle 300 shown in FIG. 1.

FIGS. 4A and 4B (collectively, "FIG. 4") are general schematic diagrams illustrating various views of a system 400 for communicatively coupling lines within an apical conduit system and lines within a direct bury network access point ("NAP") for implementing FTTP and/or point-to-point fiber insertion within a PON communications system (or alternatively, within an Ethernet fiber communications system implementation, within an EPON, NGPON, or NGPON2 communications system implementation, and/or the like) and/or for implementing installation of optical fiber, other telecommunications cables, and/or power lines in a ground surface, in accordance with various embodiments. FIG. 4A shows a top view of a section of ground in which components of a ground-based distribution device and components of an apical conduit system are disposed. FIG. 4B shows a partial sectional view of the system 400 of FIG. 4A, as shown along the B-B direction indicated in FIG. 4A. System 400 in FIG. 4 generally corresponds to a section of ground as, for example, indicated by (but not necessarily precisely depicting) dash-lined rectangle 400 shown in FIG. 1.

FIGS. 5A and 5B (collectively, "FIG. 5") are general schematic diagrams illustrating various views of a system 500 for communicatively coupling lines within an apical conduit system and lines within a hand hole for implementing FTTP and/or point-to-point fiber insertion within a PON communications system (or alternatively, within an Ethernet fiber communications system implementation, within an EPON, NGPON, or NGPON2 communications system implementation, and/or the like) and/or for implementing installation of optical fiber, other telecommunications cables, and/or power lines in a ground surface, in accordance with various embodiments. FIG. 5A shows a top view of a section of ground in which components of a ground-based distribution device and components of an apical conduit system are disposed. FIG. 5B shows a partial sectional view of the system 500 of FIG. 5A, as shown along the C-C direction indicated in FIG. 5A. System 500 in FIG. 5 generally corresponds to a section of ground as, for example, indicated by (but not necessarily precisely depicting) dash-lined rectangle 500 shown in FIG. 1.

FIGS. 6A and 6B (collectively, "FIG. 6") are general schematic diagrams illustrating various views of a system 600 for communicatively coupling lines within an apical conduit system and lines within a hand hole routed from a NAP through a cross-slot in a road surface for implementing FTTP and/or point-to-point fiber insertion within a PON communications system (or alternatively, within an Ethernet fiber communications system implementation, within an EPON, NGPON, or NGPON2 communications system implementation, and/or the like) and/or for implementing installation of optical fiber, other telecommunications cables, and/or power lines in a ground surface, in accordance with various embodiments. FIG. 6A shows a top view of a section of ground in which components of a ground-based distribution device and components of an apical conduit system are disposed. FIG. 6B shows a partial sectional view of the system 600 of FIG. 6A, as shown along the D-D direction indicated in FIG. 6A. System 600 in FIG. 6 generally corresponds to a section of ground as, for example, indicated by (but not necessarily precisely depicting) dash-lined rectangle 600 shown in FIG. 1.

In FIGS. 3-6, systems 300-600 might comprise one or more of roadway 305, ground 310, curb 315, FDH 320, conduits 325, pathway 330, source slot 335, main slot 340, bore holes 345, lines 350, conduit/microduct 355, foldable base 360, plug 365, capping material 370, cross slot 375, NAP 380, hand hole 385, far-side slot 390, and/or road lines 395, or the like. In some instances, roadway 305 might be made of asphalt, concrete, and/or any combination thereof, or the like. Ground 310 might comprise soil (in some cases, compacted soil), mud, clay, rock, and/or any combination thereof, or the like. Curb 315 might be made of concrete or the like. A sub-base layer (not shown) might be disposed between the roadway 305 and ground 310. In some cases, curb 315 might comprise a portion of a roadway surface 315a and a portion of a non-roadway surface 315b.

According to some embodiments, conduits 325 might include, without limitation, conduits 325a-325b, missile bores 325c, conduit 325d, conduits 325e-325f, missile bore 325g, and/or the like. Conduits 325a-325b might extend, within missile bore 325c, between one of FDH 320, NAP 380, or hand hole 385 and one of bore hole 345, source slot 335, main slot 340, cross slot 375, or far-side slot 390. Conduit 325d might extend between one of NAP 380 or hand hole 385 and each of a NID or ONT (e.g., NID or ONT 170) disposed on an exterior wall or exterior surface of a customer premises (e.g., customer premises 110). Conduits 325e-325f might extend, within missile bore 325g, between one of bore hole 345, main slot 340, or far-side slot 390 and another of bore hole 345, main slot 340, or far-side slot 390; conduits 325e-325f, within missile bore 325g, might, in some cases lie within a channel of cross slot 375 (or might be a missile bore otherwise set or disposed under surface 305a of roadway 305, either before or after roadway 305 is laid).

Each bore hole 345 provides simultaneous access to two or more slots (including, without limitation, source slot 335, main slot 340, cross slot 375, and/or far-side slot 390, or the like), to enable cross-connection or cross-placement of lines in one of the two or more slots with lines in the other one(s) of the two or more slots, and vice versa. In some cases, bore holes 345 might comprise a first bore hole 345a and one or more second bore holes 345b. The first bore hole 345a might be larger in diameter and/or depth compared with the one or more second bore holes 345b. While the first bore hole 345a might be used to cross-connect lines within the source slot 335, the main slot 340, and/or the conduit 325 to the FDH 320, the one or more second bore holes 345b might cross-connect lines within the conduit 325 to NAP 380 and/or hand hole 385 with lines in the main slot 340, the cross slot 375, and/or the far-side slot 390. Although bore holes 345 shown in FIGS. 3-6 are depicted as extending below channels of the corresponding apical conduit slots, the bore holes, according to the various embodiments, may be set to have any suitable depth relative to the depth of the channel (i.e., deeper, less deep, or substantially as deep).

The plurality of lines 350, the microduct/conduit 355, and the foldable base 360 are disposed or placed in a channel of one or more slots (e.g., channel 335a of the source slot 335, channel(s) 340a of the main slot(s) 340, channel(s) 375a of the cross slot(s) 375, channel(s) 390a of the far-side slot(s) 390, and so on). In some embodiments, the plurality of lines 350 might include, without limitation, at least one of one or more conduits, one or more optical fiber cables, one or more conductive signal lines, one or more power lines, and/or the like. The one or more conductive signal lines might include, but are not limited to, copper data lines, copper video lines, copper voice lines, or any suitable (non-optical fiber) data cables, (non-optical fiber) video cables, or (non-optical fiber) voice cables, and/or the like. In some embodiments, at least one of the conductive signal lines can be used for carrying multiple signals simultaneously (e.g., data and video signal, first data and second data, first video signal and second data signal, or the like), by carrying the different signals as multiplexed signals or by carrying the different signals simultaneously on separate wavelengths, or the like. In one non-limiting example, GPON data might be combined with an additional analog video signal that is sent on the same signal line over a different wavelength. In some cases, some lines 350 might be routed via conduit/microduct 355, while other lines 350 might be routed substantially parallel with conduit/microduct 355 within groove or channels.

According to some embodiments, the plurality of lines 350 might include, but is not limited to, F1 cables, F2 cables, F3A cables, F3B cables, multiple-fiber push-on/push-off ("MPO") cables, twisted-copper pair cables, and/or the like. In some embodiments, the F1 cables might include, but are not limited to, F1 optical fiber cables 350a, which might communicatively couple a central office of a telecommunications service provider with the FDH 320 (which might comprise a container 320a and a pedestal portion 320b), as shown, e.g., in the embodiment of FIG. 3. In some instances, the F2 cables might include, without limitation, F2 optical fiber cables 350b, which might communicatively couple the FDH 320 with a NAP 380, as shown, e.g., in the embodiments of FIGS. 3 and 4 as described above. According to some aspects, the F3A cables and F3B cables (collectively, "F3 cables") might include, without limitation, F3 optical cables 350c, which might communicatively couple the NAP 380 to a NID or ONT (e.g., NID/ONT 170 in FIG. 1) that is mounted on an exterior wall of a customer premises (e.g., building of customer premises 110). In some cases, the F3 cables might run through the missile bore 325c between the NAP and the main slot 340, through the cross slot 375, through the far-side slot 390, through the missile bore 325c between the cross-slot 375 or far-side slot 390 and the hand hole 385, through conduits 325d, and/or any combination of these routes, in order to communicatively couple lines from the NAP 380 with lines leading into the NID/ONT of customer premises located across (or on the other side of) roadway 305 with respect to the NAP 380. Although the examples above refer to F1, F2, and F3 optical fiber cables, the F1, F2, and F3 cables may each include, without limitation, non-optical video/voice/data cables (e.g., conductive signal lines, as described above, or the like), power cables, and/or the like.

The conduit/microduct 355 might include any type of conduit that allows routing to any of the plurality of lines 350 described above. In some cases, the microduct 355 might have a range of diameters between 7.5 mm and 12 mm, while in other cases, conduit/microduct 355 might have any suitable diameter, so long as it fits within the channels (which is as described above).

In some embodiments, the foldable base 360 might comprise a base portion, two side wall portions, at least two points of articulation, and two plug contacts, and/or the like. Each point of articulation might separate the base portion from one of the two side wall portions and might allow each side wall portion to fold relative with the base portion (as shown, e.g., in FIGS. 7F-7M and FIGS. 8J-8Q, etc.). Each plug contact might be disposed at an end of each side wall portion opposite from the corresponding point of articulation. In some cases, each plug contact might have a (solid) contact portion 360a and a (deformable) gel portion 360b, or the like. The base portion, when placed in the channel, might lie longitudinally along a bottom of the channel and the two side wall portions might be in contact with sides of the channel. The folding of the two side wall portions relative to the base portion of the foldable base might form a cavity within which one or more lines (e.g., telecommunications cables, power cables, fiber optic cables, or the like) may be placed. These and other aspects of the foldable base 360 are shown and described below with respect to FIGS. 7A-8Q.

Once the lines are placed in the cavity formed by the folding of the foldable base 360 and placement of the foldable base 360 in the channel, a plug 365 might be placed above the one or more lines that are placed in the cavity, the plug engaging with the two plug contacts of the foldable base to secure the plug in place relative to the foldable base in the channel. The plug might comprise a top surface and a microchannel 365a along the top surface, the microchannel 365a being parallel with the channel when the plug engages with the two plug contacts of the foldable base when the foldable base is placed in the channel.

The capping material 370—which might be placed in the microchannel 365a such that the capping material 370 flows beyond the microchannel 365a and over any openings between the plug 365 and the foldable base 360 and between the foldable base 360 and edges of the channel—might include a thermosetting material (such as polyurea or the like), safety grout, asphalt sealer, concrete sealer, and/or the like. In some cases, the capping material 370 might comprise a sealer cap forming a mastic seal over the filler material. According to some embodiments, the capping material 370 might be colored and used to fill at least a portion of the channel, as well as to extend further along the surface of the roadway to serve as a continuous road line. In some embodiments, the capping material might be about 0.5 inches (~1.3 cm) to about 0.75 inches (~1.9 cm) deep.

In some embodiments, roadway 305, curb 315, FDH 320, missile bores 325c, conduits 325d, pathway 330, source slot 335, main slot 340, bore holes 345, cross slot 375, NAP 380, hand hole 385, far-side slot 390, and road lines 395 of FIGS. 3-6 might correspond to roadway 115, curb 120, FDH 160a, missile bores 165a-165b, conduits 165c, pathway 125, source slot 130, main slot 135, bore holes 150a-150b, cross slot 145, NAP 160c, hand hole 160b, far-side slot 140, and road lines 155 of FIG. 1, respectively. As such, the descriptions of roadway 115, curb 120, FDH 160a, missile bores 165a-165b, conduits 165c, pathway 125, source slot 130, main slot 135, bore holes 150a-150b, cross slot 145, NAP 160c, hand hole 160b, far-side slot 140, and road lines 155 of FIG. 1 are applicable to roadway 305, curb 315, FDH 320, missile bores 325c, conduits 325d, pathway 330, source slot 335, main slot 340, bore holes 345, cross slot 375, NAP 380, hand hole 385, far-side slot 390, and road lines 395 of FIGS. 3-6.

With respect to the embodiments of FIGS. 1 and 3-6, the various apical conduit system components may be designed or configured in accordance with one or more of the following non-limiting implementations. In some embodiments, the channels of any or all of the source slot, main slot(s), far-side slot(s), and cross slot(s) (i.e., channel 335a, channel(s) 340a, channel(s) 375a, channel(s) 390a, and/or the like) can be created by milling (or otherwise cutting into) the roadway or other ground surface. In various aspects, the channels might have a variety of widths. Merely by way of example, in some cases, the channels might have a width of between about 0.5 inches (~1.3 cm) and about 12 inches (~30.5 cm), while in other cases, the channels might have a width of between about 1 inch (~2.5 cm) and about 6 inches (~15.2 cm). In other cases, the channels might have a width between about 1.5 inches (~3.8 cm) and about 2.5 inches (~6.4 cm), or a width of about 2 inches (~5.1 cm). FIG. 3D, for example, depicts channel 340 having a channel width of $w_1$, which may be a width within these ranges of channel width. The depth of the channels can vary as well, so long as the channel does not compromise the structural integrity of the ground surface (e.g., roadway, etc.) in which it is created. Merely by way of example, the channels might have a depth of no greater than about 3 inches (~7.6 cm), a depth of no greater than about 1 inch (~2.5 cm), or a depth of no greater than about 0.5 inches (~1.3 cm). In some embodiments, the depth of the channels might be about 3 inches (~7.6 cm), while the width of the channels might be either about 0.5 inches (~1.3 cm) or about 1 inch (~2.5 cm). In other embodiments, the depth of the channels might be about 4 or 5 inches (~10.2 or 12.7 cm), or any depth that is appropriate in light of the circumstances, including the structural features of the roadway (depth, strength, etc.), the characteristics of the communication lines to be installed in the channels, etc. FIG. 3D, for example, depicts channel 340 having a channel depth of $D_1$, which may be depth within these ranges of channel depth.

In one aspect, certain embodiments can allow a provider or vendor to lay fiber lines and/or other lines on top of the road surface by creating a shallow groove or channel (e.g., 2" (~5.1 cm) wide, 0.5" (~1.3 cm) deep; 0.5" (~1.3 cm) wide, 3" (~7.6 cm) deep; or 1" (~2.5 cm) wide, 3" (~7.6 cm) deep; and/or the like) in the pavement along the edge of the pavement. In some embodiments, the source slot or the main slot (e.g., source slot 130 or main slot 135 shown in FIG. 1) might each have a 0.75" (~1.9 cm) wide, 3" (~7.6 cm) deep channel, while the far-side slot (e.g., far-side slot 140 shown in FIG. 1) might have a 0.5" (~1.3 cm) wide, 2" (~5.1 cm) deep channel, and the cross slot (e.g., cross slot 145) might have a 0.5" (~1.3 cm) wide, 3" (~7.6 cm) deep channel.

In the Related Applications, a conduit (e.g., conduit 355 or the like) could be placed in the groove or channel, while cast-in-place polyurea cap is extruded over it, encapsulating the conduit and bonding it with the road surface. In this embodiment, the conduit provides the thoroughfare for the fiber optic or other lines while the polyurea provides bonding to the concrete or asphalt surface, mechanical protection against traffic and impact loads (including vandalism, etc.), and water tightness. Such embodiments can minimize costs associated with construction and tie-ins, providing a tailored technical solution that is optimized for the physical characteristics of the challenge at hand. The apical conduit system (otherwise referred to as "cast-in-place" technology or "cast-in-place fiber technology") is described in greater detail in the '034, '574, '691, '216, '020, '227, '488, '514, '754, and '109 Applications and in the '665 and '676 Applications, which have already been incorporated herein by reference in their entirety for all purposes. The structure including the foldable base 360 and plug 365 provides an alternative implementation for the apical conduit system, while improving the ease of construction and access to lines in the event of line damage, as well as limiting the need for costly backfill materials and labor.

Turning to the embodiment of FIG. 3, the example of FIG. 3A shows the relative configurations, positions, and arrangement of one embodiment of the system for implementing FTTP, in which the lines 350a within the source slot 335 are communicatively coupled with lines 350b within the main slot 340 through FDH 320, via the first bore hole 345a. As shown in FIG. 3A, the source slot 335 runs along a first roadway 305, while the main slot 340 runs along a second roadway 305 (which is substantially perpendicular to the first roadway 305, although the various embodiments allow for any relative orientation at any suitable angles between the adjacent roadways, as appropriate). In the example as shown in FIG. 3A, the first bore hole 345a is positioned so as to serve as an intersection amongst the source slot 335, the main slot 340, and the conduit 325 (leading to the FDH 320). In some cases, the position of the conduit 325 might be chosen to facilitate interconnection with each of the source slot 335 and the main slot 340. Further, the various embodiments allow for any configuration of the pathway 330, curb 315, FDH 320, source slot 335, main slot 340, and bore hole 345a, relative to roadway 305 and ground 310, other than as shown in FIG. 3.

In the embodiment of FIG. 3B, a top surface 320c of container 320a of the FDH 320 is shown as being substantially level with a top portion 310a of ground surface 310. The only portions of the FDH that are substantially above the ground surface 310a is the pedestal portion 320b and applicable connection components for connection with the container 320c. The components of the pedestal FDH 330 are described in detail above with respect to FIGS. 2A-2B. The top portion 320d of the pedestal 320b may be one of flat with relatively sharp circular edge(s) connecting to the side of the cylindrical pedestal 320b, flat with rounded circular edge(s) connecting to the side of the cylindrical pedestal 320b, curved with sharp circular edge(s) connecting to the side of the cylindrical pedestal 320b, curved with rounded circular edge(s) connecting to the side of the cylindrical pedestal 320b, domed with sharp circular edge(s) connecting to the side of the cylindrical pedestal 320b, domed with rounded circular edge(s) connecting to the side of the cylindrical pedestal 320b, and/or the like.

Pathway 330, as shown in FIGS. 3-6, might include, without limitation, an upper portion 330a on which people may walk, run, or bike, and a base portion 330b that provides sufficient support and/or adhesion to surrounding ground 310. As shown in FIG. 3B, the upper portion 330a might comprise a sloped segment, and in some cases might join or merge with curb 315, particularly where the pathway 330 is a street-corner sidewalk (such as street-corner sidewalk 125b in FIG. 1). According to some embodiments, conduit 325—disposed between (and communicatively coupling) the FDH 320 and one or more of source slot 335, main slot 340, and/or bore hole 345—might comprise a first conduit 325a and a second conduit 325b, as shown in FIG. 3B. In some cases, the second conduit 325b might communicatively couple lines therein with lines in conduit 355. In some instances, the first conduit might communicatively couple lines therein with lines 350 (such as F1 cables, F2 cables, or both).

In some embodiments, F1 or F2 cables might be routed substantially parallel with the second conduit, without themselves being routed through any conduit; in such cases, the F1 cables might run through the channels of the source and/or main slots, might run through a missile bore 325c between the bore hole 345 and the FDH 320 to the FDH 320, might be spliced and distributed by the FDH as F2 cables, and the F2 cables might run through the missile bore 325c to the main slot (and might further run through channels in the main slot(s), cross slot(s), and/or far-side slot(s)). The F1 and F2 cables might represent individual unidirectional lines that function as separate feed and return lines, might represent individual bi-directional lines that each function as both feed and return lines, or might represent a combination of unidirectional and bi-directional lines for carrying signals from the CO to the FDH, from the FDH to a NAP, from the NAP to the FDH, from the FDH to the CO, and/or the like.

With reference to FIG. 3C, a top surface 370a of capping material 370 is shown substantially level with a top portion of ground surface 305a of roadway 305. Also shown in FIG. 3C, the foldable base 360, which is placed in the channel 340a, substantially fills at least the bottom portion of groove or channel 340a, with the plurality of lines 350 and the conduit/microduct 355 being placed in a cavity within the foldable base 360. The foldable base 360 might include a base portion, two side walls, at least two points of articulation, and a pair of plug contacts, each plug contact being disposed at an end of each side wall portion opposite from the corresponding point of articulation. In some cases, each plug contact might have a (solid) contact portion 360a and a (deformable) gel portion 360b, or the like. As shown in FIG. 3C, the plug 365 has a microchannel 365a along a length of the top surface of the microchannel 365a. The capping material 370 might fill the microchannel 365a and might overflow to cover any openings between the plug 365 and the foldable base 360 and between the foldable base 360 and edges of the channel 340. A top surface 370a of capping material 370 might be substantially level with a top portion of ground surface 305a of ground surface 305. In some instances, the capping material 370 might flow beyond the edges of the channel 340, forming an "overband" region 370b. In some cases, the portions 370a and 370b of the capping material 370 are the same, only differing in how far the capping material extends beyond the side edges of the channel 340.

In some embodiments, the roadway surface 305a in which the source slot is disposed might correspond to a first ground surface, the roadway surface 305a in which the main slot is disposed might correspond to a second ground surface, and ground surface 310 in which the container of the FDH is disposed might correspond to a third ground surface. As shown in FIG. 3, the second ground surface might be a roadway surface, while the third ground surface might be a non-roadway surface. In some cases, curb surface 315a might represent a portion of a roadway surface, while curb surface 315b might represent a portion of a non-roadway surface. In some embodiments, the third ground surface might extend from the container 320a to the channels of the apical conduit system, and thus might comprise a combination of roadway 305, ground 310, and curb 315.

Turning to FIG. 3D, a tacking technique may be implemented to hold the foldable base 360 in place within the channel 340a. In some embodiments, an initial application of an adhesive layer 370c may be implemented, resulting in a first layer 370c being disposed in the channel 340a. Upon application of the first layer 370c, the foldable base 360 may be placed within the channel. Within a certain period (e.g., about 5 minutes, about 15 minutes, about 60 minutes, or longer, or any period between about 5-60 minutes), the first layer 370c might begin to set, thereby acting as a tack coating to hold the foldable base 360 in place within the channel 340a. In such cases, the first layer 370c might comprise a material that, when set, may be more easily cut with a knife or other sharp-edged tool (by hand, for example), while the capping material 370 might comprise thermosetting material including, without limitation, polyurea or other materials, which are more resilient. The embodiment of FIG. 3D is otherwise similar, if not identical, to that of FIG. 3C. In this manner, if repairs have to be made to any broken fiber lines or other cables or conduits, it will be easier to access the broken fiber lines or other cables or conduits, by removing the capping material 370, then removing the plug 365 (in some cases, using the groove as shown in FIGS. 8A as an aid or the like) to access the broken lines or cables (and in some cases, removing the foldable base 360 from the channel to access the broken lines or cables), as compared with accessing the broken fiber lines or other cables or conduits when they are embedded within polyurea or other similar materials (which are extremely resilient to most cutting implements) or accessing the broken fiber lines or other cables or conduits when they are embedded within a tack coat layer (which although less resilient compared to polyurea requires more effort to access than the use of the structure comprising the foldable base 360 and plug 365).

FIG. 4 shows the relative configurations, positions, and arrangement of one embodiment of the system for implementing FTTP, in which the lines from the NAP 380 are communicatively coupled with lines 350b within the main slot 340 and with lines 350c within the cross slot 375, via the second bore hole 345b. Some of lines 350c might communicatively couple with lines within conduits 325d leading to individual NIDs/ONTs (e.g., NID or ONT 170 in FIG. 1). In some embodiments, the cross slot 375 might be positioned to align with conduit 325 (or missile bore 325c); this allows a single bore hole 345a to serve as an intersection amongst the main slot 340, the cross slot 375, and the conduit 325 (or missile bore 325c) leading to the NAP 380. In alternative embodiments, the cross slot 375 may be positioned relative to the main slot 340 without regard to the position of conduit 325 (or missile bore 325c); in such embodiments, however, additional bore holes 345b may be necessary at intersections of two of the main slot 340, the cross slot 375, and the conduit 325 (or missile bore 325c) leading to the NAP 380.

In the embodiment of FIG. 4, the NAP 380 comprises a direct bury NAP 380. However, any suitable type of NAP may be implemented. Further, although hand hole 385 is shown in conjunction with NAP 380, the hand hole 385 is merely optional (and may be omitted); in such cases, the NAP 380 might communicatively couple lines 350c through conduits 325d directly to corresponding ones of the NIDs/ONTs (e.g., NID or ONT 170 in FIG. 1). Further, the various embodiments allow for any configuration of the pathway 330, curb 315, NAP 380, hand hole 385, main slot 340, cross slot 375, and bore hole 345b, relative to roadway 305 and ground 310, other than as shown in FIG. 4.

FIG. 5 shows the relative configurations, positions, and arrangement of one embodiment of the system for implementing FTTP, in which the lines 350c from a far-side slot 390 (which are routed through cross slot 375 from the NAP 380) are communicatively coupled with lines within conduit 325 leading to hand hole 385. Lines 350c from hand hole 385 might communicatively couple with lines within conduits 325d leading to individual NIDs/ONTs (e.g., NID or ONT 170 in FIG. 1).

Although hand hole 385 is shown connecting with two (or more) conduits 325d, the hand hole 385 is merely optional (and may be omitted); in such cases, the conduit 325 might communicatively couple lines 350c through conduits 325d directly (e.g., via splitting, "de-bundling," forking, or manifold connectors, or the like) to corresponding ones of the NIDs/ONTs (e.g., NID or ONT 170 in FIG. 1). Further, the various embodiments allow for any configuration of the pathway 330, curb 315, hand hole 385, far-side slot 390, road lines 395, and bore hole 345b, relative to roadway 305 and ground 310, other than as shown in FIG. 5.

FIG. 6 shows the relative configurations, positions, and arrangement of one embodiment of the system for implementing FTTP, in which the lines from the NAP 380 are communicatively coupled with lines 350b within the main slot 340 and with lines 350c within the cross slot 375, via one second bore hole 345b, and in which lines 350c within cross slot 375 are communicatively coupled with lines 350c in far-side slot 390 and lines 350c in conduit 325 leading to hand hole 385. Some of lines 350c might communicatively couple with lines within conduits 325d leading to individual NIDs/ONTs (e.g., NID or ONT 170 in FIG. 1), either directing from the NAP 380, from the NAP 380 through hand hole 385, from the NAP 380 through cross slot 375, through conduit 325, and through hand hole 385, or from the NAP 380 through cross slot 375, through far-side slot 390, through conduit 325, and through hand hole 385, or the like. In some embodiments, the cross slot 375 might be positioned to align with conduit 325 (or missile bore 325c); this allows a single bore hole 345a to serve as an intersection amongst any combination of the main slot 340, the cross slot 375, far-side slot 390, and/or the conduit 325 (or missile bore 325c) leading to the NAP 380. In alternative embodiments, the cross slot 375 may be positioned relative to the main slot 340 without regard to the position of conduit 325 (or missile bore 325c); in such embodiments, however, additional bore holes 345b may be necessary at intersections of two of the main slot 340, the cross slot 375, far-side slot 390, and the conduit 325 (or missile bore 325c) leading to the NAP 380.

In the embodiment of FIG. 6, the NAP 380 comprises a direct bury NAP 380. However, any suitable type of NAP may be implemented. Further, although hand hole 385 is shown in conjunction with NAP 380, the hand hole 385 is merely optional (and may be omitted); in such cases, the NAP 380 might communicatively couple lines 350c through conduits 325d directly to corresponding ones of the NIDs/ONTs (e.g., NID or ONT 170 in FIG. 1). Further, the various embodiments allow for any configuration of the pathway 330, curb 315, NAP 380, hand hole 385, main slot 340, cross slot 375, far-side slot 390, road lines 395, and bore hole 345b, relative to roadway 305 and ground 310, other than as shown in FIG. 6.

FIGS. 7A-7M (collectively, "FIG. 7") are general schematic diagrams illustrating various views of an embodiment 700 for installation of optical fiber, other telecommunications cables, and/or power lines in a ground surface.

With reference to FIGS. 7A-7E, FIG. 7A depicts a top view of a section of ground in which an apical conduit slot (in this example, an apical conduit main slot 340) is shown disposed in a ground surface (in this example, roadway 305), with each layer of the apical conduit system application, including (but not limited to) the foldable base 360, the one or more lines 350, a swellable joint filler tape 705, the plug 365, and the capping material layer 370, being staggered for purposes of illustration. As shown in the non-limiting example of FIG. 7A, the foldable base 360 might be disposed in the channel 340a of main slot 340, having a width $w_2$. The one or more lines 350 (including, but not limited to, F2 optical fiber cables, non-fiber cables, power lines, and/or conduit/microduct, or the like) might be disposed in a cavity formed by folding of two side wall portions of the foldable base 360 relative to the base portion of the foldable base 360 that is placed in the channel 340 in the ground surface 305. In the channel 340a, on top of, or over, the one or more lines 350 (which are disposed in the foldable base 360) might be disposed the swellable joint filler tape 705, which might swell to fill the cavity above the one or more lines 350. The plug 365, which might be disposed above the one or more lines 350 and the swellable joint filler tape 705, might engage with the two plug contacts of the foldable base 360 to secure the plug 365 in place relative to the foldable base 360 in the channel 340. Over the plug 365, the foldable base 360, and any openings between the foldable base 360 and edges of the channel 340 might be disposed the capping material layer 370. In some embodiments, the capping material 370 might be configured to be, or might include, without limitation, a shearable top coat that can be sheared from the plug 365 and the foldable base 360. The capping material 370 might fill the microchannel 365a and might overflow to cover any openings between the plug 365 and the foldable base 360 and between the foldable base 360 and edges of the channel 340. A top surface 370a of capping material 370 might be substantially level with a top portion of ground surface 305a of ground surface 305. In some instances, the capping material 370 might flow beyond the edges of the channel 340, forming an "overhand" region 370b. In some cases, the portions 370a and 370b of the capping material 370 are the same, only differing in how far the capping material extends beyond the side edges of the channel 340. The foldable base 360, the plug 365, and the capping material layer 370, either alone or in combination, might protect the one or more lines 350 from external forces and any damage that might be caused by such external forces, as well as protecting the one or more lines 350 from being tampered with by unauthorized persons, or the like.

Figure 7A:
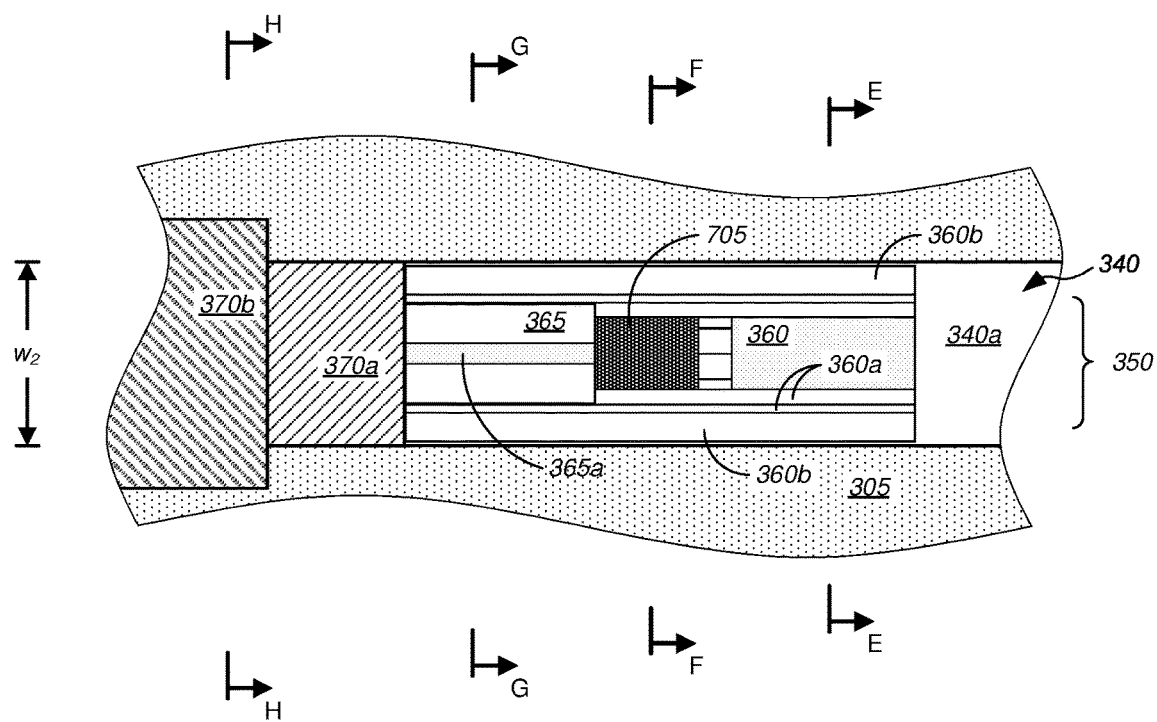
Figure 7B:
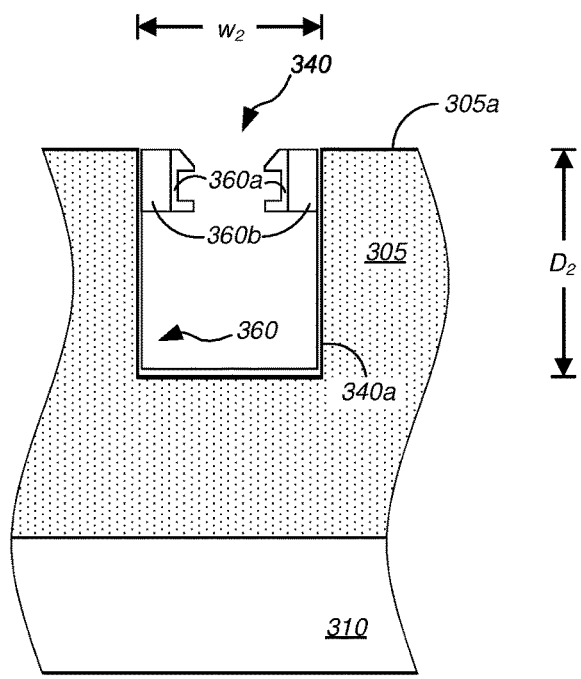

FIG. 7B is a partial sectional view of system 700, as shown along the E-E direction indicated in FIG. 7A, depicting a section of the apical conduit slot (in this case, the main slot 340) that has been cut in ground surface 305 to a depth of $D_2$ (and having a width of $w_2$) above ground 310; here, $D_2$ and $w_2$ are equivalent to $D_1$ and $w_1$, respectively, as described above with respect to FIG. 3D. As shown in FIG. 7B, the foldable base 360 might be disposed at the bottom of the channel (in this case, the channel 340a of the main slot 340). The foldable base 360 might include a base portion, two side walls, at least two points of articulation, and a pair of plug contacts, each plug contact being disposed at an end of each side wall portion opposite from the corresponding point of articulation. In some cases, each plug contact might have a (solid) contact portion 360a and a (deformable) gel portion 360b, or the like. Each plug contact 360a might be disposed at the corresponding top portion of the foldable base 360, when the foldable base 360 is disposed at the bottom of the channel 340. In some cases, the top surfaces of the plug contacts 360 (i.e., top surfaces of contact portion 360a and gel portion 360b) might be substantially (or almost) level with a top portion of ground surface 305a of ground surface 305.

FIG. 7C is a partial sectional view of system 700, as shown along the F-F direction indicated in FIG. 7A. As shown in FIG. 7C, one or more lines (including, but not limited to, F2 optical fiber cables, non-fiber cables, power lines, and/or conduit/microduct, or the like) might be disposed within the cavity formed by folding of two side wall portions of the foldable base 360 relative to the base portion of the foldable base 360. In some cases, the swellable joint filler tape 705 might be disposed within the cavity above the one or more lines.

Each of the two plug contacts 360a of the foldable base 360 might comprise deformable portions 360b—which might be made of gel material or the like—that allow the two plug contacts 360a to deform when the plug 365 makes contact and mates with the two plug contacts 360a of the foldable base 360, as shown in FIG. 7D when force 710 is applied (in a downward direction) to plug 365 to cause the plug 365 to engage with plug contacts 360a (as depicted by arrow 710). FIG. 7D is a partial sectional view of system 700 prior to the plug 365 being fully engaged with the plug contacts of the foldable base 360, as shown along the G-G direction indicated in FIG. 7A. In some embodiments, the plug 365 might further comprise side engagement contacts on either side of the plug 365. Each of the two plug contacts 360a might comprise a complementary engagement contact that mates with a corresponding one of the side engagement contacts of the plug 365. The plug 365 that engages with the two plug contacts 360a of the foldable base 360 to secure the plug 365 in place relative to the foldable base 360 in the channel 340 might comprise the side engagement contacts of the plug 365 engaging with the corresponding complementary engagement contacts of the two plug contacts 360a of the foldable base 360 to secure the plug 365 in place relative to the foldable base 360 in the channel 340. In some instances, one set of side engagement contact and corresponding complementary engagement contact might be symmetrical with respect to the other set of side engagement contact and corresponding complementary engagement contact (as shown in FIG. 7). Alternatively, one set of side engagement contact and corresponding complementary engagement contact might be asymmetrical with respect to the other set of side engagement contact and corresponding complementary engagement contact (where contact might be made by engaging one side at an angle then rotating the plug about its longitudinal axis to engage the other side) (not shown).

Once the plug 365 has been fully engaged with plug contacts 360a, as shown in FIG. 7E (FIG. 7E being a partial sectional view of system 700, as shown along the H-H direction indicated in FIG. 7A), one or more layers of the capping material 370 might be placed in the microchannel 365a, the one or more layers of capping material 370 flowing beyond the microchannel 365a and over any openings between the plug 365 and the foldable base 360 and between the foldable base 360 and edges of the channel 340, a top surface 370a of capping material 370 is shown substantially level with a top portion of ground surface 305a of ground surface 305. In some cases, a spreader tool 715 might be used to spread the one or more layers of capping material 370 over the plug 365 and over any openings between the plug 365 and the foldable base 360 and between the foldable base 360 and edges of the channel 340. In some instances, the capping material 370 might flow beyond the edges of the channel 340, forming an "overband" region 370b. In some cases, the portions 370a and 370b of the capping material 370 are the same, only differing in how far the capping material extends beyond the side edges of the channel 340.

With reference to FIGS. 7F-7M, foldable base 360 might include, without limitation, two plug contacts 360a, corresponding deformable portions 360b, two side wall portions 360c, a base portion 360d, at least two points of articulation 360e-360h, and/or the like. The foldable base 360 may be folded 360 (left) or unfolded 360' (right) as shown with respect to FIGS. 7F-7M.

As shown in FIGS. 7F and 7G, the at least two points of articulation 360e might comprise one embodiment of a folding groove, a folding crease, or a hinge. FIG. 7F depicts the one embodiment of the folding groove, the folding crease, or the hinge in the folded position 360e, while FIG. 7G depicts the one embodiment of the folding groove, the folding crease, or the hinge in the unfolded position 360e'.

As shown in FIGS. 7H and 7I, the at least two points of articulation 360f might comprise another embodiment of a folding groove, a folding crease, or a hinge. FIG. 7H depicts the other embodiment of the folding groove, the folding crease, or the hinge in the folded position 360f, while FIG. 7I depicts the other embodiment of the folding groove, the folding crease, or the hinge in the unfolded position 360f'.

As shown in FIGS. 7J and 7K, the at least two points of articulation 360g might comprise a hinge. FIG. 7J depicts the hinge in the folded position 360g, while FIG. 7K depicts the hinge in the unfolded position 360g'.

As shown in FIGS. 7L and 7M, the at least two points of articulation 360h might comprise another embodiment of a folding groove, a folding crease, or a hinge. FIG. 7L depicts the other embodiment of the folding groove, the folding crease, or the hinge in the folded position 360h, while FIG. 7M depicts the other embodiment of the folding groove, the folding crease, or the hinge in the unfolded position 360h'.

FIGS. 8A-8Q (collectively, "FIG. 8") are general schematic diagrams illustrating various views of another embodiment 800 for installation of optical fiber, other telecommunications cables, and/or power lines in a ground surface.

With reference to FIGS. 8A-8F, FIG. 8A depicts a top view of a section of ground in which an apical conduit slot (in this example, an apical conduit main slot 340) is shown disposed in a ground surface (in this example, roadway 305), with each layer of the apical conduit system application, including (but not limited to) an adhesive layer 815, the foldable base 360, at least two sets of friction fingers 805, the one or more lines 350, a swellable joint filler tape 705, the plug 365, and the capping material layer 370, being staggered for purposes of illustration. As shown in the non-limiting example of FIG. 8A, the foldable base 360 might be disposed in the channel 340a of main slot 340, having a width $w_2$, with the foldable base 360 being disposed on the adhesive layer 815 (which might be a tack coat layer or the like). In some cases, the foldable base 360 might further comprise at least two sets of friction fingers 805. When the foldable base 360 is placed in the channel 340, each set of friction fingers 805 might be disposed along a side wall portion between the side wall portion and the corresponding side of the channel 340, the at least two sets of friction fingers 805 engaging against the sides of the channel 340 to secure the foldable base 360 in place within the channel 340. The one or more lines 350 (including, but not limited to, F2 optical fiber cables, non-fiber cables, power lines, and/or conduit/microduct, or the like) might be disposed in a cavity formed by folding of two side wall portions of the foldable base 360 relative to the base portion of the foldable base 360 that is placed in the channel 340 in the ground surface 305. In the channel 340a, on top of, or over, the one or more lines 350 (which are disposed in the foldable base 360) might be disposed the swellable joint filler tape 705, which might swell to fill the cavity above the one or more lines 350. The plug 365, which might be disposed above the one or more lines 350 and the swellable joint filler tape 705, might engage with the two plug contacts of the foldable base 360 to secure the plug 365 in place relative to the foldable base 360 in the channel 340. Over the plug 365, the foldable base 360, and any openings between the foldable base 360 and edges of the channel 340 might be disposed the capping material layer 370. In some embodiments, the capping material 370 might be configured to be, or might include, without limitation, a shearable top coat that can be sheared from the plug 365 and the foldable base 360. The capping material 370 might fill the microchannel 365a and might overflow to cover any openings between the plug 365 and the foldable base 360 and between the foldable base 360 and edges of the channel 340. A top surface 370a of capping material 370 might be substantially level with a top portion of ground surface 305a of ground surface 305. In some instances, the capping material 370 might flow beyond the edges of the channel 340, forming an "overhand" region 370b. In some cases, the portions 370a and 370b of the capping material 370 are the same, only differing in how far the capping material extends beyond the side edges of the channel 340. The foldable base 360, the plug 365, and the capping material layer 370, either alone or in combination, might protect the one or more lines 350 from external forces and any damage that might be caused by such external forces, as well as protecting the one or more lines 350 from being tampered with by unauthorized persons, or the like.

Also shown in FIG. 8A might be one or more maintenance access slots 810 that are disposed at intervals along a longitudinal length of the plug 365, each maintenance access slot 810 being perpendicular to the longitudinal length of the plug 365, with a depth of the maintenance access slot 810 not extending below the bottom portion of the microchannel 365a. For example, in the non-limiting embodiment of FIG. 8A, the top surfaces of the side sloping portions of the microchannel 365a (as exposed by the presence of the maintenance access slot 810) are shown (depicted by the hashed region denoted by the reference numeral, 365b). These maintenance access slots 810 facilitate removal of the plug 365 from the plug contacts of the foldable base 360 (as illustrated in FIGS. 8G-8I), thereby providing a service technician or operator a way to remove the plug 365 to access the lines disposed in the cavity of the foldable base 360. In this manner, broken or damaged lines can be repaired or removed, splicing of lines to new lines can be made, additional lines can be inserted, existing lines can be removed, and/or the like, without having to cut into thermosetting material to access the lines, or the like.

FIG. 8B is a partial sectional view of system 800, as shown along the I-I direction indicated in FIG. 8A, depicting a section of the apical conduit slot (in this case, the main slot 340) that has been cut in ground surface 305 to a depth of $D_2$ (and having a width of $w_2$) above ground 310; here, $D_2$ and $w_2$ are equivalent to $D_1$ and $w_1$, respectively, as described above with respect to FIG. 3D. As shown in FIG. 8B, the adhesive layer 815 might be disposed at the bottom of the channel (in this case, the channel 340a of the main slot 340).

FIG. 8C is a partial sectional view of system 800, as shown along the J-J direction indicated in FIG. 8A. As shown in FIG. 8C, the foldable base 360 might be disposed at the bottom of the channel (in this case, the channel 340a of the main slot 340) on the adhesive layer 815. In some cases, the adhesive layer 815 might be a tack coat layer that (once it sets) holds the foldable base 360 in place within the channel 340a. The foldable base 360 might include a base portion, two side walls, at least two points of articulation, and a pair of plug contacts, each plug contact being disposed at an end of each side wall portion opposite from the corresponding point of articulation. In some cases, each plug contact might have a (solid) contact portion 360a and a (deformable) gel portion 360b, or the like. Each plug contact 360a might be disposed at the corresponding top portion of the foldable base 360, when the foldable base 360 is disposed at the bottom of the channel 340. In some cases, the top surfaces of the plug contacts 360 (i.e., top surfaces of contact portion 360a and gel portion 360b) might be substantially (or almost) level with a top portion of ground surface 305a of ground surface 305.

FIG. 8D is a partial sectional view of system 800, as shown along the K-K direction indicated in FIG. 8A. As shown in FIG. 8D, one or more lines (including, but not limited to, F2 optical fiber cables, non-fiber cables, power lines, and/or conduit/microduct, or the like) might be disposed within the cavity formed by folding of two side wall portions of the foldable base 360 relative to the base portion of the foldable base 360. In some cases, the swellable joint filler tape 705 might be disposed within the cavity above the one or more lines.

Each of the two plug contacts 360a of the foldable base 360 might comprise deformable portions 360b—which might be made of gel material or the like—that allow the two plug contacts 360a to deform when the plug 365 makes contact and mates with the two plug contacts 360a of the foldable base 360, as shown in FIG. 8E when force 710 is applied (in a downward direction) to plug 365 to cause the plug 365 to engage with plug contacts 360a (as depicted by arrow 710). FIG. 8E is a partial sectional view of system 800 prior to the plug 365 being fully engaged with the plug contacts of the foldable base 360, as shown along the L-L direction indicated in FIG. 8A. In some embodiments, the plug 365 might further comprise side engagement contacts on either side of the plug 365. Each of the two plug contacts 360a might comprise a complementary engagement contact that mates with a corresponding one of the side engagement contacts of the plug 365. The plug 365 that engages with the two plug contacts 360a of the foldable base 360 to secure the plug 365 in place relative to the foldable base 360 in the channel 340 might comprise the side engagement contacts of the plug 365 engaging with the corresponding complementary engagement contacts of the two plug contacts 360a of the foldable base 360 to secure the plug 365 in place relative to the foldable base 360 in the channel 340. In some instances, one set of side engagement contact and corresponding complementary engagement contact might be symmetrical with respect to the other set of side engagement contact and corresponding complementary engagement contact (as shown in FIG. 8). Alternatively, one set of side engagement contact and corresponding complementary engagement contact might be asymmetrical with respect to the other set of side engagement contact and corresponding complementary engagement contact (where contact might be made by engaging one side at an angle then rotating the plug about its longitudinal axis to engage the other side) (not shown).

Once the plug 365 has been fully engaged with plug contacts 360a, as shown in FIG. 8F (FIG. 8F being a partial sectional view of system 800, as shown along the M-M direction indicated in FIG. 8A), one or more layers of the capping material 370 might be placed in the microchannel 365a, the one or more layers of capping material 370 flowing beyond the microchannel 365a and over any openings between the plug 365 and the foldable base 360 and between the foldable base 360 and edges of the channel 340, a top surface 370a of capping material 370 is shown substantially level with a top portion of ground surface 305a of ground surface 305. In some cases, a spreader tool 715 might be used to spread the one or more layers of capping material 370 over the plug 365 and over any openings between the plug 365 and the foldable base 360 and between the foldable base 360 and edges of the channel 340. In some instances, the capping material 370 might flow beyond the edges of the channel 340, forming an "overband" region 370b. In some cases, the portions 370a and 370b of the capping material 370 are the same, only differing in how far the capping material extends beyond the side edges of the channel 340.

FIGS. 8G-8I depict a series of cross sectional views illustrating removal of the plug. Referring to FIGS. 8F and 8G, the capping material 370 (including portions 370a and 370b) might be removed to expose the plug 365, the microchannel 365a of the plug 365, as well as the top surfaces of the two plug contacts 360a and the corresponding deformable portions 360b. The capping material 370 might also be removed from the maintenance access slot(s) 810. In some cases, the capping material 370 might be removed by use of a saw, a chisel, and/or other mechanical tools (which in some cases might be electrically powered, or the like). Alternatively, or additionally, (at least portions of) the capping material 370 might be removed using solvents particularly prepared to break down the structure of the capping material 370. Once the maintenance access slot(s) 810, the plug 365, the microchannel 365a, and the top surfaces of the two plug contacts 360a and the corresponding deformable portions 360b (of a length or longitudinal segment of the plug 365 and foldable base 360) has been exposed, the spreader tool 715 or some other tool (including, but not limited to, a flat head screw driver, a chisel, a spatula, a card, and/or the like) might be used to fit within the maintenance access slot 810 to engage with plug contacts 360a (as depicted by arrow 820), when force 820 is applied (in a downward direction) to the tool 715 or other tool. FIG. 8H is a partial sectional view of system 800 after the plug 365 has been fully engaged by the plug contacts of the foldable base 360, as shown along the L-L direction indicated in FIG. 8A, and subsequently engaged again by the spreader tool 715 or other tool through the maintenance access slot 810. As the tool engages with the sloped portions of the plug contacts 360a, the force 820 causes the plug contacts 360a to press against and deform the deformable portions 360b, thereby causing the plug contacts 360a to disengage from the plug 365 while simultaneously raising the plug 365 (as shown in FIG. 8H). The plug 365 (as well as the spreader tool 715 or other tool) may then be removed from the plug contacts 360a (and thus from the foldable base 360 and the channel 340), as shown in FIG. 8I. In some cases, the plug 365 may be reused. Alternatively, due to the action of cutting into the capping material 370, the plug 365 may be damaged, and must be replaced with a new plug 365 after servicing is performed on the lines 350 disposed within the foldable base 360. The capping material 370 that is removed is typically not reusable and new capping material 370 must be used to refill the microchannel 365a and to flow beyond the microchannel 365a and over any openings between the plug 365 and the foldable base 360 and between the foldable base 360 and edges of the channel 340, as well as any overband regions 370b, as described above with respect to FIG. 8F or the like.

With reference to FIGS. 8J-8Q, foldable base 360 might include, without limitation, two plug contacts 360a, corresponding deformable portions 360b, two side wall portions 360c, a base portion 360d, at least two points of articulation 360e-360g, at least two sets of friction fingers 805 (which are disposed on the surfaces of the side wall portions 360c opposite to the surfaces on which the two plug contacts 360a), and/or the like. The foldable base 360 may be folded 360 (left) or unfolded 360' (right) as shown with respect to FIGS. 8J-8Q.

As shown in FIGS. 8J and 8K, the at least two points of articulation 360e might comprise one embodiment of a folding groove, a folding crease, or a hinge. FIG. 8J depicts the one embodiment of the folding groove, the folding crease, or the hinge in the folded position 360e, while FIG. 8K depicts the one embodiment of the folding groove, the folding crease, or the hinge in the unfolded position 360e'.

As shown in FIGS. 8L and 8M, the at least two points of articulation 360f might comprise another embodiment of a folding groove, a folding crease, or a hinge. FIG. 8L depicts the other embodiment of the folding groove, the folding crease, or the hinge in the folded position 360f, while FIG. 8M depicts the other embodiment of the folding groove, the folding crease, or the hinge in the unfolded position 360f'.

As shown in FIGS. 8N and 8O, the at least two points of articulation 360g might comprise a hinge. FIG. 8N depicts the hinge in the folded position 360g, while FIG. 8O depicts the hinge in the unfolded position 360g'.

As shown in FIGS. 8P and 8Q, the at least two points of articulation 360h might comprise another embodiment of a folding groove, a folding crease, or a hinge. FIG. 8P depicts the other embodiment of the folding groove, the folding crease, or the hinge in the folded position 360h, while FIG. 8Q depicts the other embodiment of the folding groove, the folding crease, or the hinge in the unfolded position 360h'.

Figure 9:
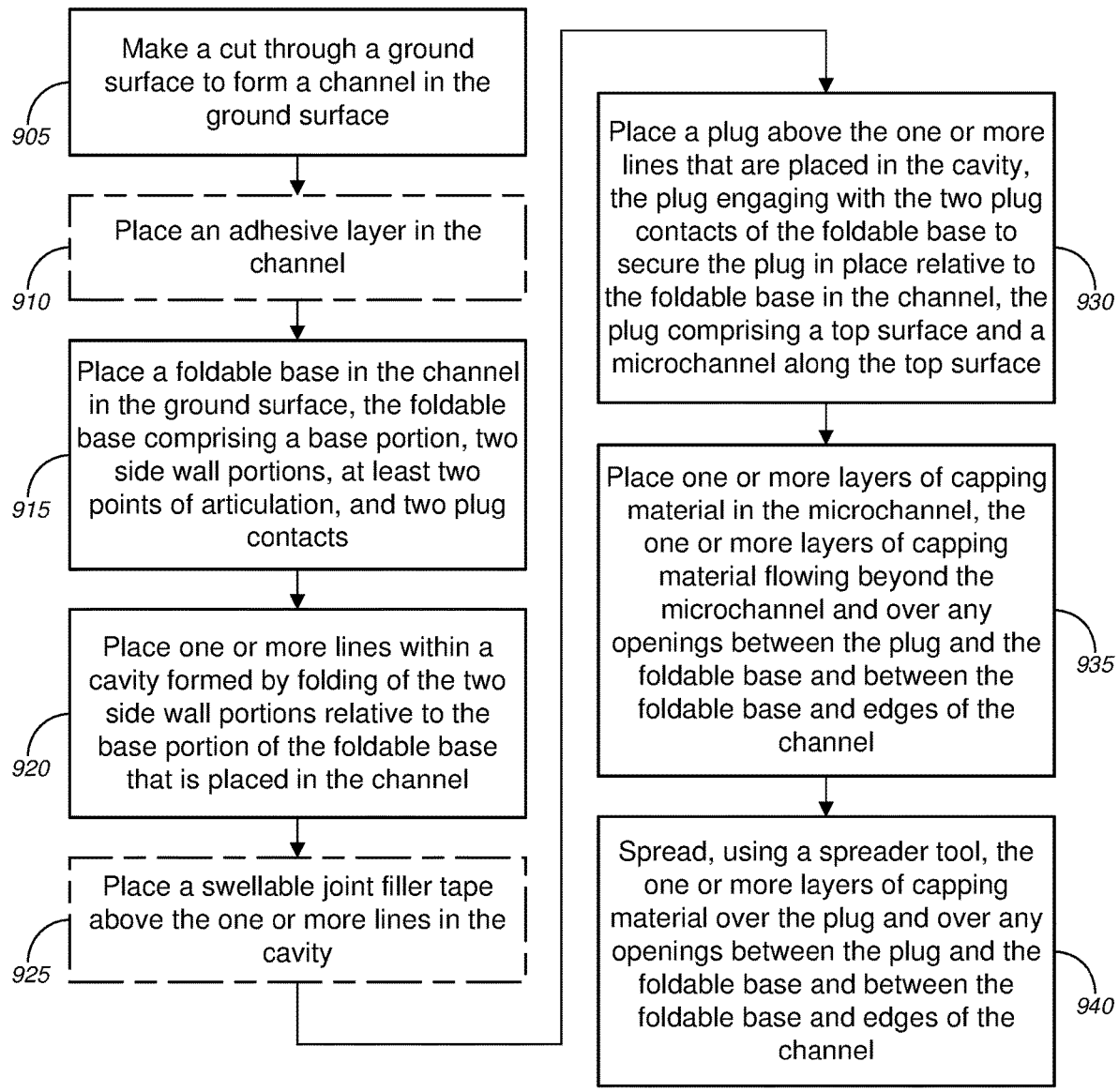
FIG. 9 is a flow diagram illustrating a method for implementing installation of optical fiber, other telecommunications cables, and/or power lines in a ground surface, in accordance with various embodiments.

FIG. 9 is a flow diagram illustrating a method 900 for implementing installation of optical fiber, other telecommunications cables, and/or power lines in a ground surface, in accordance with various embodiments.

While the techniques and procedures are depicted and/or described in a certain order for purposes of illustration, it should be appreciated that certain procedures may be reordered and/or omitted within the scope of various embodiments. Moreover, while the method illustrated by FIG. 9 can be implemented by or with (and, in some cases, are described below with respect to) the systems or embodiments 100, 300, 400, 500, 600, 700, and/or 800 of FIGS. 1, 3, 4, 5, 6, 7, and/or 8, respectively (or components thereof), such methods may also be implemented using any suitable hardware implementation. Similarly, while each of the systems or embodiments 100, 300, 400, 500, 600, 700, and/or 800 of FIGS. 1, 3, 4, 5, 6, 7, and/or 8, respectively (or components thereof), can operate according to the method illustrated by FIG. 9 (e.g., by executing instructions embodied on a computer readable medium), the systems or embodiments 100, 300, 400, 500, 600, 700, and/or 800 can each also operate according to other modes of operation and/or perform other suitable procedures.

In the non-limiting embodiment of FIG. 9, method 900 might comprise, at block 905, making a cut through a ground surface to form a channel in the ground surface. At optional block 910, method 900 might comprise placing an adhesive layer in the channel.

Method 900, at block 915, might comprise placing a foldable base in the channel in the ground surface. The foldable base might include, without limitation, a base portion, two side wall portions, at least two points of articulation, and two plug contacts, and/or the like. Each point of articulation might separate the base portion from one of the two side wall portions and might allow each side wall portion to fold relative with the base portion. Each plug contact might be disposed at an end of each side wall portion opposite from the corresponding point of articulation. The base portion, when placed in the channel, might lie longitudinally along a bottom of the channel and the two side wall portions are in contact with sides of the channel. In some cases, the two points of articulation might each comprise one of a folding groove, a folding crease, or a hinge, examples of some of which are depicted in FIGS. 7F-7M and 8J-8Q.

Method 900 might further comprise placing one or more lines within a cavity formed by folding of the two side wall portions relative to the base portion of the foldable base that is placed in the channel in the ground surface (block 920) and placing a swellable joint filler tape above the one or more lines in the cavity prior to placing the plug above the one or more lines (optional block 925). In some embodiments, at least one of the one or more lines comprises at least one of one or more telecommunications lines, one or more power lines, one or more optical fiber cables, one or more non-fiber cables, or one or more conduits, and/or the like.

At block 930, method 900 might comprise placing a plug above the one or more lines that are placed in the cavity, the plug engaging with the two plug contacts of the foldable base to secure the plug in place relative to the foldable base in the channel, The plug might comprise a top surface and a microchannel along the top surface, the microchannel being parallel with the channel when the plug engages with the two plug contacts of the foldable base when the foldable base is placed in the channel. The plug might further comprise side engagement contacts on either side of the plug. Each of the two plug contacts might comprise a complementary engagement contact that mates with a corresponding one of the side engagement contacts of the plug. The plug engaging with the two plug contacts of the foldable base to secure the plug in place relative to the foldable base in the channel might comprise the side engagement contacts of the plug engaging with the corresponding complementary engagement contacts of the two plug contacts of the foldable base to secure the plug in place relative to the foldable base in the channel. In some instances, one set of side engagement contact and corresponding complementary engagement contact might be symmetrical with the other set of side engagement contact and corresponding complementary engagement contact. Alternatively, one set of side engagement contact and corresponding complementary engagement contact might be asymmetrical with the other set of side engagement contact and corresponding complementary engagement contact (where contact might be made by engaging one side at an angle then rotating the plug about its longitudinal axis to engage the other side). In some embodiments, each of the two plug contacts of the foldable base might comprise deformable portions that allow the two plug contacts to deform when the plug makes contact and mates with the two plug contacts of the foldable base. In some cases, the deformable portions comprise gel material.

Method 900 might further comprise, at block 935, placing one or more layers of capping material in the microchannel, the one or more layers of capping material flowing beyond the microchannel and over any openings between the plug and the foldable base and between the foldable base and edges of the channel. In some cases, method 900 might further comprise spreading, using a spreader tool, the one or more layers of capping material over the plug and over any openings between the plug and the foldable base and between the foldable base and edges of the channel (block 940).

According to some embodiments, the foldable base might further comprise at least two sets of friction fingers. When the foldable base is placed in the channel, each set of friction fingers might be disposed along a side wall portion between the side wall portion and the corresponding side of the channel, the at least two sets of friction fingers engaging against the sides of the channel to secure the foldable base in place within the channel. In some cases, each set of friction fingers might include, but is not limited to, one of a foam-based layer, a layer of metal fingers, a layer of plastic fingers, a layer of bent metal cantilevers, a layer of bent plastic cantilevers, and/or the like.

In some embodiments, the plug contacts might further comprise one or more maintenance access slots that are disposed at intervals along a longitudinal length of the plug contacts of the foldable base, each maintenance access slot being perpendicular to the longitudinal length of the foldable base. These maintenance access slots facilitate removal of the plug from the plug contacts of the foldable base, thereby providing a service technician or operator to remove the plug to access the lines disposed in the cavity of the foldable base. In this manner, broken or damaged lines can be repaired or removed, splicing of lines to new lines can be made, additional lines can be inserted, existing lines can be removed, and/or the like, without having to cut into thermosetting material to access the lines, or the like.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   placing a foldable base in a channel in a ground surface, the foldable base comprising a base portion, two side wall portions, and at least two points of articulation, wherein each point of articulation separates the base portion from one of the two side wall portions and allows each side wall portion to fold relative with the base portion, wherein the base portion, when placed in the channel, lies longitudinally along a bottom of the channel and the two side wall portions are in contact with sides of the channel; and
   forming a cavity by folding the two side wall portions relative to the base portion of the foldable base that is placed in the channel in the ground surface.

2. The method of claim 1, wherein the two points of articulation each comprises one of a folding groove, a folding crease, or a hinge.

3. The method of claim 1, wherein the foldable base further comprises two plug contacts, wherein each plug contact is disposed at an end of each side wall portion opposite from the corresponding point of articulation.

4. The method of claim 3, wherein each of the two plug contacts of the foldable base comprises deformable portions that allow the two plug contacts to deform when the plug makes contact and mates with the two plug contacts of the foldable base.

5. The method of claim 4, wherein the deformable portions comprise gel material.

6. The method of claim 1, wherein the foldable base further comprises at least two sets of friction fingers, wherein when the foldable base is placed in the channel, each set of friction fingers is disposed along a side wall portion between the side wall portion and the corresponding side of the channel, the at least two sets of friction fingers engaging against the sides of the channel to secure the foldable base in place within the channel.

7. The method of claim 3, wherein the plug further comprises one or more maintenance access slots that are disposed at intervals along a longitudinal length of the plug, each maintenance access slot being perpendicular to the longitudinal length of the plug.

8. The method of claim 3, wherein at least one of the one or more layers of capping material comprises a shearable top coat.

9. The method of claim 1, further comprising:
   placing an adhesive layer in the channel prior to placing the foldable base in the channel.

10. The method of claim 3, further comprising:
    placing a swellable joint filler tape above the one or more lines in the cavity prior to placing the plug above the one or more lines.

11. The method of claim 3, further comprising:
    spreading, using a spreader tool, the one or more layers of capping material over the plug and over any openings between the plug and the foldable base and between the foldable base and edges of the channel.

12. A system, comprising:
    a foldable base, comprising:
    a base portion;
    two side wall portions; and
    at least two points of articulation;

wherein each point of articulation separates the base portion from one of the two side wall portions and allows each side wall portion to fold relative with the base portion;

wherein the base portion, when placed in a channel in a ground surface, lies longitudinally along a bottom of the channel and the two side wall portions are in contact with sides of the channel;

wherein, when placed in the channel in the ground surface, the two side wall portions fold relative to the base portion of the foldable base to form a cavity.

13. The system of claim 12, wherein the two points of articulation each comprises one of a folding groove, a folding crease, or a hinge.

14. The system of claim 12, wherein the foldable base further comprises two plug contacts, wherein each plug contact is disposed at an end of each side wall portion opposite from the corresponding point of articulation.

15. The system of claim 12, further comprising:
a plug, comprising:
a top surface; and
a microchannel along the top surface;
wherein the plug, when placed above one or more lines that are placed in the cavity, engages with the two plug contacts of the foldable base to secure the plug in place relative to the foldable base in the channel, wherein the microchannel is parallel with the channel when the plug is engaged with the two plug contacts; and one or more layers of capping material,
wherein, after the plug engages with the two plug contacts of the foldable base, the one or more layers of capping material form a layer that flows beyond the microchannel and over any openings between the plug and the foldable base and between the foldable base and edges of the channel.

16. The system of claim 15, wherein each of the two plug contacts of the foldable base comprises deformable portions that allow the two plug contacts to deform when the plug makes contact and mates with the two plug contacts of the foldable base.

17. The system of claim 12, wherein the foldable base further comprises at least two sets of friction fingers, wherein when the foldable base is placed in the channel, each set of friction fingers is disposed along a side wall portion between the side wall portion and the corresponding side of the channel, the at least two sets of friction fingers engaging against the sides of the channel to secure the foldable base in place within the channel.

18. The system of claim 15, wherein the plug further comprises one or more maintenance access slots that are disposed at intervals along a longitudinal length of the plug, each maintenance access slot being perpendicular to the longitudinal length of the plug.

* * * * *